United States Patent [19]

Burke, Jr., deceased et al.

[11] 4,169,737

[45] Oct. 2, 1979

[54] INTRACHROMOSPHERULOID/IN-TRALEUCO-SPHERULOID PIGMENT COMPOSITIONS AND PROCESSES FOR PRODUCING SAME

[75] Inventors: Oliver W. Burke, Jr., deceased, late of Fort Lauderdale, Fla., by Norma Scala, administratrix; Victor T. Humphreys, Pompano Beach, Fla.

[73] Assignee: Marion Darrah and Joseph Y. Houghton, Co-Trustees, c/o Burke Research Company, Pompano Beach, Fla.

[21] Appl. No.: 712,252

[22] Filed: Aug. 6, 1976

[51] Int. Cl.² .................... C08K 9/02; C08K 9/04; C08K 9/10

[52] U.S. Cl. .................... 106/308 M; 106/308 B; 106/308 Q; 106/308 F; 106/308 N; 106/308 S; 106/309; 260/42.14; 260/42.15; 260/42.16; 260/42.21; 260/42.53

[58] Field of Search .................... 260/42.53, 42.21; 106/308 M, 308 B, 308 Q, 308 F, 308 N, 308 S, 309, 42.15, 42.16, 42.14

[56] References Cited

U.S. PATENT DOCUMENTS

| | | | |
|---|---|---|---|
| 2,751,369 | 6/1956 | Te Grotenhuis | 260/42.53 |
| 2,786,822 | 3/1957 | Vesce | 260/42.55 |
| 3,133,893 | 5/1964 | Newman | 260/42.21 |
| 3,423,358 | 1/1969 | Burke | 260/42.43 |
| 3,502,582 | 3/1970 | Clemens | 260/42.53 |
| 3,700,690 | 10/1972 | Burke | 260/42.55 |

*Primary Examiner*—James H. Derrington
*Attorney, Agent, or Firm*—Hall & Houghton

[57] ABSTRACT

An intrachromospheruloid/intraleucospheruloid pigment composition and a process for producing the same: the intrachromospheruloid/intraleucospheruloid pigment composition consisting essentially of (a) spheruloids of essentially transparent organic polymer material, preferably cross-linked to essential insolubility in any physical solvent, having primary particles of an average size not exceeding 4 microns in diameter which have imbedded therein particulate organic color pigment composition consisting essentially of organic color pigment material having primary particles of an average size not exceeding 0.2 micron in diameter and (b) spheruloids of essentially transparent organic polymer material preferably cross-linked to essential insolubility in any physical solvent, having primary particles of an average size not exceeding 4 microns in diameter which have imbedded therein particulate leuco pigment composition consisting essentially of inorganic white and/or transparent white pigment material having a different refractive index and primary particles not exceeding 0.2 micron in diameter.

In the process, (a) the organic color pigment material is reduced to an average particle size of 0.2 micron or less, and is then included in an emulsion polymerization of ethylenically unsaturated monomer material preferably comprising an effective quantity of cross-linking agent, and the polymerization is conducted to produce emulsion polymer of an average particle size not exceeding 4 microns in diameter, having imbedded therein the still smaller organic color pigment particles; (b) the intraleucospheroloid is prepared in a similar manner and (c) the products of (a) and (b) are combined and bonded together ionically and/or by a bonding agent to produce the intrachromospheruloid/intraleucospheruloid pigment composition.

Procedures for imparting special properties to the products of (a), (b) and (c) are also disclosed.

Cooperation features are also disclosed.

61 Claims, 7 Drawing Figures

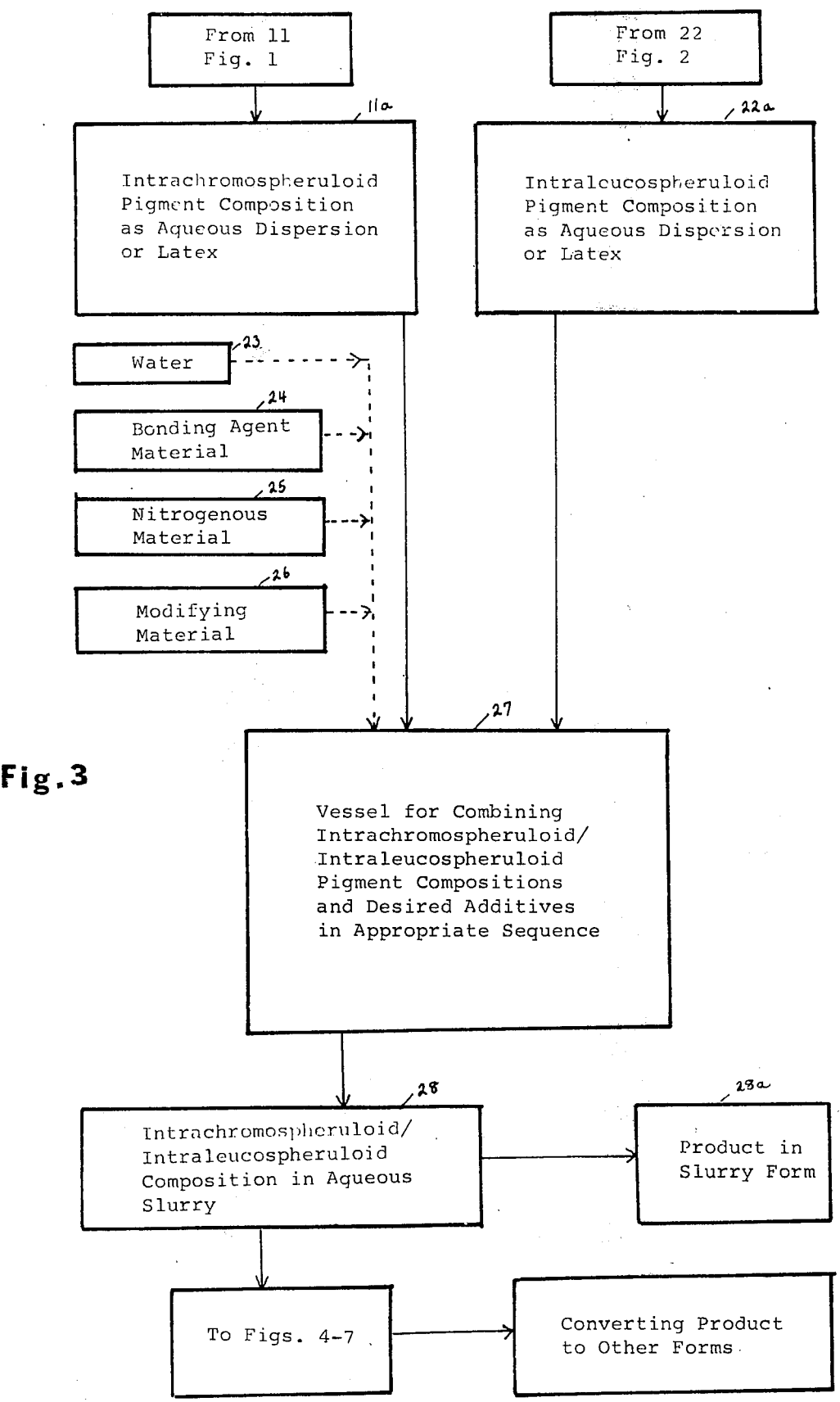

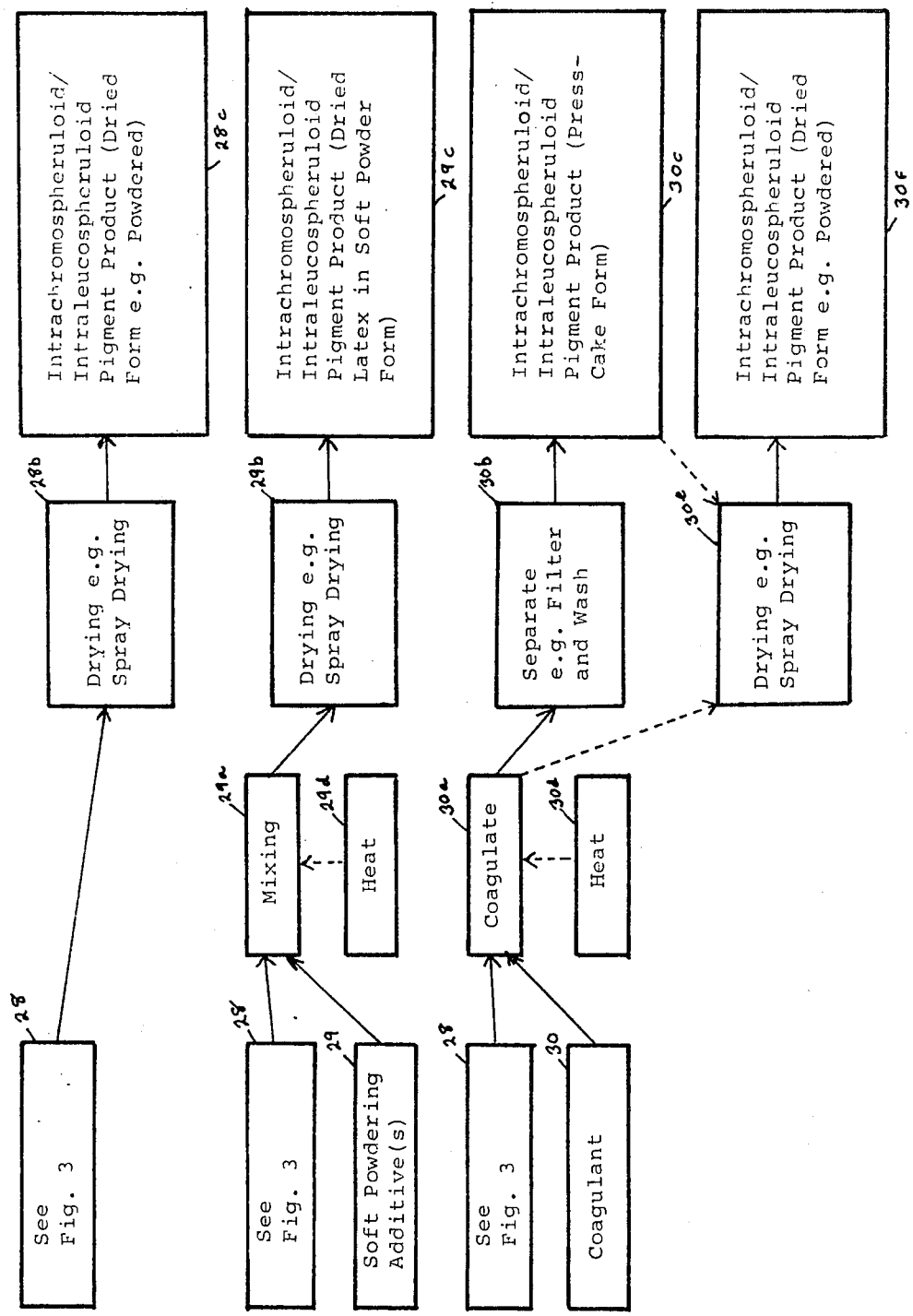

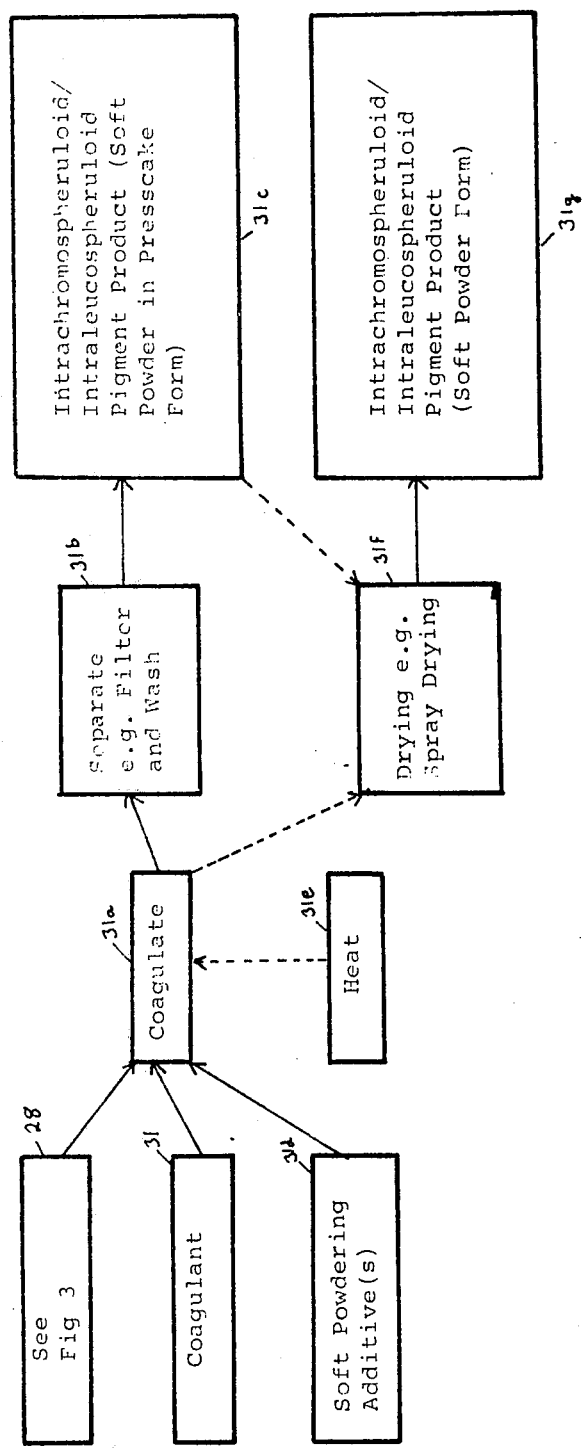

INTRACHROMOSPHERULOID/INTRALEUCO-SPHERULOID PIGMENT COMPOSITIONS AND PROCESSES FOR PRODUCING SAME

BACKGROUND OF THE INVENTION

1. Field of the Invention

This invention relates to colored pigment compositions of high refractive index and hue intensity and aims generally to improve the same and provide novel processes for the production thereof.

2. Description of the Prior Art

In the prior art it has been well known to produce the so-called "laked" or "extended" pigment colors usually by precipitation of a soluble organic dye or pigment color base onto an inert and inherently colorless or white substrate material to impart either useful pigmentary properties to an otherwise unsuitable organic or inorganic color material or to give improved physical properties to an already useful color. Such treatments and combinations included the enclosing or encapsulation of inorganic color material, such as the lead chromate yellows with a siliceous envelope or encapsulation, to inhibit or reduce its toxicological properties, and also included the laking of azo and releated organic pigments on such insoluble substances as alumina, blanc fixe and similar compositions.

The said methods simply dilute the color portion of the final pigment composition and essentially result in a wet or dry dispersion of the color pigment or chromogen containing part intimately admixed with the inert or extender portion of the composition.

Such laked or extended colors are usually considerably duller than the original chromogen containing constituent and not infrequently are themselves easily disunited into the separate components of the composition. This is especially true concerning the use of mixtures of organic color pigments per se with the so-termed substrate or extender inorganic pigment compounds.

SUMMARY OF THE INVENTION

In the conventional practices above described the combination of colored or chromogen containing organic pigments with the opaque white or transparent white or "leuco" inorganic pigments has been achieved either through the use of conventional laking techniques necessitating the use of the organic color in soluble form or by simple physical dilution of the organic color pigment with the inorganic pigment material. Both practices while extensively used in the art today represent little or no improvement over the state of the art which has existed from almost the first use of color for decorative purposes. The present inventon aims to reduce the inherent inefficiency of the prior art by first reducing both the organic color pigment and the inorganic leuco pigment material to what is essentially below the conventional limits of pigmentary size range and then by surrounding the individual pigment particles with spheruloid bodies of essentially transparent polymer material insoluble in the environment of intended use, and which differ in refractive index from said organic and inorganic pigment particles so that by light refraction they can enhance to the viewer the apparent size and pigmentary power of said encapsulated particles. Such procedures and novel compositions are themselves new and vauable additions to the pigmentary art and are separately covered in our co-pending Applications Ser. Nos. 712,257 and 712,254, Case 90-A and Case 90-B, herein incorporated by reference.

It has now been discovered that such pigmentary compositions, hereinafter referred to as "Intrachromospheruloid" and "Intraleucospheruloid" pigments respectively can themselves be combined by methods hereinafter disclosed to produce new and vauable pigment compositons in which each component modifies and enhances the action of the other.

In a preferred embodiment of the invention a process is provided for (I) producing insoluble intrachromospheruloid pigment composition, which process comprises, in combination (a) providing in liquid medium a particulate pigment composition consisting essentially of organic color pigment composition dispersed in said medium with 0–100% by weight of the total of surface active agent material set forth in clause (c) of this paragraph, said organic color pigment composition being essentially insoluble in physical solvents and having primary particles of an average size less than 0.2 micron in diameter; (b) forming an aqueous emulsion polymerization system consisting essentially of the composition of (a) and the balance, if any, of (1) 100% of the total of surface active agent material set forth in (c) and (2) monomer material selected in a ratio of said monomer material to said pigment composition lying in the range of 100:1 to 1:20 by weight, said monomer material consisting essentially of ethylenically unsaturated monomer material selected from the class consisting of (i) monomers polymerizable through a single ethylenically unsaturated group in the amount of 0% to 99.8% by weight of said monomer material and (ii) monomers polymerizable through a plurality of ethylenically unsaturated groups in an amount, in the range of 0.2 to 100% by weight of said monomer material, sufficient to produce polymer cross-linked to essential insolubility in any physical solvent and (3) emulsion polymerization initiator in an effective amount in the range of 0.2% to 10% by weight of the said monomer material; (c) the ratio of the total of the surface active agent material present after (b) to said particulate pigment composition and monomer material lying in the range of 2:1 to 1:40 by weight, and said total of surface active agent material being selected from the class of polymeric and non-polymeric surface active agents and combinations thereof capable of effecting emulsion polymerization in the said system of the selected ethylenically unsaturated monomer material to yield polymer particles with the organic pigment provided in step (a) embedded therein: (d) effecting emulsion polymerization in said system at sufficient temperatures in the range of 0° to 200° C. for sufficient time in the range of a few minutes to 24 hours to permit the polymerization to proceed far enough in the range from 50 to 100% conversion by weight of said monomer material to produce in aqueous dispersion an intrachromospheruloid pigment (4), consisting essentially of spheruloids of organic polymer material, cross-linked to essential insolubility in any physical solvent, having primary particles of an average size not exceeding 4 microns in diameter, and having embedded therein the still smaller size particles of said particulate pigment composition; (II) preparing an intraleucospheruloid pigment composition by (a') providing in liquid medium a particulate pigment composition consisting essentially of inorganic leuco pigment composition dispersed in said medium with 0–100% by weight of the total of surface active agent material set forth in clause (c') of this paragraph, said inorganic leuco pigment composition being essentially insoluble in water and having primary particles of an average size less than 0.2 micron in diameter; (b') forming an aqueous emulsion polymerization system consisting essentially of the composition of (a'), and the balance, if any, of (1'), 100% of the total of surface active agent material set forth in (c'), and (2') monomer material selected in a ratio of said monomer material to said pigment composition lying in the range of 100:1 to 1:20 by weight, said monomer material consisting essentially of ethylenically unsaturated monomer material selected from the class consisting of (i) monomers polymerizable through a single ethylenically unsaturated group in the amount of 0% to 99.8% by weight of said monomer material and (ii) monomers polymerizable through a plurality of ethylenically unsaturated groups in an amount, in the range of 0.2 to 100% by weight of said monomer material, sufficient to produce polymer cross-linked to essential insolubility in any physical solvent and (3') emulsion polymerization initiator in an effective amount in the range of 0.2% to 10% by weight of the said monomer material; (c') the ratio of the total of the surface active agent material present after (b') to said particulate pigment composition and monomer material lying in the range of 2:1 to 1:40 by weight, and said total of surface active agent material being selected from the class of polymeric and nonpolymeric surface active agents and combinations thereof capable of effecting emulsion polymerization in the said system of the selected ethylenically unsaturated monomer material to yield polymer particles with the inorganic pigment provided in step (a') embedded therein; (d') effecting emulsion polymerization in said system at sufficient temperatures in the range of 0° to 200° C. for sufficient time in the range of a few minutes to 24 hours to permit the polymerization to proceed far enough in the range of from 50 to 100% conversion by weight of said monomer material to produce in aqueous dispersion an intraleucospheruloid pigment (4'), consisting essentially of spheruloids of organic polymer material, cross-linked to essential insolubility in any physical solvent, having primary particles of an average size not exceeding 4 microns in diameter, and having embedded therein the still smaller size particles of said particulate pigment composition, (a") combining in selected proportions and bonding together ionically and/or by a bonding agent, the products of (4) and (4') to produce an intrachromospheruloid/intraleucospheruloid pigment composition and (b") recovering said intrachromospheruloid/intraleucospheruloid pigment composition.

In this embodiment the monomer material may comprise several portions added sequentially, at least one of the portions comprising cross-linking monomer as set forth and the cross-linking monomer may consist essentially of material copolymerizable with vinyl monomer and may be wholly or partially selected from the unsaturated conjugated drying oils and their acids and derivatives thereof, in the ratio to the vinyl and/or other copolymerizable monomer of 0.2:99.8 to 20:80 by weight.

The product of this preferred embodiment is particularly desirable because we have discovered that it may be modified to be soft powdering as hereinafter disclosed, whereas said techniques is inapplicable to non-cross-linked oil soluble polymer.

For special purposes and with less general advantage a less preferred embodiment of the invention may be employed wherein the monomer material in steps (b), (b') consists essentially of ethylenicaly unsaturated monomer material selected from the class consisting of monomers polymerizable through a single ethylenically unsaturated group, to produce spheruloids consisting of essentially noncross-linked organic polymer material, or the invention may be practiced wherein the monomer in (b) or (b') consists essentially of ethylenically unsaturated monomer material selected from the class consisting of monomers polymerizable through a single ethylenically unsaturated group, the other step consisting essentially of monomer material selected from the class consisting of (i) monomers polymerizable through a single ethylenically unsaturated group in the amount of 0% to 99.8% by weight of said monomer material and (ii) monomers polymerizable through a plurality of ethylenically unsaturated groups in an amount, in the range of 0.2 to 100% by weight of said monomer material, sufficient to produce polymer cross-linked to essential insolubility in any physical solvent with limitation of the special utility of the product to environments in which its noncross-linked polymer portion is essentially insoluble. Further, in accordance with the invention, means are also provided for aiding the fixation of the intrachromospheruloid pigment to the intraleucospheruloid by physical and/or chemical bonding.

We have found it to be essential to reduce the organic color pigment to an average particle size essentially below 0.2 micron, and preferably below 0.02 micron, which values are well below the conventional optimum pigmentary range, and that it is then possible to embed such ultra fine color particles within transparent polymer spheruloids of not more than 4 microns of average particle size to thereby obtain the new and useful coloration characteristics of the present invention. The reduction in organic pigment color size to such ultra fineness may be effected by micronizing in a liquid medium, e.g., in a ball-mill or preferably a sand-mill. The liquid medium may be an aqueous solution of dispersing agent preferably selected from those known to be suitable for effecting emulsion polymerization, or it may be a liquid body of monomer material with or without such dispersing agent, and with or without a volatile organic diluent miscible with said monomer, the monomer material being suitable for polymerization in the formation of the final product, or it may be a liquid organic diluent.

The pigmentary color starting material may be in any conveniently available form, either as wet presscake which may or may not have been subjected to such special treatment as acid pasting; or it may be a dry, conventional, essentially pure pigment composition commerically available, or it may have been preformed as a laked color as in the case of pigments from water soluble acid or azo dyes.

The polymerization of the monomer or monomers with the organic pigment color composition is carried out in the presence of sufficient emulsifier material to effect emulsion polymerization of the monomer material, and the nature and quantity of initiator and emulsifier, the degree of conversion of monomer to polymer, and the temperature of polymerization are selected to produce intrachromospheruloid pigment having primary particles of an average size not exceeding 4 microns so that the potential color strength available may be fully developed and retained in the finished product. The amount of dispersant or surface active agent employed in aqueous micronizing of the organic color pigment can be as low as is consistent with reduction of the particle size to the desired level and the maintenance of its size stability.

Functional groups may be introduced either into the initial polymeric pigment composition by selection of the monomer or monomers or may be later introduced by means of graft polymerization techniques or by selection of the emulsifier or emulsifiers, particularly those of a polymeric character, which become incorporated into the intrachromospheruloid pigment particles.

In the case where two or more organic color pigments are combined in the spheruloids to produce new and novel shades, such combinations do not show any of the dulling of hue characteristic of normal physical mixtures when two or more organic pigment colors are blended together, but retain the original brilliance of hue characteristic of the individual colors.

Furthermore intrachromospheruloid pigment compositions comprising two or more organic pigment colors either of similar or different hue when applied to their intended uses retain the true shade of the mixture with no tendency for separation into component pigment colors either during storage or in actual use.

We have also found it to be essential to reduce the inorganic leuco pigment material to an average particle size essentially below 0.2 micron and preferably of 0.2 to 0.1 micron diameter, which values are well below the optimum pigmentary range commercially available, and that it is then possible to embed such ultra fine inorganic leuco pigment particles within transparent polymer spheruloids insoluble in the environment of intended use, nonfusible at the temperature of intended use, and which differ in refractive index from that of the embeded leuco pigment and from the environment of intended use, and which are of not more than 4 microns average particle size, to thereby obtain the new and useful specular characteristics of the present invention. The reduction in organic leuco pigment size to such ultra fineness may be effected by micronizing in liquid medium, e.g. in a ball-mill or preferably a sand-mill. The liquid medium may again be an queous solution of dispersing agent preferably selected from those known to be suitable for effecting emulsion polymerization, or it may be a liquid body of monomer material with or without such dispersing agent, and with or without a volatile organic diluent miscible with said monomer, the monomer material being suitable for polymerization in the formation of the final product.

The inorganic leuco pigment starting material may be in any conveniently available form, either as wet presscake which may or may not have been subjected to such special treatment as is proprietary to the manufacturer, e.g. surface modification or formation into an aqueous paste; or it may be a dry, conventional essentially pure inorganic pigment composition commercially available, with or without such aforementioned surface modifications.

The polymerization of the monomer or monomers with the inorganic leuco pigment composition is carried out in the presence of sufficient emulsifier material to effect emulsion polymerization of the monomer material, and the nature and quantity of initiator and emulsifier, the degree of conversion of monomer to polymer, and the temperature of polymerization are selected to produce intraleucospheruloid pigment having primary particles of an average size not exceeding 4 microns so that the potential hiding powder and specular characteristics available may be fully developed and retained in the finished product. The necessary dispersant or surface active agent employed in aqueous micronizing of the inorganic leuco pigment material can be as low as is consistent with reduction of the particle size to the desired level and the maintenance of its size stability.

Functional groups may be introduced either into the initial intraleucospheruloid pigment composition by selection of the monomer or monomers or may be later introduced by means of graft polymerization techniques, or by selection of the emulsifier or emulsifiers, particularly those of a polymeric character, which become incorporated into the intraleucospheruloid pigment particles.

In the case where two or more inorganic leuco pigment materials are combined in the spheruloids to produce new and novel specular characteristics, such combinations do not show any loss of refractive index or other specular characteristics associated with normal physical mixtures when two or more inorganic leuco pigments are blended together, but retain the superior characteristics of the superior component to a marked degree.

The combination of the intrachromospheruloid and intraleucospheruloid pigments so provided is then effected in step (e) in aqueous medium, using the selected quantities of each. During this combining step, which by the process, may be accomplished by either chemical bonding of the constituent portions or by physical co-coagulation with the aid of a bonding agent, means may also be provided for aiding the fixation of the resulting intrachromospheruloid/intraleucospheruloid pigment composition to the environment of intended use by physical and/or chemical bonding.

Whether prepared by the preferred or less preferred embodiments the product may be recovered in step (e) in latex form, in presscake form, or in bulk-dried or in spray dried form and may be used in vehicles in which the polymer portion of the product is insoluble, and when, as above noted, the polymer portions of the product are cross-linked to essential insolubility in any physical solvent the products may be recovered in soft powdered form and/or be used in any suitable vehicle.

Thus, as just described, the polymer portion of the intrachromospheruloid/intraleucospheruloid pigment composition of applicants' invention is insoluble in the environment of intended use, and in the preferred practice of the invention is cross-linked to insolubility in all physical solvents, although in certain instances such cross-linking may be omitted.

BRIEF DESCRIPTION OF DRAWINGS

In the accompanying drawings illustrative of preferred embodiments of this invention:

FIG. 3 is a process flow diagram of the procedure for combining the intrachromospheruloid and intraleucospheruloid pigments produced in FIGS. 1 and 2.

FIGS. 4, 5, 6 and 7 are detail flow diagrams of processes for converting the intrachromospheruloid/intraleucospheruloid pigment composition produced in FIG. 3 into intrachromospheruloid/intraleucospheruloid pigment composition in other forms such as wet presscake or dry powder.

GENERAL PROCEDURE

Figure 1:
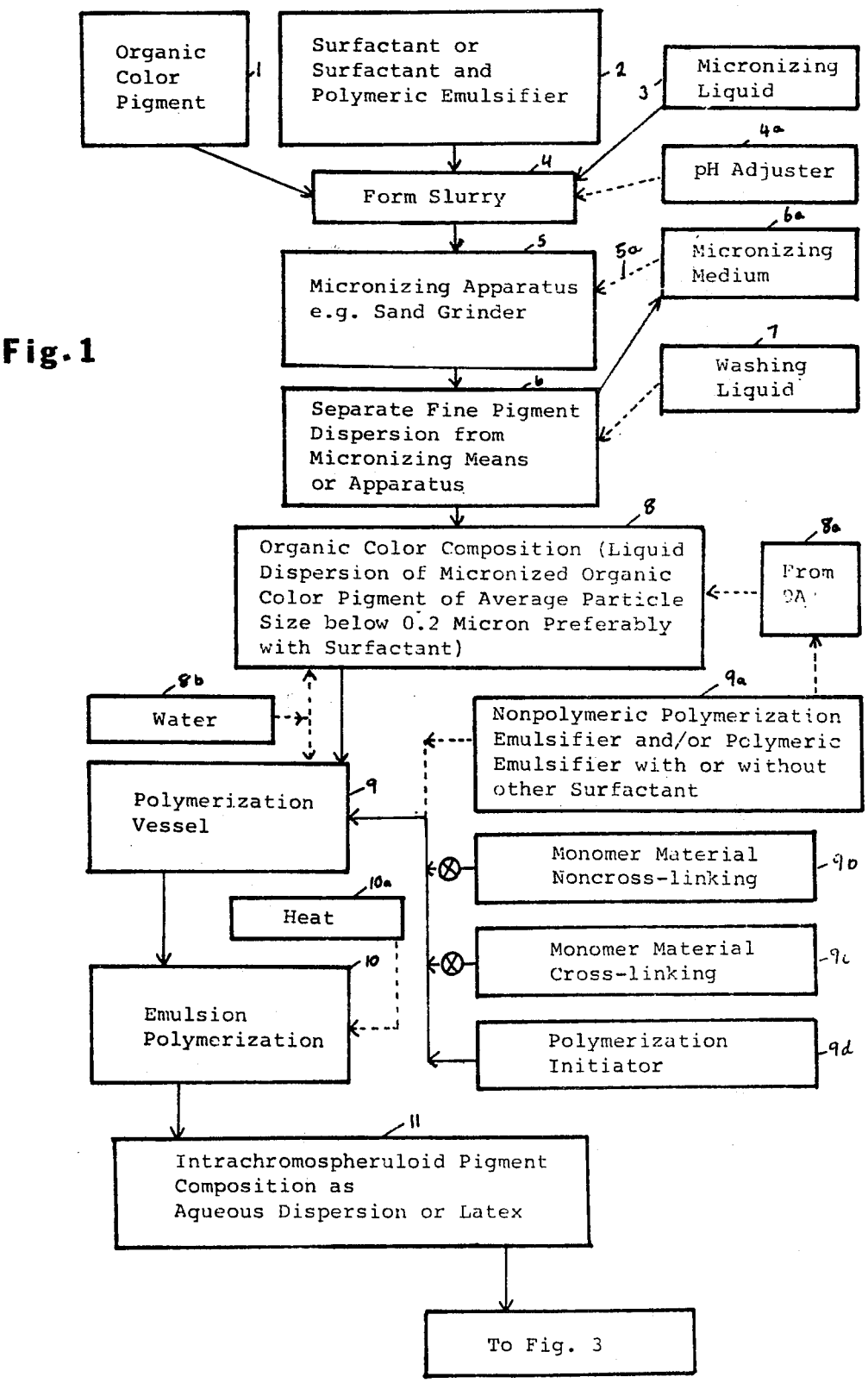
FIG. 1 is a process flow diagram of the procedure for production of intrachromospheruloid pigments in latex and/or other forms.

The general procedures for preparing intrachromospheruloid/intraleucospheruloid pigment compositions in accordance with the process of the invention, are illustrated in the drawings. In these procedures (FIG. 1) (a) an organic color pigment composition 8 is first provided consisting essentially of liquid having dispersed therein micronized organic color pigment essentially insoluble in the said liquid. When an aqueous micronizing liquid 3 is employed, it comprises surface active agent material 2 which stabilizes the dispersion of the micronized color pigment in said aqueous phase, in which the organic color pigment is so finely divided as to have an average particle size below the usual pigmentary range. As shown in FIG. 1 the micronizing may be accomplished by charging to a micronizing apparatus 5, e.g. a ball-mill or preferably a sand grinder, a slurry 4, of organic color pigment material 1 with sufficient water 3 to facilitate the grinding and sufficient surfactant or surface active agent material 2 to stabilize the dispersion to be produced. The charge of slurry 4 is then micronized as at 5 until the pigment particles are so finely divided that the average particulate entities thereof have an average particle size of less than 0.2 micron, and preferably of less than 0.02 micron. In this aqueous micronizing procedure the ratio of organic color pigment material to water to obtain efficient grinding should be in the range of 20:80 parts by weight or even more. Applicable ratios are subject to variation depending on the particular organic pigment material and/or surface active agent material concerned, are not highly critical, and may be optimized empirically.

The separated organic color material composition 8, with or without added surface active agent material 8a (which may be provided at this stage if desired, especially if the dispersion is to be stored for a substantial time before further processing) is then ready for the next step of the procedure.

When a nonaqueous micronizing liquid 3 is employed, the present invention contemplates use as such liquid of a part of all of the ethylenically unsaturated monomer material to be employed in the polymerization step 10 with or without added volatile organic solvent miscible with the monomer material and removable prior to the polymerization step. In such instance the amount of surface active agent material 2 employed in the micronizing step 5 can be reduced to zero, or a part or all of the surface active agent or emulsifier to be used in the emulsion polymerization may be present during the micronizing step. Generally the same considerations as to proportions of liquids to solids and empirical practices apply whether the medium be aqueous or nonaqueous. Obviously, when micronizing in flammable material the temperature and the conditions of grinding, such as maintenance of an inert atmosphere and use of explosion-proof electrical equipment, must be controlled in the interests of safety. When it is desirable to employ a wash liquid 7 for removing fine pigment dispersion from the micronizing medium, it is desirable to use a washing liquid which is employed as a component in the polymerization 10. When such a nonaqueous micronizing system is employed, the micronized color pigment material 6 is then emulsified in 8 with the aid of water 8b and surface active agent material 8a capable of supporting emulsion polymerization to form an organic color composition 8 containing therein sufficient organic color pigment, surface active agent material, monomer material and water to form an emulsion polymerization composition that is charged to the polymerization vessel 9. Should it be more convenient the necessary water 8b and emulsifier material 8a may be charged directly to the polymerization vessel 9 and the nonaqueous organic color composition 8 added thereafter.

Preferably in either of the above procedures the degree of micronization is monitored during step 5 by microscopic examination of samples of the micronized slurry to determine when the necessary organic color pigment particle size has been attained, at which time the organic color composition 8 is separated from the micronizing medium 6a, e.g. sand, which may be recycled as at 5a to the micronizing apparatus employed to carry out the micronizing step 5.

In the next step the finely divided pigment entities in said composition 8 are converted into intrachromospheruloid pigment by forming about said organic color pigment entities bodies of essentially transparent polymer of not over 4 microns in particle size diameter. To accomplish this step the organic color pigment composition 8 is charged to a polymerization vessel 9 with sufficient surface active agent material 9a (additional to that supplied at 2 or at 8a), if necessary, to provide a total content of surface active agent material appropriate for the emulsion polymerization of monomer material, e.g. 9b with the aid of an emulsion polymerization initiator 9d, which materials are also charged to the polymerization vessel. Sufficient monomer material is charged so that when polymerized to the desired conversion, usually 100% conversion, the ratio of the organic pigment content to the polymer content of the intrachromospheruloid pigment will be in the range of 1:100 to 20:1 (preferably 1:10 to 4:10). As indicated at 10a heat may be supplied to expedite the polymerization 10, as is well known to those skilled in the emulsion polymerization art. By such procedures the conversion step (b) produces, from the micronized organic pigment material and monomer material supplied, an essentially stable aqueous dispersion, i.e. latex, of intrachromospheruloid pigment 11, for use as shown in FIG. 3.

Figure 2:
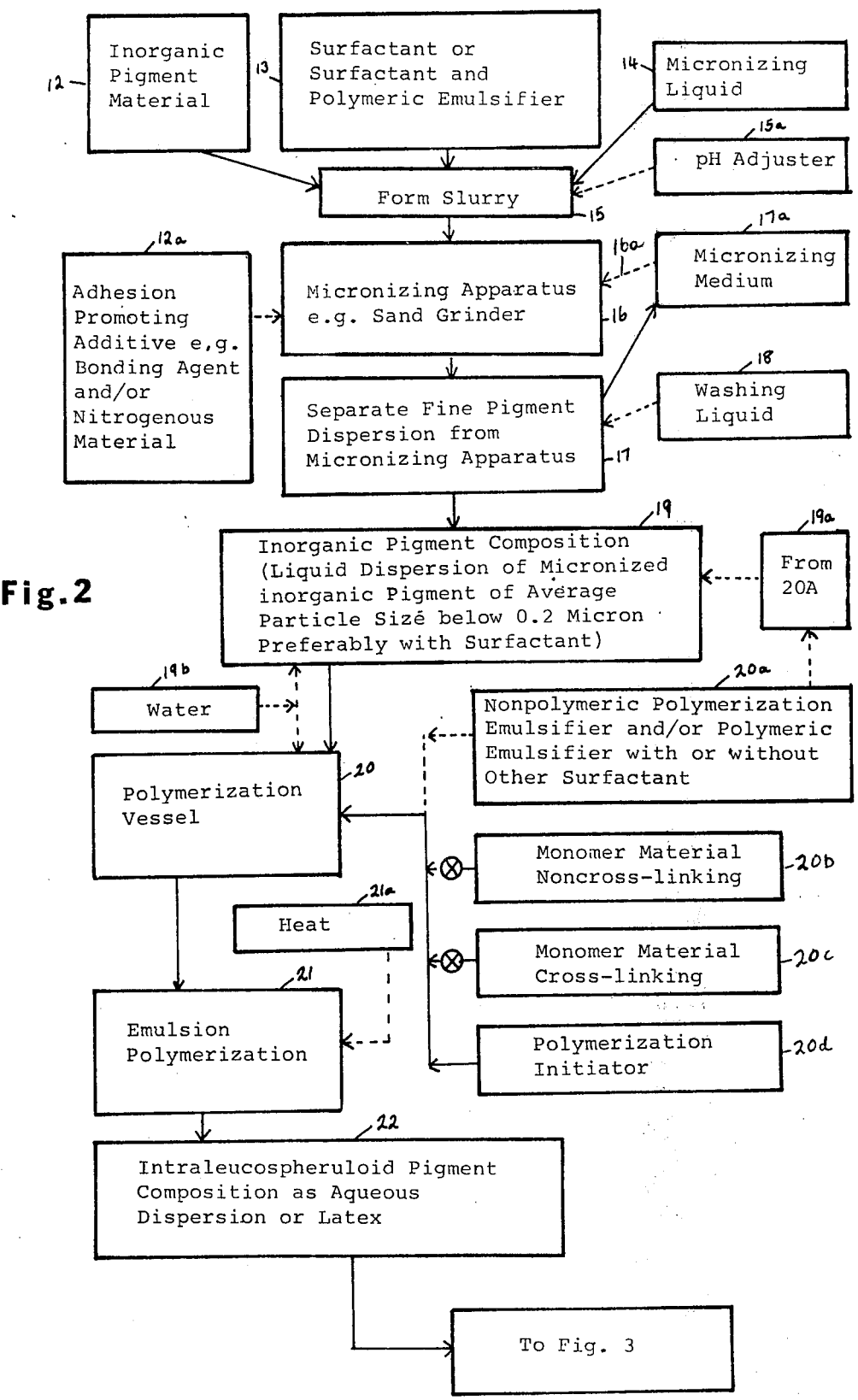
FIG. 2 is a process flow diagram of the procedure for production of intraleucospheruloid pigments in latex and/or other forms.

In FIG. 2, (a) an inorganic pigment composition 19 is first provided consisting essentially of liquid having dispersed therein micronized inorganic pigment essentially insoluble in the said liquid.

When an aqueous micronizing liquid 14 is employed, it comprises surface active agent material 13 which stabilizes the dispersion of the micronized inorganic pigment in said aqueous phase in which the inorganic pigment is so finely divided as to have an average particle size below 0.2 micron. As shown in FIG. 2 the micronizing may be accomplished by charging to a micronizing apparatus 16, e.g. a ball mill or preferably a sand grinder a slurry 15, or inorganic pigment material 12 with sufficient water 14 to facilitate the grinding and sufficient surfactant or surface active agent material 13 to stabilize the dispersion to be produced. The charge of slurry 15 is then micronized as at 16 until the pigment particles are so finely divided that the average particulate entities thereof have an average particle size of less than 0.2 micron, and preferably to between 0.2 and 0.1 micron. In this aqueous micronizing procedure the ratio of inorganic pigment material to water to obtain efficient grinding should be in the range of 20:80 to 30:70 and the ratio of surface active agent material to water should be in the range of 5:95 to 20:80 parts by weight or even more. Applicable ratios are subject to variation depending on the particular inorganic pigment material and/or surface active agent material concerned, are not highly critical, and may be optimized empirically.

The separated inorganic pigment material composition 19, with or without added surface active agent material 19a (which may be provided at this stage if desired, especially if the dispersion is to be stored for a substantial time before further processing) is then ready for the next step of the procedure.

When a nonaqueous micronizing liquid 14 is employed, the present invention contemplates use as such liquid of a part of all of the ethylenically unsaturated monomer material to be employed in the polymerization step 21 with or without added organic solvent miscible with the monomer material. In such instance the amount of surface active agent material 13 employed in the micronizing step 16 can be reduced to zero, or a part or all of the surface active agent or emulsifier to be used in the emulsion polymerization may be present during the micronizing step. Generally the step considerations as to proportions of liquids to solids and empirical practices apply whether the medium be aqueous or nonaqueous. Obviously, when micronizing in flammable material the temperature and the conditions of grinding, such as maintenance of an inert atmosphere and used of explosion-proof electrical equipment, must be controlled in the interests of safety. When it is desirable to employ a wash liquid 18 for removing fine pigment dispersion from the micronizing medium, it is desirable to use a washing liquid which is employed as a component in the polymerization 21. When such nonaqueous micronizing system is employed the micronized inorganic pigment material 17 is then emulsified in 19 with the aid of water 19b and surface active agent material 19a capable of supporting emulsion polymerization to form an inorganic pigment composition 19 containing therein sufficient inorganic pigment material, surface active agent material, monomer material and water to form an emulsion polymerization composition which is charged to the polymerization vessel 20. Should it be more convenient the necessary water 19b and and emulsifier material 19a may be charged directly to the polymerization vessel 20 and the nonaqueous inorganic pigment composition 19 added thereafter.

Preferably in either of the above procedures the degree of micronization is monitored during step 16 by microscopic examination of samples of the micronized slurry to determine when the necessary inorganic pigment particle size has been obtained, at which time the inorganic pigment composition 19 is separated from the micronizing medium 17a, e.g. sand, which may be recycled as at 16a to the micronizing apparatus employed to carry out the micronizing step 16.

During this micronizing step 16 there may also be incorporated if desired additional adhesion or bonding agent components such as water soluble alkali metal silicates, aminoplasts, phenoplasts, and their components, water soluble and/or dispersible polymers and the like and/or nitrogenous materials, and/or monomer material, should it be desired to intimately admix the same during the micronizing step to render said inorganic pigment composition more oleophilic in nature.

In the next step the finely divided pigment entities in said composition 19 are converted into intraleucospheruloid pigment by forming about said inorganic pigment entities bodies of essentially transparent polymer of not over 4 microns in particle size diameter. To accomplish this step the inorganic pigment composition 19 is charged to a polymerization vessel 20 with sufficient surface active agent material 20a (additional to that supplied at 13 or at 19a), if necessary, to provide a total content of surface active agent material appropriate for the emulsion polymerization or monomer material, e.g. 20b, with the aid of an emulsion polymerization initiator 20d, which materials are also charged to the polymerization vessel. Sufficient monomer material is charged so that when polymerized to the desired conversion, usually 100% conversion, the ratio of the inorganic pigment content to the polymer content of the intraleucospheruloid pigment will be in the range of 1:100 to 20:1 (preferably 1:10 to 4:10). As indicated at 21a, heat may be supplied to expedite the polymerization 21, as is well known to those skilled in the emulsion polymerization art.

By such procedures the conversion step (21) produces from the micronized inorganic pigment material and monomer material supplied, as essentially stable aqueous dispersion, i.e. latex, of intraleucospheruloid pigment 22 for combination in FIG. 3 with the intrachromospheruloid pigment material provided in FIG. 1.

As shown in FIG. 3, the intrachromospheruloid pigment latex or dispersion 11 is combined with the intraleucospheruloid pigment latex or dispersion 22 in a mixing vessel 27. The proportion of said intrachromospheruloid pigment 11 to said intraleucospheruloid pigment 22 may be varied as described depending on the required hue or covering power desired in the finished product.

Also, depending on the chemical nature of the components, the intrachromospheruloid/intraleucospheruloid composition so formed may be withdrawn as an aqueous slurry 28 for further processing as shown in FIG. 4 through FIG. 7, e.g. when the components are self precipitating as in mixtures of anionic and cationic components; or further treatments and additives may be introduced into the mixing vessel 27 when it is either necessary to effect co precipitation or introduce functional chemical groups or compositions therein.

Thus as shown, water 23 may be added to the mixing vessel 27 either before or during the admission of either or both of the intrachromospheruloid pigment composition 11 or the intraleucospheruloid pigment composition 22 should such dilution become necessary to ensure efficient mixing therein; or a pigment bonding agent 24, designed to strengthen the affinity or adhesion of the intrachromospheruloid pigment composition 11 to the intraleucospheruloid pigment composition 22 may be added. Such bonding agents will of course vary depending not only on the chemical nature of the said components 11 and 22 but also on the physical and chemical characteristics desired in the product 28, and with this in mind may include both inorganic and organic substances and compounds such as water soluble silicates, titanium and zirconium compounds of organic material such as water soluble or dispersible condensation resins such as aminoplasts or phenoplasts or the components thereof which are subsequently reacted in situ; an organo silane compound such as the amino silane available from Dow Chemical Co. under the trade name Z6020 Silane may be used; or again aqueous solution or dispersions of organic polymers, oleophilic amines, oleophilic imines, amine carboxylates, oleophilic quaternary ammonium compounds, water soluble polyamines, water soluble imines and combinations thereof may be also used as shown in 25 and 26.

The intrachromospheruloid/intraleucospheruloid pigment composition in aqueous slurry with or without said additional bonding and modifying additives 23 through 26 is then withdrawn either for use as an aqueous slurry 28a or for further processing to produce intrachromospheruloid/intraleucospheruloid pigment in other forms illustrated in FIGS. 4 to 7.

For example as shown in FIG. 4, the intrachromospheruloid/intraleucospheruloid pigment slurry 28 may be converted to a dry powdered product 28c by drying, preferably spray drying, as shown at 28b. When spray drying is employed the dispersion or slurry being dried may be reduced to a very fine spray in order to obtain a finely divided spray dried product without additional processing.

Alternatively when the polymer of both the intrachromospheruloid and intraleucospheruloid is crosslinked to essential insolubility in all physical solvents, the need for such a spray drying procedure may be reduced as shown in FIG. 5 by intimately mixing with said intrachromospheruloid/intraleucospheruloid pigment slurry 28, as at 29a, soft powdering additive(s) 29, with or without the aid of heat 29d, and drying this mixture, which will produce the intrachromospheruloid/intraleucospheruloid pigment in dried soft powder form 29c, requiring little or no mechanical attrition to constitute a useful powdered product. These dried intrachromospheruloid/intraleucospheruloid pigment products 28c and 29c are more readily shipped and stored than the intrachromospheruloid/intraleucospheruloid pigment slurry and may be employed for the same purposes as above set forth in connection with intrachromospheruloid/intraleucospheruloid pigment slurry 28a.

As shown in FIG. 6 instead of drying the intrachromospheruloid/intraleucospheruloid pigment slurry directly as in FIGS. 4 and 5, the intrachromospheruloid/intraleucospheruloid pigment slurry or dispersion may be coagulated as at 30a with the aid of a coagulant 30 with or without the aid of heat 30d, and the coagulum of intrachromospheruloid/intraleucospheruloid pigment may then be separated from the serum as at 30b e.g. by centrifuging or filtering and washing, to produce the intrachromospheruloid/intraleucospheruloid pigment in wet presscake form 30c. Such wet presscake form has advantages for certain uses where a product is required that is substantially free of surface active agent material and excess water; e.g. as in the flushed color industry and may also be used for the same purposes as the intrachromospheruloid/intraleucospheruloid pigment slurry or dispersion 28a, or the dried surface active agent material-containing intrachromospheruloid/intraleucospheruloid pigment powders 28c and 29c. The coagulated intraleucospheruloid pigment material 30a, which may have its characteristics modified by the coagulant and/or any other modifier which may be present therein, can itself be dried as indicated by the dotted arrow leading from 30a to 30e in FIG. 6, or where a dry intrachromospheruloid/intraleucospheruloid pigment essentially free of surface active agent material and/or coagulant material residues is preferred, the intrachromospheruloid/intraleucospheruloid pigment presscake 30c may be dried as indicated by the solid arrow leading from 30c to 30e for producing such form of product 30f.

The procedure of FIG. 6 may be modified as shown in FIG. 7, by adding to the intrachromospheruloid/intraleucospheruloid pigment slurry or dispersion 28 when the polymer portion of said spheruloids is crosslinked to essential insolubility in all physical solvents, not only coagulant material 31, but also soft powdering additive(s) 31d, which may be introduced either before or after the coagulation is effected at 31a (with or without the aid of heat 31e). The so modified coagulated intrachromospheruloid/intraleucospheruloid pigment slurry may then be treated in the same manner as described in connection with items 30b, 30c, 30e and 30f as indicated by the respectively corresponding items 31b, 31c, 31f and 31g in FIG. 7 and the modified products 31c and 31g include the soft powder advantages described in connection with FIG. 5.

Such dry intrachromospheruloid/intraleucospheruloid pigments are especially suitable for incorporation into nonaqueous systems, especially oil based paint and printing inks and the opacifying and hue modification of thermoplastic compounds because of their ease of dispersibility, insolubility and infusibility therein.

For clarity in the following more detailed description and exemplification of the invention certain terms will be employed, the meaning of which we here set forth:

(1) ORGANIC COLOR PIGMENTS

The term "organic color pigments" as used herein designates the organic pigmentary materials which are colored as distinguished from water white or opaque white materials.

The invention is generally applicable to such organic color pigments and is not limited to the use of any particular organic color pigment. As illustrative but not restrictive of those that may be used and improved by the invention are those organic color pigments set out in "The Chemistry of Synthetic Dyes" by K. Venkataraman, Vol. V, especially Section 6, pages 314–474, Academic Press, New York, N. Y., (1971), herein incorporated by reference, which include pigments of the well known azo class exemplified by the acetoacetarylide azo, the pyrazalone azo, the α-naphthol azo, the 2-hydroxy-3-naphthoic acid azo, the 2-hydroxy-3-naphtharylide azo and the naphtholsulfonic acid azo pigments; the triphenylmethane pigments and related pigmentary compounds; the phthalocyanine pigments; the anthraquinone, pigmentary compounds; the phthalocyanine pigments; the anthraquinone, indigoid and related pigments; the quinacridone pigments; the dioxazine pigments; the azemethine pigments; the fluorotubine pigments; the naphthindolizinedione pigments; and other miscellaneous organic pigmentary compositions; and those set out in "The Chemistry of Synthetic Dyes and Pigments" by Herbert A. Lubs, Reinhold, New York (1955), herein incorporated by reference, and in "The Color Index", 3rd Edition (1973) published jointly by the "British Society of Dyers and Colourists" and the "American Association of Textile Chemists and Colorists", also herein incorporated by reference. Typical representatives of these organic color pigments are set forth in the examples herein by way of illustration.

(2) INORGANIC PIGMENTS

The terms "inorganic pigments" and "inorganic pigment material" or "leucopigment" as used herein designates the inorganic pigmentary materials both natural and manufactured in origin which are usually described as white or "opaque white pigments". It also includes for the purposes herein the semi opaque white pigments or "transparent white pigments" or "extender or filler pigments."

The invention is generally applicable to such inorganic pigments and is not limited to the use of any particular inorganic pigments or pigments. As illustrated but not restrictive of those that may be used and improved by this invention are the opaque white and transparent white pigments such as are referred to in the Chemical Rubber Handbook 55th edition 1974–1975; herein incorporated by reference; in the 3rd edition (1973) of "The Color index", Volume 3 published jointly by the "British Society of Dyers and Colourists" and the "American Association of Textile Chemists and Colorists", herein incorporated by reference; and in Volume 1 of "The Pigment Handbook", published by John Wiley and Sons 1973, edited by Temple C. Patton, also herein incorporated by reference.

Among the most useful of the inorganic pigments, but not restrictively, may be listed the siliceous pigments including the natural silica pigments, the precipitated silica pigments, the pyrogenic silica pigments, the alkaline-earth silicate pigments, the aluminum silicate pigments, the zinc silicate pigments, the zirconium silicate pigments; the titanium dioxide pigments and pigment compositions; alkaline-earth carbonate and sulfate pigments, the alumina and hydrated aluminum oxide pigments, zirconium oxide pigments and combinations of any two or more of such pigments. Typical representatives of these inorganic pigments are set forth in the examples by way of illustration.

(3) SURFACE ACTIVE AGENT MATERIAL

Among the dispersing and/or emulsifying agents available for use as surface active agents herein we have found that the only essential criterion for such agent is that it, or it in combination with one or more additional dispersants and/or emulsifiers which may be used, should be capable of supporting emulsion polymerization. Having regard to this criterion surface active agents or as they are more generally classified "surfactants" (which encompasses both grinding, wetting and emulsifying agents) may be either anionic, nonionic, cationic or amphoteric; of either singular molecular structure of polymeric nature; it being understood that when two or more of such agents are employed together they must be compatible with each other. For example non-polymeric or polymeric anionic surfactants may be combined with each other and with nonionic and/or amphoteric surfactants, polymeric or nonpolymeric; and non-polymeric or polymeric cationic surfactants may be combined with each other or with nonionic and/or amphoteric surfactants; and amphoteric and/or nonionic surfactants may be combined with each other. Thus is is possible to use a very wide range of commercially available surface active agents for achieving the degrees of grinding, the emulsion polymerization, and the production of intrachromospheruloid and intraleucospheruloid pigments as latices suitable for particular uses, as hereinafter exemplified, comprehensive listings of which are set out in the treatises "Detergents and Emulsifiers 1974 Annual" by John W. McCutcheon, published by John W. McCutcheon, Inc., Morriston, N.J., especially under the headings of Emulsifiers Suitable for Emulsion Polymerization etc., and "Surface Active Agents and Detergents" by Anthony N. Schwartz et al., Interscience Publishers, Inc., New York (1958), Vol. 2, pages 153–172, each of which is herein incorporated by reference.

Among the commercially available surfactants may be mentioned the anionic surfactants, e.g. carboxylic acids and their derivatives, sulfonic esters, alkanesulfonates, alkylaryl sulfonates and phosphate esters; the nonionic surfactants e.g. polyethenoxy ethers of alkylphenols, polyethenoxy ethers of alcohols and mercaptans, difunctional and poly-functional polyethenoxy esters, miscellaneous polyethenoxy esters, polyethenoxy compounds with amide and miscellaneous linkages and various polyhydroxy compounds; the cationic surfactants, e.g the straight chain alkyl ammonium compounds, the cyclic alkylammonium compounds, the olefin-derived compounds, and the quaternary compounds derived from the same; the amphoteric surfactants e.g. those derived from betaines and phenolic solutions; and the polymeric surface active agents set out in the said McCutcheon and Schwartz et al treatises. Typical examples of representative surfactants of these classes and combinations thereof are set forth in the Examples hereinafter, it being understood that said Examples are but illustrative and not restrictive of the invention, e.g. the recently available fluorocarbon surfactants have also been found effective, especially when used in small proportions with other less expensive surfactants, for both the micronizing steps and the emulsion polymerization steps. Typical of these fluorocarbon surfactants are the "Zonyl" trae-marked fluorocarbon surfactants of the DuPont Company, such as Zonyl A or P (anionic), Zonyl C (cationic), Zonyl N (nonionic), and Zonyl B (amphoteric).

(4) MICRONIZING

The term "micronizing" as used herein connotes the physical reduction in particle size in a liquid medium of the organic or inorganic pigment materials by means of an appropriate grinding system, e.g. a ball mill or a sand mill, to the particle size desired in the step concerned, with the aid of a surface active system if needed, to assist the grinding and inhibit agglomeration of the micronized particles into aggregate particles of larger size. Both all mills and sand mills or sand grinders are well known to the pigment art and commercially available. The balls in the case of a ball mill, or the sand or like grinding material in the case of the sand mill, are herein termed micronizing media.

(5) MONOMER MATERIALS

The monomer materials which may be used in practicing the present invention are the monomer compounds containing and emulsion polymerizable through one or more ethylenically unsaturated $>C=C<$ groups to form homopolymers, copolymers or grafted polymers to constitute the essentially transparent particles formed about the individual pigment entities herein.

Such compounds containing and polymerizable through a single one of such groups produce linear polymers unless copolymerizable with cross-linking monomer, i.e. monomer containing a plurality of such groups, which category for the purpose of this invention, includes not only polyvinyl, polyalkyi and vinylallyl monomers but also the drying oil substances emulsion copolymerizable with other ethylenically unsaturated compounds.

The polymer bodies surrounding the pigment particles in accordance with this invention preferably are cross-linked to insolubility in all physical solvents, but may be insoluble only in the intended invironment of use. With these criteria for guidance, the monomer materials and emulsion polymerization procedures employable may be selected by one skilled in the art from any of those available. The fact of cross-linking to insolubility in all physical solvents enhances the utility in that it also renders the crosslinked particles infusible thus making the cross-linked material usable in any type of thermoplastic material.

Among the mono-ethylenically unsaturated monomers available for preparation of the improved pigment composition are monovinyl aromatic compounds such as styrene, the methyl styrenes, the ethyl sytrenes, the dimethyl styrenes, the diethyl styrenes, the isopropyl styrenes and mixed alkyl styrenes; nuclear substituted vinyl aryl compounds where the substitution is alkyl, aryl alkyl, aralkyl, cycloalkyl, alkoxy, aryloxy, chloro, fluoro, chloromethyl, fluoromethyl and trifluoromethyl nuclear derivatives; halogenated derivatives of these various aromatic vinyl compounds such as the mono and dichloro styrenes; the alkyl substituted mono and dichloro sytrenes; the vinyl napthalenes, e.g. methyl vinyl naphthalene and their halogenated derivatives; the vinyl aryl acids and vinyl alkyl acids such as acrylic acid and the alpha-alkyl substituted acrylic acids such as methacrylic acid, and esters of such acids as glycidyl, methyl, ethyl, propyl, butyl, isobutyl and other esters of aliphatic alcohols; the amides of acrylic and methacrylic acid and derivatives thereof such as the methcrylamides, acrylamides, N-methylacrylamides, N-N-diethylacrylamide, N-ethylmethacrylamide, N-N-dimethylmethacrylamide, etc.; the nitriles such as acrylonitrile, methacrylonitrile, ethylacrylonitrile, chloroacrylonitrile and other nitriles; the alkyl esters of alpha-ethylenic aliphatic dicarboxylic acids such as diethyl fumarate and diethyl-chloro maleate; the unsaturated ketones, methyl vinyl ketone and methyl isopropenyl ketone; the vinyl pyridines; the vinyl quinolines; vinyl furans; viny carbazoles, the esters of vinyl alcohols such as vinyl acetate; acetylamino substituted acrylic methacrylic acids, and their esters, methyl, ethyl, propyl- and the like such as α-acetaminoacrylate and the α-n-butyraminoacrylates, etc.; the ethers of oleofinic alcohols especially the ethers of vinyl and allyl type alcohols such as vinyl ethyl ether, vinyl butyl ether, vinyl tolyl ether, divinyl ether, methyl isopropenyl ether, methallyl ethyl ether; the unsaturated aldehydes such as acrolein and methacrolein and the like; the allyl and vinyl nitrogen ring compounds such as triallylcyanurate; copolymerizable alkenyl chlorides including methallyl chloride, allyl chloride, vinyl trichloride, vinylidene chloride, 1-chloro-1-fluoro ethylene and 4-chlorobutene-1; and the vinylidines.

Among the cross-linking or polyethylenically unsaturated monomers which may be used alone or in combination with other emulsion polymerizable ethylenically unsaturated compounds, are the polyvinyl, polyallyl and vinyl-allyl compounds such as polyvinyl aromatic compounds, for example divinylbenzene, divinyltoluene, divinylxyline, divinylethylbenzene, trivinylbenzene, divinylnapthalene, divinylmethylnaphthalenes; the vinyl esters, allyl esters and vinyl allyl esters of carboxylic and polycarboxylic acids including polymerizable ester monomers such as diallyl maleate, vinylcrotonate, allyl methacrylate, allyl acrylate, ethylene glycol dimethacrylate, divinylsuccinate, divinyladipate, vinylacrylate, vinylmethacrylate.

The copolymerizable "drying oils" which may be used as cross-linking agents include the unsaturated vegetable oils and the unsaturated fish oils which oils are capable of forming films by oxidation on exposure to air and further includes these oils in their raw state, in bodied form and/or otherwise modified, as by air blowing. The term "drying oil substances" includes (1) the drying oils, especially those containing conjugated unsaturation e.g., tung oil, oiticica oil, isano oil, conjugated linseed oil, conjugated soya bean oils, fish oil, etc., (2) the air blown or bodied drying oils, whether from conjugated or non-conjugated drying oiks and whether bodied by heat and/or catalytically, (3) the fatty acids including their dimers, trimers and tetramers derived from such drying or modified drying oils.

In preparing modified improved intrachromospheruloid and/or intraleucospheruloid pigment compositions by graft polymerization techniques, active sites may be provided by grafting with butadiene, isoprene, piperyline, methyl pentadiene and/or other hydrocarbon dienes and also the polar dienes such as chloroprene and cyanobutadiene.

(6) POLYMERIZATION INITIATOR

Examples of suitable emulsion polymerization catalysts or initiators that may be used include water soluble catalysts such as the perborates, persulfates and perchlorates of potassium sodium and ammonia; which may be used with or without small amounts of heavy metal salts such as those of iron, cobalt, etc.; with or without a reducing agent such as sodium bisulfite or metabisulfite, or the catalyst may be an inorganic peroxide such as barium peroxide, sodium peroxide, hydrogen peroxide; an aliphatic acyl peroxide such as acetyl peroxide, lauryl peroxide, stearyl peroxide; an aromatic acyl peroxide such as benzoyl peroxide, or phthaloyl peroxide; a mixed peroxide such as acetyl benzoyl peroxide, acetyl stearyl peroxide; organic aliphatic and aromatic azo compounds such as azobisisobutyronitrile and certain azo dye structures; or it may be a hydroperoxide such as cumene hydroperoxide or diisopropylbenzene hydroperoxide which is often used with a reducing agent such as tetraethylene pentamine, and ferrous sulfate as a source of iron with sodium or potassium pyrophosphate to complex the iron.

Heat or radiation may also serve to initiate or facilitate emulsion polymerization.

A mercaptan such as dodecylmercaptan may sometimes be used in small amounts as a polymerization initiator, whereas in larger amounts it serves as a polymerization modifier; or aluminum salts such as the halides; organic and inorganic acids; metal compounds of the unsaturated acids such as cobalt and manganese resinates, linoleates and maleates may be used. The catalyst system chosen is only important insofar as it affects the rate of the polymerization reaction, always taking into account that the system chosen must not react unfavorably with the pigment or pigments being used.

(7) pH ADJUSTMENT

By pH adjustment is meant the addition of either acid or base to adjust the pH for micronizing to within the desired range which may be most efficient for the purpose in question, e.g. to be compatible with the pigmentary, monomeric, and/or surfactant materials being used. Preferred additives are the organic acids such as acetic, formic, hydroxyacetic to lower the pH, and ammonium hydroxide to raise the pH. Inorganic acids and/or bases may be used provided they do not form objectionable amounts of salts which would interfere with the process or attack the equipment being used.

(8) POLYMERIZATION VESSEL

By polymerization vessel is meant any suitable vessel equipped with the necessary mechanical stirrer, temperature controls, and apertures for addition of reactants prior and during the polymerization step, constructed of suitable materials such as stainless steel or preferably glass lined to avoid contamination of the polymerization ingredients.

(9) EMULSION POLYMERIZATION

By the term emulsion polymerization is meant the polymerization in aqueous medium of polymerizable ethylenically unsaturated monomer or monomers, linear or cross-linking in nature, in such a manner that the polymer formed is a latex.

(10) INTRACHROMOSPHERULOID PIGMENT

The term "intrachromospheruloid pigment" as used herein designates spheruloids of essentially transparent polymer material, preferably cross-linked to essential insolubility in all physical solvents, and of an average particle size of not more than 4 microns, having embedded therein still smaller particles of organic color pigment. The transparent spheruloids of preferably cross-linked polymer, in any medium in which they are insoluble, preserve the attained particle size of the embedded organic color pigment material and enhance the hue and apparent strength of the same, thus providing a new and useful organic color pigment composition.

(11) INTRALEUCOSPHERULOID PIGMENT

The term "intraleucospheruloid pigment" as used herein designates spheruloids of essentially transparent polymer material, preferably cross-linked to essential insolubility in all physical solvents, and of an average particle size of not more than 4 microns, having embedded therein still smaller particles of inorganic leuco pigment. The transparent spheruloids of preferably cross-linked polymer, in any medium in which they are insoluble, preserve the attained particle size of the embedded inorganic pigment material and enhance the specular and refractive characteristics of the same, thus providing a new and useful inorganic pigment composition.

(12) LATEX

By the term latex is meant the aqueous dispersion of the intrachromospheruloid or intraleucospheruloid pigment composition in which the intrachromospheruloid or intraleucospheruloid pigment particles are so small that they are essentially nonsettling.

(13) SOFT POWDERING AGENT(S)

The term soft powdering agent(s) or additive(s) as used herein connotes materials selected from the class consisting of aliphatic, cycloaliphatic and aromatic hydrocarbons and their alcohols having boiling points between 90° C. and 200° C. preferably the predominantly aliphatic hydrocarbon solvents of this class such as Solvent Naphtha, and Stoddard Solvent. Naphtha Solvent, or Solvent Naphtha is a mixture of low boiling hydrocarbons having a boiling point range of 90°-165° C. obtained in the distillation of coal tar, petroleum or shale oil, and may contain appreciable portions of benzene or its homologues. Stoddard Solvent is a petroleum distillate with a minimum flash point of 100° F., 90% distillable at 375° F. with an end point of 410° F.

In accordance with this invention, said hydrocarbon materials are preferably applied in conjunction with an oil soluble surface active agent. The oil-soluble surface active agent is selected from that class of materials extensively defined by Schwartz, Perry and Berch in their book "Surface Active Agents and Detergents", Vol. II, Interscience Publishers, Inc., New York (1958), especially at pages 244–247 and pages 597–605, herein incorporated by reference. Such useful surface active agents include the dialkyl sulfosuccinates, the mahogany sulfonates, long chain (16-18 carbon atoms) alkyl aromatic sulfonates, dialkyl naphthalene sulfonic acids, esters of higher fatty acids, higher amine salts of naphthalene sulfonic acids, lanolin, lanolin fatty acids, naphthenic acids and their salts, glycol ethers, acyclic alcohols and keto alcohols, fatty alkylol amides and the sorbitan and polyethenoxy sorbitan nonionics.

(14) SOFT POWDER PRODUCTS

The term "soft powder" or "soft powdered" intrachromospheruloid/intraleucospheruloid pigment as applied to products producible by the present invention connotes the physical characteristic resulting from the treatment herein disclosed of the aqueously wet, never previously dried, cross-linked insoluble intrachromospheruloid/intraleucospheruloid pigment with the aforesaid soft powdering agents before drying the same to a dry pigment product, i.e. the characteristic that the soft powdered dried product has such a soft form that it is in, or readily reduced to, a fine soft powder without any extended attrition, thereby being more readily dispersible in any medium than the same product not so treated. The mechanism accounting for this characteristic is not clearly understood, but it is believed that the hydrocarbon components of the soft powdering additives, which are carried on to the surfaces of the intrachromospheruloid/intraleucospheruloid pigment particles by means of the oil soluble surfactant components thereof subsequently removed in the wash water, inhibit hydrogen bridging between the intrachromospheruloid/intraleucospheruloid pigment particles by occupying the sites at which such could occur until after the elimination from the system of the aqueous phase, and thereafter are substantially removable at a more elevated temperature when their presence is not desired in the soft powdered product.

(15) COAGULANT

By coagulant we mean any additive capable of destabilizing the emulsified system under consideration, for causing coagulation of its solids content; the coagulant used will of course vary depending largely on the type of system, i.e. the type of surfactant used and/or the functionality, if any, of the intrachromospheruloid/intraleucospheruloid polymers. For example, anionic systems may be coagulated with either acids such as acetic or formic, hydrochloric, sulfuric, alkaline-earth metal salts, zinc and aluminum and other colorless ions of heavy metals, water soluble alcohols, or water insoluble amines preferably as their water soluble salts. Cationic systems may be coagulated with water insoluble acids, preferably as the water soluble alkali metal salts thereof and/or the water soluble amines thereof, and ammonium hydroxide or water soluble alcohols. Nonionic systems are often coagulated with water soluble alcohols with or without the addition of acids. Anionic latices of intrachromospheruloid pigment may also be coagulated by combining therewith cationic latices of intraleucospheruloid pigment or intraleucospheruloid pigment material surfaced with cationic surfactants and vice versa.

(16) PIGMENT MODIFYING OR BONDING AGENT

The organic and/or inorganic pigment materials and/or intrachromospheruloid/intraleucospheruloid or combination thereof, pigment materials may be modified either physically or chemically by the addition or incorporation of modifying or bonding material during or subsequent to the micronizing step. For example the modifier may be a bonding agent to aid in bonding the organic or inorganic pigment particles in the polymer spheruloids; to assist in the combination of the intrachromospheruloid pigment with the intraleucospheruloid pigment, or to aid the fixation of the intrachromospheruloid/intraleucospheruloid pigment produced to a substrate material. The modifying agent may comprise one or more of those substances or compounds which can be employed, although not essential to the process, to obtain certain specific advantages or modifications to the process or products thereof. Such substances may include nitrogenous material such as water soluble or insoluble amines, imines and polyamines and polyimines, added to the organic color pigment during the micronizing step to render it more oleophilic, and/or water soluble or dispersible condensation resin products or the components thereof, added during the micronizing or subsequent steps.

Pigment bonding agents which may be used to aid fixation of the inorganic pigment to organic polymeric material may be inorganic, e.g. a water soluble alkali metal silicate or a water soluble titanium compound for example, titanium tetrachloride or oxychloride. Alternatively they may be organic in nature, as described above in connection with the organic color pigment, e.g. an aqueous dispersion of a water soluble organic condensation resin such as an aminoplast or a phenoplast, which may be formed in situ by sequential addition of aqueous solutions or reactants for forming such resins. By reactants which form aminoplastics or aminoplasts we mean urea, melamine, thiourea and quanidine, etc., condensed with formaldehyde, glyoxal, etc. By reactants to form phenoplasts we mean phenol and/or substituted phenolic alcohols such as the cresols, xylenols and/or resorcinol, etc., condensable with formaldehyde and/or higher aldehydes such as glyoxal or furfural, etc. We use the term phenoplasts in the same manner as used by T. S. Carswell in his book entitled "Phenoplasts. Their Structure, Properties and Chemical Technology," published in 1947 by Interscience Publishers, Inc., New York, N.Y. We use the term aminoplastics in the same manner that C. P. Vale uses this term in his book entitled, "Aminoplastics," published in 1950 by Cleaver-Hume Press, Ltd., London, England.

Or a bonding agent may be ethylenically unsaturated monomeric material to be absorbed and/or adsorbed by the inorganic material during the micronizing step, and then be polymerized with the aid of a polymerization initiator.

Also the water soluble organo-silane compounds, e.g. Z6020 Silane available from Dow Chemical Company may be used.

Bonding agents which may be used to aid the substantivity of the inorganic to the organic phase of the intraleucospheruloid pigments by chemical bonding include aqueous solutions or dispersions of organic polymers depositable on the inorganic pigment material and containing carboxy, amine, sulfate, and/or sulfonic acid groups, salts thereof, nitrogenous containing material such as oleophilic amines, oleophilic imines, oleophilic amine carboxylates, oleophilic quaternary ammonium compounds, water soluble polyamines, water soluble imines and combinations thereof may also be used.

(17) SEPARATION BY SCREENING

Separation by screening, or conventional screening where employed in the Examples herein, connotes that the micronized color pigment is washed away from the micronizing medium and the screen with diluting liquid or a part thereof.

(18) 50% DIVINYLBENZENE

The term 50% divinylbenzene as used herein denotes the commercially available product regarded as an approximately equal mixture or divinyl and mono-vinyl materials.

(19) MICROSCOPIC EXAMINATION

The term microscopic examination as used in the Examples hereinafter denotes examination with an optical microscope, i.e. a Leitz "Ortholux" research microscope, which is regarded as having a resolving power of 0.2 micron and a lower limit of visibility for well separated particles of 0.02 micron diameter, and average particle sizes herein set forth were determined accordingly.

By way of being illustrative of the scope of this invention but not to be interpreted as being restrictive in any manner, the following Examples are given in both detailed procedural and table form:

Examples 1-12 Detailed step-wise procedures for producing intrachromospheruloid/intraleucospheruloid pigment compositions.

Tables 1-7 Preparation of intrachromospheruloid pigment material using cross-linked polymer material.

Tables 8-14 Preparation of intraleucospheruloid pigment material using cross-linked polymer material.

Tables 15-20 Preparation of intrachromospheruloid/intraleucospheruloid pigment material compositions from combinations of material produced in Tables 1-7 and 8-14 Ser. No. 712,252.

Tables 21-27 Preparation of intrachromospheruloid pigment material using noncross-linked polymer material.

Tables 28-34 Preparation of intraleucospheruloid pigment material using noncross-linked polymer material.

Tables 35-40 Preparation of intrachromospheruloid/intraleucospheruloid pigment material compositions from combinations of material produced in Tables 21-27 and 28-34.

Examples A et seq. Additional detailed step-wise procedures for producing intrachromospheruloid/intraleucospheruloid pigment material, in a portion of which the spheruloids are cross-linked.

EXAMPLES 1-12

Detailed step-wise Procedures for Producing Intrachromospheruloid/Intraleucospheruloid Pigment Compositions

EXAMPLE 1

(Anionic surface active agent material used in both intrachromospheruloid and intraleucospheruloid compositions—Bonding effected with oleophilic amine material)

Step A (Production of intrachromospheruloid pigment composition micronized with anionic surface active agent material and 5% acidic monomer material)

To a sand mill was charged 100 grams of Phthalocyanine Heliogen Green A presscake (Pigment Green 7, CI 70260) containing 35% dry pigment solids together with 150 ml. of water, 2 grams of Duponol ME (sodium lauryl sulfate), 2 grams of Tamol SN (sodium salt of condensed naphthalene sulfonic acid), 5 grams of Tamol 731 (sodium salt of polymeric carboxylic acid), 2 grams of methacrylic acid, and 300 volumetric parts of Ottawa sand. The pH was adjusted to 9-10 with ammonium hydroxide and the charge milled until a representative sample under microscopic examination showed essentially all of the organic color particles to be below 0.2 micron in diameter. The microground color dispersion was separated from the grinding medium by screening and charged to a vessel equipped for emulsion polymerization together with 50 grams of a 20% aqueous solution of Duponol ME (sodium lauryl sulfate) and sufficient water to adjust the volume to 600 ml. 65 grams of a monomer mixture containing 60 grams of methylmethacrylate and 5 grams of ethyleneglycoldimethacrylate were added, the system purged with nitrogen and the temperature raised to 50° C. 2 grams of cumene hydroperoxide were run in and the heating continued to 75° C. and the reaction temperature maintained at this level for 5-6 hours. On cooling a dark green latex was obtained, anionic in nature, due to the anionic surface active material employed therewith. Microscopic examination showed essentially all of the spheruloids thereof to be below 0.5 micron in diameter.

Step B (Preparation of intraleucospheruloid pigment composition micronized with anionic polymeric surface active agent material and 5% acidic monomer material)

To a sand mill was charged 78 grams of titanium dioxide pigment as an aqueous slurry containing 64% dry pigment solids (TiPure R941 slurry) together with 3.2 grams of Tamol SN (sodium salt of a condensed naphthalene sulfonic acid), 5 grams of Tamol 731 (sodium salt of a polymeric carboxylic acid), 2 grams of acrylic acid, 150 ml. of water and 300 volumetric parts of Ottawa sand. The pH was adjusted to 10-11 with ammonium hydroxide and the charge milled until a representative sample under microscopic examination showed essentially all of the inorganic leuco pigment particles to be below 0.2 micron in diameter. The microground leuco pigment dispersion was separated from the grinding medium by screening and charged to a vessel equipped for emulsion polymerization together with 100 grams of a 20% aqueous solution of the ammonium salt of a co-polymer of styrene, methacrylic acid and acrylonitrile, (ratio 25/65/10). The vessel was purged with nitrogen and a monomer mixture consisting of 30 grams of styrene, 25 grams of methylmethacrylate and 5 grams of allylacrylate introduced. The reaction temperature was raised to 50° C. and 3 grams of cumene hydroperoxide added. Heating was continued to 75° C. and the reaction held at this level for 6 hours. On cooling an intensely white intraleucospheruloid latex was obtained, anionic in nature due to the surface active agent material employed. Microscopic examination of a representative sample showed that the spheruloids thereof were essentially all below 0.5 micron in diameter.

Step C (Bonding and coagulation of anionic Intrachromospheruloid/Intrachromospheruloid material with cationic oleophilic amine material)

The intrachromospheruloid pigment latex from step A was run into 1000 ml. of water in a reaction vessel equipped with stirrer, temperature controls and baffles for producing turbulent agitation, followed with stirring by the intraleucospheruloid pigment latex from step B. After 5 minutes a solution of 35 grams of N-tallow trimethylene diamine in 500 ml. of dilute aqueous acetic acid was slowly run in to effect coagulation and bonding of the charge as an intrachromospheruloid/intraleucospheruloid pigment composition. Following coagulation the pH was adjusted to 5-6 with dilute acetic acid, and the reaction vessel was heated to 75° C. during 1 hour and held at this temperature for 2 hours. The coagulum was separated from the serum by filtration and washing to give a dark green intrachromospheruloid/intraleucospheruloid pigment composition in presscake form. This presscake could be used for producing flushed colors or in aqueous based systems such as latex paints or paper pulp coloration. A portion of the presscake was dried and found to give a soft pigment product, requiring no further grinding prior to use in oil based systems such as printing ink and oil paint vehicles.

EXAMPLE 2

(Intrachromospheruloid/Intraleucospheruloid pigment product containing polyethylene groups therein)

The procedure of Example 1 is followed with the exception that in place of the N-tallow trimethylene diamine in step C is used 200 grams of a .10% aqueous solution of polyethylenimine, PEI 600 (manufactured by Dow), to produce an intrachromospheruloid/intraleucospheruloid pigment presscake containing polyethylenimine reactive groups therein and thus possessing greatly increased affinity for cellulosic materials.

EXAMPLE 3

(Soft powdering procedures and products)

The procedure of Example 2 is followed with the exception that in step C is also added 40 grams of a 20% solution of diamyl sodium sulfosuccinate dissolved in Solvent Naphtha and the heating is maintained at 75°-80° C. for 5 hours to produce the intrachromospheruloid/intraleucospheruloid pigment combination in soft powdered form when filtered, washed and dried.

EXAMPLE 4 (Cationic surface active agent material used in both intrachromospheruloid and intraleucospheruloid compositions—bonding effected with polymeric carboxylic material)

Step A (Preparation of intrachromospheruloid pigment composition micronized with cationic surface active agent material)

25 grams of Irgazin Yellow 2GLT, (Pigment Yellow 109) as a dry 100% pigment powder together with 100 grams of Heliogen Green A presscake containing 35% dry pigment solids (Pigment Green 7, CI 74260) were charged to a sand grinding apparatus together with 5 grams of glacial acetic acid, 25 grams of N-tallow trimethylene diacetate, 1 gram of Zonyl FSC (fluorochemical surfactant manufactured by DuPont), 150 ml. of water and 300 volumetric parts of Ottawa sand. The charge was milled until a representative sample on microscopic examination showed essentially all of the color pigment particles to be below 0.1 micron in diameter. The color pigment dispersion was separated from the micronizing medium by screening and charged to a vessel equipped for emulsion polymerization together with a solution of 25 grams of Triton X405 (octylphenoxy polyethoxy ethanol) in 100 ml. of water. The system was purged with nitrogen and a mixture of 40 grams of methylmethacrylate, 30 grams of styrene and 10 grams of 50% divinylbenzene added. The reaction was heated with stirring to 50° C. and a solution of 3 grams of potassium persulfate in 100 grams of water added, followed by a solution of 1 gram of sodium bisulfite in 50 grams of water. The temperature was then raised to 60°–65° C. and held there for 6 hours. On cooling a bright green intrachromospheruloid latex was obtained. Microscopic examination of a representative sample showed that essentially all of the spheruloids thereof were below 0.2 micron in diameter. It was cationic in nature due to the surface active agent incorporated therein.

Step B (Preparation of intraleucospheruloid pigment compositions, mixed pigments micronized with cationic and nonionic surface active agent material)

40 grams of titanium dioxide pigment (TiPure LW manufactured by DuPont) and 20 grams of silica pigment (HiSil 233 manufactured by PPG) were charged to a sand grinding apparatus together with 5 grams of glacial acetic acid, 25 grams of N-tallow trimethylene diamine diacetate, 1 gram of Zonyl FSC (fluorochemical surfactant manufactured by DuPont), ½ gram of Z6020 Silane (N-(2-aminoethyl)-3-aminopropyltrimethoxy silane) 300 ml. water and 300 volumetric parts of Ottawa sand. The charge was milled until a representative sample under microscopic examination showed that essentially all of the inorganic pigment material was below 0.2 and 0.1 micron in diameter.

The inorganic leuco pigment dispersion was separated from the grinding medium by conventional screening and charged to a vessel equipped for emulsion polymerization together with a solution of 30 grams of Triton X405 (octylphenoxy polyethoxy ethanol) in 70 ml. of water. The system was purged with nitrogen and a mixture of 20 grams styrene and 10 grams of methylmethacrylate added. The temperature of the reaction vessel was raised to 50° C. and 1 gram of cumene hydroperoxide added. Heating was continued to 70°–75° C. and the reaction held within this range for 4 hours. The reaction was cooled to 40° C. and a further 20 grams of monomer material consisting of 5 grams of ethylglycoldimethacrylate and 15 grams of methylmethacrylate added, followed by 1½ grams of cumene hydroperoxide. The reaction was stirred for 1 hour and the temperature again raised to 70°–75° C. and held there for 6 hours to complete the polymerization. On cooling a white intraleucospheruloid latex was obtained consisting of polymer spheruloids cross-linked to essential insolubility in all physical solvents having embedded therein inorganic titanium and silica dioxide leuco-pigment material. Microscopic examination showed said spheruloids to be essentially all below 0.5 micron in diameter. It was cationic in nature due to the surface active agent material incorporated therein.

Step C (Bonding and coagulation of cationic intrachromospheruloid/intraleucospheruloid material with polymeric carboxylic acid material)

The intraleucospheruloid pigment latex produced in step B was run into 1000 ml. of water in a reaction vessel equipped with stirrer, temperature controls and baffles for introducing turbulent agitation, followed by 50 ml. of the intrachromospheruloid pigment latex composition formed in step A. The mixture was stirred for 10 minutes and then coagulated by the addition of a solution of 30 grams of a polymeric carboxylic acid in 200 grams of water. The pH was adjusted to 8.5 with dilute sodium hydroxide solution and the reaction vessel heated to 70°–75° C. and held there for 1 hour to complete the flocking of the product. The itrachromospheruloid/intraleucospheruloid pigment product was then separated from the serum by filtration and washing to yield a light green tinted pigment material in presscake form which could be effectively utilized for opacifying and color tinting of paper, especially the more expensive type such as writing paper.

EXAMPLE 5

(Soft powdering if intrachomospheruloid/intraleucospheruloid composition)

The procedure of the preceding Example is followed with the exception that the entire intrachromospheruloid pigment latex of step A is combined with the intraleucospheruloid pigment latex of step B. This intrachromospheruloid/intraleucospheruloid pigment is further treated after coagulation with 40 ml. of a 10% solution of polyethylene sorbitan monolaurate in Solvesso 140 to provide a strong bright green intrachromospheruloid/intraleucospheruloid pigment material in presscake form suitable for coloration of all types of aqueous based systems such as paper pulp, textile printing formulations and latex paints. A portion of this presscake when dried is found to be soft and friable and readily dispersible in oil based paint systems without extensive grinding.

EXAMPLE 6

(Soft powdered and spray dried intrachromospheruloid/intraleucospheruloid product)

The procedure of the preceding Example is followed with the exception that in place of the 40 ml. of the 10% solution of polyethylene sorbitan monolaurate in Solvesso 140 added in step C is added 30 ml. of a 25% solution of the dioctyl ester of sodium sulfosuccinate dissolved in Solvent Naphtha, and that the final isolation step is carried out by spray drying the slurry to produce the intrachromospheruloid/intraleucospheruloid pigment composition in spray dried soft powdered form. Such soft powdered dry pigment products are easier to handle and ship than the wet presscake produced in the preceding Examples 4 and 5 and may be utilized for the same general purposes.

EXAMPLE 7

(Intrachromospheruloid/intraleucospheruloid pigment composition containing basic polymer material—coagulation and bonding with silica, followed by soft powder treatment and spray drying)

The intraleucospheruloid pigment composition produced in Table 9, Example 1, is combined with 1000 ml. of water in a reaction vessel and 50 grams (dry basis) of reinforcing grade silica pigment in the form of a 10% solids freshly precipitated aqueous slurry added. The reaction mixture is stirred for 10 minutes, neutralized with dilute aqueous NH$_4$OH to a pH of 5.5 to 6.0 and the intrachromospheruloid pigment composition produced in Table 3, Example 4, run in slowly with efficient agitation. The coagulated intrachromospheruloid-/intraleucospheruloid pigment composition bonded together by the silica structure is then neutralized to a pH of 7.5 to 8.0 with dilute aqueous NH$_4$OH and a solution of di-tertiary-octyl sodium sulfosuccinate dissolved in Stoddart Solvent added. The precipitated slurry of intrachromospheruloid/intraleucospheruloid silica pigment composition is heated with turbulent agitation to 80° C. and maintained at this temperature for 4 hours. The slurry is then spray dried to yield the soft powdered green intrachromospheruloid/intraleucospheruloid silica bonded pigment composition in spray dried soft powder form, which is especially useful for coloration of oil based paint systems where a high gloss finish is not desired or, by reason of its cross-linked nature the product may be used to impart opacity and coloration in any thermoplastic system.

EXAMPLE 8
(Intrachromospheruloid/intraleucospheruloid pigment composition containing basis surface active agent material—coagulation and bonding with silica)

The procedure of the preceding Example is followed with the exception that the intrachromospheruloid pigment composition is taken from Table 4, Example 1, and the intraleucospheruloid pigment composition is taken from Table 12, Example 3. As in the preceding Example, coagulation is again effected by the bonding of the siliceous particles to the basic groups present, even though such basic groups are not on the polymer particles of the intrachromospheruloid/intraleucospheruloid spheruloids but are only present in the surface active agent material incorporated therein. A bright orange intrchromospheruloid/intraleucospheruloid pigment is obtained which may be used for the same purposes as that produced in Example 7.

EXAMPLE 9
(Intrachromospheruloid/intraleucospheruloid pigment compositions produced by reaction of opposing acidic and basic groups on the respective compositions)

The intrachromospheruloid pigment composition produced in Table 5, Example 2, is combined with 1000 ml. of water in a reaction vessel and the intraleucospheruloid pigment composition produced in Table 9, Example 1, run in slowly with rapid stirring, causing immediate coagulation of the intrachromospheruloid-/intraleucospheruloid pigment composition by the reaction of the acidic groups on the intrachromospheruloid spheruloids with the basic groups on the intraleucospheruloid spheruloids. The coagulated composition in slurry form is allowed to stir for 30 minutes and then 40 ml. of a 10% solution of octylphenoxydimethoxyethanol in Solvesso 140 added. The temperature is raised to 80° C. during 1 hour and held there for 4 hours. The soft powder treated intrachromospheruloid/intraleucospheruloid pigment slurry is spray dried to yield a bright reddish orange soft powdered pigment which may be used in oil based systems and thermoplastic formulations.

EXAMPLE 10
(Ionic coagulation by opposing acidic and basic groups on surface active agent present in the intrachromospheruloid/intraleucospheruloid spheruloids)

The intrachromospheruloid pigment composition produced in Table 4, Example 4, is combined with 1000 ml. of water in a reaction vessel and the intraleucospheruloid pigment composition produced in Table 10, Example 4, run in slowly with rapid stirring, causing the intrachromospheruloid/intraleucospheruloid pigment composition to be precipitated by reaction of the opposing nature of the surface active agent material present in said pigment composition. The coagulated intrachromospheruloid/intraleucospheruloid pigment slurry is then stirred for 30 minutes and 40 ml. of a 20% solution of diamyl sodium sulfosuccinate dissolved in Solvent Naphtha added. The temperature is raised to 80° C. during 1 hour and held there for 4-5 hours. The coagulum is then separated from the serum by filtration and washing to yield a bluish red soft powdered pigment product in presscake form suitable for flushing into oil based systems or for use in any aqueous based latex systems, coloration of paper pulp etc. A portion of this presscake when dried is found to disperse readily into oil based and thermoplastic systems without the necessity for further grinding.

EXAMPLE 11
(Pigment material ground in the monomer material—Bonding effected by ionic reaction between basic and acidic groups incorporated in the respective intraleucospheruloid/intrachromospheruloid spheruloid material)

The procedure given in Example 1 is followed with the exception that in step B the titanium dioxide pigment material is sand ground with the monomer material as herein shown. 40 grams of titanium dioxide pigment (TiPure LW, DuPont) is charged to a sand grinding apparatus equipped with explosion proof electrical fittings, cooling system and means for blanketing with nitrogen together with 35 grams of styrene and 35 grams of methylmethacrylate. The charge is milled until a representative sample under microscopic examination shows that essentially all of the organic pigment particles are between 0.2 and 0.1 micron in diameter. The pigment dispersion is separated from the grinding medium by screening and with rapid stirring added to a vessel equipped for emulsion polymerization containing a solution of 25 grams of N-tallow trimethylene diamine diacetate and 25 grams of Triton X405 (octylphenoxy polyethoxy ethanol) in 500 ml. of water. Following emulsification the system is purged with nitrogen and 5 grams of ethyleneglycoldimethacrylate added together with 3 grams of cumene hydroperoxide. The reaction temperature is raised rapidly to 70° C. and held there for 7 hours. On cooling an opaque white intraleucospheruloid latex is obtained. The latex is then charged to a reaction vessel together with 800 ml. of water and the intrachromospheruloid pigment latex as produced in Example 1, step A, is run in slowly with rapid stirring. Coagulation takes place by interaction of the acidic groups present in the intrachromospheruloid composition with the basic groups present in the intraleucospheruloid system to yield the intrachromospheruloid-/intraleucospheruloid pigment in slurry form. The slurry is heated to 75° C. during 1 hour, filtered and washed to yield a dark green intrachromospheruloid- /intraleucospheruloid pigment in presscake form suitable for use in coloration of aqueous based systems.

EXAMPLE 12

(Ionic bonding and incorporation of polyethylenimine material into the intrachromospheruloid/intraleucospheruloid composition)

The procedure of the preceding Example is followed with the exception that after the coagulation step, is added 40 ml. of a 20% solution of PEI 18 (a water soluble polyethylenimine manufactured by Dow) to yield an intrachromospheruloid/intraleucospheruloid pigment product having increased affinity for cellulosic materials.

In the examples given above and hereinafter, a particular point of distinction between the preferred cross-linked embodiments of the invention and the less preferred noncross-linked embodiments is that the cross-linking renders the spheruloids not only insoluble in physical solvents, but also nonfusible. Thus the preferred embodiments are particularly adapted for coloring plastic melts before extrusion, as the infusibility assures integrity of the spheruloids under extrusion temperatures and insures against any alteration of the flow characteristics of the melt, which may be caused by softening of the spheruloids in the case of the less preferred embodiments. In addition, the cross-linking of a polymer increases its density and thus increases its refractive index to a degree. Therefore the cross-linking, as well as the choice of monomer materials used, aids in adapting the product to have the necessary difference in refractive index from that of a vehicle in which it is intended to be used, particularly when the vehicle has a density or refractive index only slightly below that of the corresponding noncross-linked spheruloids.

Whether the spheruloids are cross-linked or non-cross-linked, their uniformity in size and spheruloidal nature particularly adapt them for use in electrostatic coating systems, and by controlling the polymerization conditions as above exemplified the size of the spheruloids may be maintained within specified limits adapting them for gloss or matte finishes or for special purposes as desired.

The following tabular Examples further exemplify the application of the procedures hereinabove set forth, give the proportions of ingredients in grams, in the order of their addition and the order of the processing operations, as well as the nature of the products produced thereby.

In the Examples herein set forth the product from the polymerization step was determined by microscopic examination to be in spheruloids of less than 4.0 microns average diameter, and was essentially nonsettling i.e. a latex.

In the Examples, materials designated by chemical name under "Trade Name" are of commercial grade; those designated by proprietary name thereunder are further identified therewith.

TABLES 1-7

Preparation of Intrachromospheruloid Pigment Material using Cross-linked Polymer Material

TABLE 1

Preparation of Intrachromospheruloid Pigment Compositions
(parts by weight)

| Example No. 1 | | 1 | 2 | 3 | 4 | 5 |
|---|---|---|---|---|---|---|
| A. | Micronizing Step | | | | | |
| | 1. Pigment Class | Dioxazine | Phthalocyanine | Vat | Cond. Azo | Quinacridone |
| | Trade Name | Carbazole Violet | Heliogen Blue BG | Indanthrene Pink R | Chromoptal Red BR | Magenta |
| | Color Index Name | Violet 23 | Blue 15 | Red 1 | — | Red 122 |
| | Color Index Number | 51319 | 74160 | 73360 | — | — |
| | Pigment, dry basis | 20 | 25 | 35 | 20 | 30 |
| | Presscake, dry solids | 28 | — | 38 | — | — |
| | Presscake, wet | 72 | — | 92 | — | — |
| | 2. Surface Active Agent* Material (Trade Name) | | | | | |
| | Duponol ME[1] | 2 | — | 1 | 2 | — |
| | Tamol SN[2] | 2 | — | 2 | — | — |
| | Alipal CO 433[3] | 10 | 10 | — | — | 10 |
| | Triton X405[4] | — | 10 | 20 | 20 | 20 |
| | Zonyl FSA[5] | — | 1 | — | 1 | 1 |
| | 3. Water, Quantity | 214 | 254 | 185 | 257 | 239 |
| | 4. Micronizing | | | | | |
| | Method | Sand | Ball | Ball | Sand | Sand |
| | Time, hours, approx. | 48 | 60 | 60 | 48 | 48 |
| | Temperature | 28 | 28 | 28 | 28 | 28 |
| | Average Particle Size | | | | | |
| | Diameter (microns) | <0.02 | <0.2 | <0.2 | <0.2 | <0.2 |
| | 5. Separation, Screening | X | X | X | X | X |
| | 6. Water Dilution | 200 | 200 | 200 | 200 | 200 |
| | 7. Yield - Aqueous Pigment Dispersion | 500 | 500 | 500 | 500 | 500 |
| B. | Polymerization Step | | | | | |
| | 8. Surface Active Agent* | | | | | |
| | (a) Quantity, type | 20[1] | 40[4] | 10[1] | 20[1] | 20[1] |
| | (b) Quantity, type | — | — | 40[4] | — | — |
| | Water | 80 | 60 | 50 | 80 | 80 |
| | 9. Monomer Material Non Crosslinking | | | | | |
| | Styrene | 80 | — | 40 | — | — |

TABLE 1-continued

Preparation of Intrachromospheruloid Pigment Compositions (parts by weight)

| Example No. 1 | 1 | 2 | 3 | 4 | 5 |
|---|---|---|---|---|---|
| Methylmethacrylate | — | 60 | 30 | 60 | — |
| Acrylonitrile | — | — | 10 | 10 | — |
| 9b. Monomer Material Crosslinking | | | | | |
| Divinylbenzene 50% | 20 | — | 10 | — | — |
| Ethyleneglycoldimethacrylate | — | 10 | — | 10 | 60 |
| 10. Polymerization Initator | | | | | |
| AZDN[6] | — | — | 3 | 3 | 3 |
| Potassium Persulfate | 3 | — | — | — | — |
| Sodium Bisulfite | 1½ | — | — | — | — |
| Cumene Hydroperoxide | — | 3 | — | — | — |
| 11. Polymerization Conditions | | | | | |
| Time, hours | 7 | 7 | 6 | 6 | 6 |
| Temperature, °C. | 65 | 65 | 80 | 80 | 80 |
| Conversion, approx. 100% (X) | X | X | X | X | X |
| 12. Intrachromospheruloid Pigment Dispersion - Yield | 700 | 670 | 690 | 680 | 660 |

*capable of effecting emulsion polymerization
[1]sodium lauryl sulfate (100% active)
[2]sodium salt of a condensed naphthalene sulfonic acid
[3]sodium salt of a sulfate ester of an alkylphenoxy poly(ethylenoxy)ethanol 28% active
[4]octylphenoxy polyethoxy ethanol (70% active)
[5]fluorochemical surface active agent (50% active)
[6]azobisisobutyronitrile

TABLE 2

Preparation of Intrachromospheruloid Pigment Compositions (parts by weight)

| Example No. 2 | 1 | 2 | 3 | 4 | 5 |
|---|---|---|---|---|---|
| A. Micronizing Step | | | | | |
| 1. Pigment Class | Phthalocyanine | Azamethine | Dioxazine | Azo | Triphenylmethane |
| Trade Name | Fastolux Green Y | Irgazin Red 2BLT | Heliogen Violet | Benzedine Yellow | Consol Green |
| Color Index Name | Green 36 | Red 180 | Violet 23 | Yellow 12 | Green 2 |
| Color Index Number | 74160 | — | 51319 | 21090 | 42040 and 49010 |
| Pigment, dry basis | 50 | 30 | 10 | 40 | 20 |
| Presscake, dry solids | 30 | — | 20 | 38 | — |
| Presscake, wet | 167 | — | 50 | 105 | — |
| 2. Surface Active Agent* Material (Trade Name) | | | | | |
| Duponol ME[1] | 2 | 5 | — | 4 | — |
| Blancol[2] | 2 | 2 | — | 2 | — |
| Triton X 405[3] | — | — | 45 | — | 10 |
| Duomeen T[4] | — | — | 2 | — | 20 |
| Tamol 731[5] | 6 | — | — | 4 | — |
| 3. Water, Quantity | 123 | 213 | 203 | 185 | 250 |
| 4. Micronizing | | | | | |
| Method | Sand | Ball | Sand | Ball | Sand |
| Time, hours, approx. | 48 | 60 | 48 | 60 | 48 |
| Temperature | 28 | 28 | 28 | 28 | 28 |
| Average Particle Size Diameter (microns) | <0.02 | <0.2 | <0.02 | <0.02 | <0.02 |
| 5. Separation | | | | | |
| Screening (X) | X | X | X | X | X |
| 6. Water Dilution | 200 | 200 | 200 | 200 | 200 |
| 7. Yield | | | | | |
| Aqueous Pigment Dispersion | 500 | 500 | 500 | 500 | 500 |
| B. Polymerization Step | | | | | |
| 8. Surface Active Agent* | | | | | |
| (a) Quantity, type | 20[1] | 20[1] | 45[3] | 20[1] | 20[3] |
| (b) Quantity, type | 10[5] | — | — | — | — |
| Water | 70 | 80 | 55 | 80 | 80 |
| 9. Monomer Material Non Crosslinking | | | | | |
| Methylmethacrylate | 68 | 50 | 60 | 30 | — |
| Cyclohexylmethacrylate | — | 10 | — | 30 | 60 |
| Dimethylaminoethylmethacrylate | 1 | 2 | — | 5 | — |
| 9b. Monomer Material Crosslinking | | | | | |
| Divinylbenzene 50% | — | — | 20 | — | — |

TABLE 2-continued
Preparation of Intrachromospheruloid Pigment Compositions
(parts by weight)

| Example No. 2 | 1 | 2 | 3 | 4 | 5 |
|---|---|---|---|---|---|
| Ethyleneglycoldimethacrylate | — | 8 | — | 4 | 10 |
| Oiticia Oil | 1 | — | — | 1 | — |
| 10. Polymerization Initiator | | | | | |
| AZDN[6] | — | 2½ | 3 | 3 | 2½ |
| Cumene Hydroperoxide | 3 | — | — | — | — |
| 11. Polymerization Conditions | | | | | |
| Time, hours | 6 | 6 | 7 | 7 | 6 |
| Temperature, °C. | 80 | 80 | 80 | 80 | 80 |
| Conversion, approx. 100% (X) | X | X | X | X | X |
| 12. Intrachromospheruloid Pigment | | | | | |
| Dispersion - Yield | 670 | 670 | 680 | 670 | 670 |

*capable of effecting emulsion polymerization
[1]sodium lauryl sulfate (100% active)
[2]sodium salt of a sulfonated napthalene-formaldehyde condensate (86% active)
[3]octylphenoxy polyethoxy ethanol (70% active)
[4]N-tallow trimethylene diamine (85% active)
[5]sodium salt of a polymeric carboxylic acid (100% active)
[6]azobisisobutyronitrile

TABLE 3
Preparation of Intrachromospheruloid Pigment Compositions
(parts by weight)

| Example No. 3 | 1 | 2 | 3 | 4 | 5 |
|---|---|---|---|---|---|
| A. Micronizing Step | | | | | |
| 1. Pigment Class | Vat | Vat | Quinacridone | Phthalocyanine | Azo |
| Trade Name | Perylene Red Toner | Sandothrene Blue NGD | Monastial Red Y | Heliogen Green E | Permanent Carmine |
| Color Index Name | Red 123 | Blue 6 | Violet 19 | Green 7 | Red 5 |
| Color Index Number | 71145 | 69825 | 46500 | 74260 | 12490 |
| Pigment, dry basis | 30 | 20 | 25 | 35 | 25 |
| Presscake, dry solids | — | 20 | — | 35 | — |
| Presscake, wet | — | 100 | — | 100 | — |
| 2. Surface Active Agent* Material (Trade Name) | | | | | |
| Triton X 405[1] | 40 | — | — | 20 | 20 |
| Monazoline T[2] | — | 20 | — | 10 | — |
| Monaquat TIBC[3] | — | 20 | — | 10 | — |
| Zonyl FSC[4] | — | 1 | 1 | — | — |
| Duomeen T[5] | — | — | 20 | — | 20 |
| Zonyl FSN[6] | 1 | — | — | — | 1 |
| 3. Water, Quantity | 229 | 149 | 254 | 160 | 134 |
| 4. Micronizing | | | | | |
| Method | Sand | Ball | Ball | Sand | Ball |
| Time hours, approx. | 48 | 60 | 60 | 48 | 60 |
| Temperature, °C. | 28 | 28 | 28 | 28 | 28 |
| Average Particle Size Diameter (microns) | <0.2 | <0.02 | <0.2 | <0.02 | <0.2 |
| 5. Separation | | | | | |
| Screening (X) | X | X | X | X | X |
| 6. Water Dilution | 200 | 200 | 200 | 200 | 200 |
| 7. Yield - Aqueous | | | | | |
| Pigment Dispersion | 500 | 500 | 500 | 500 | 500 |
| B. Polymerization Step | | | | | |
| 8. Surface Active Agent* | | | | | |
| a. Quantity, type | 40[1] | — | 10[5] | 20[3] | 40[1] |
| b. Quantity, type | — | — | — | — | — |
| Water | 60 | — | 90 | 80 | 60 |
| 9. Monomer Material Non Crosslinking | | | | | |
| Styrene | 60 | — | 60 | 40 | 60 |
| Vinyltoluene | — | 70 | — | 30 | — |
| Dimethylaminoethylmethacrylate | 5 | — | — | 10 | 5 |
| 9b. Monomer Material Crosslinking | | | | | |
| Ethyleneglycoldimethacrylate | — | — | 10 | — | — |
| Allylacrylate | — | — | — | 10 | — |
| Divinylbenzene 50% | 10 | 10 | — | 10 | 10 |
| 10. Polymerization Initiator | | | | | |
| AZDN[7] | — | — | — | 3 | 2.5 |
| Potassium persulfate | 2.5 | 3 | 2.5 | — | — |
| Sodium bisulfite | 1.25 | 1.5 | 1.25 | — | — |

TABLE 3-continued

Preparation of Intrachromospheruloid Pigment Compositions
(parts by weight)

| Example No. 3 | 1 | 2 | 3 | 4 | 5 |
|---|---|---|---|---|---|
| 11. Polymerization Conditions | | | | | |
| Time, hours | 6 | 6 | 6 | 5 | 5 |
| Temperature, °C. | 70 | 70 | 70 | 80 | 80 |
| Conversion, Approx. 100% (X) | X | X | X | X | X |
| 12. Intrachromospheruloid | | | | | |
| Pigment Dispersion Yield | 675 | 580 | 670 | 700 | 675 |

*capable of effecting emulsion polymerization
[1] octylphenoxy polyethoxy ethanol (70% active)
[2] substituted imidazoline of tall oil (100% active)
[3] substituted imidazoline quaternized with benzyl chloride (100% active)
[4] fluorochemical surface active agent (50% active)
[5] N-tallow trimethylene diamine (85% active)
[6] fluorochemical surface active agent (100% active)
[7] azobisisobutyronitrile

TABLE 4

Preparation of Intrachromospheruloid Pigment Compositions
(parts by weight)

| Example No. 4 | 1 | 2 | 3 | 4 | 5 |
|---|---|---|---|---|---|
| A. Micronizing Step | | | | | |
| 1. Pigment Class | Vat | Dioxazine | Azo | Quinacridone | Azamethine |
| Trade Name | Brilliant Orange GR | Heliogen Violet | Permagon Yellow | Magenta | Yellow 2 GLT |
| Color Index Name | Orange 7 | Violet 23 | Yellow 14 | Red 122 | Yellow 109 |
| Color Index Number | 71105 | 51319 | 21095 | — | — |
| Pigment, dry basis | 20 | 30 | 30 | 20 | 30 |
| Presscake, dry solids | 20 | 30 | — | — | — |
| Presscake, wet | 100 | 100 | — | — | — |
| 2. Surface Active Agent* Material (Trade Name) | | | | | |
| Duponol ME[1] | 2 | 2 | 2 | — | 2 |
| N-Group Polymer[2] | 20 | — | — | — | — |
| SAMV Amphoteric Copolymer[3] | — | — | 28 | — | — |
| SMA Copolymer[4] | — | — | — | 20 | — |
| Tamol 731[5] | — | 28 | — | — | — |
| Triton X405[6] | 8 | — | — | 25 | 38 |
| 3. Water, Quantity | 170 | 170 | 240 | 235 | 230 |
| 4. Micronizing | | | | | |
| Method | Sand | Sand | Ball | Ball | Ball |
| Time, hours, approx. | 48 | 48 | 60 | 60 | 60 |
| Temperature, °C. | 28 | 28 | 28 | 28 | 28 |
| Average Particle Size Diameter (microns) | <0.02 | <0.02 | <0.02 | <0.2 | <0.2 |
| 5. Separation | | | | | |
| Screening (X) | X | X | X | X | X |
| 6. Water Dilution | 200 | 200 | 200 | 200 | 200 |
| 7. Yield | | | | | |
| Aqueous Pigment Dispersion | 500 | 500 | 500 | 500 | 500 |
| B. Polymerization Step | | | | | |
| 8. Surface Active Agent* | | | | | |
| (a) Quantity, type | 10[1] | 20[1] | 10[1] | 10[1] | 40[6] |
| (b) Quantity, type | 10[2] | — | 12[3] | 20[4] | 20[3] |
| Water | 80 | 80 | 78 | 70 | 40 |
| 9. Monomer Material Non Crosslinking | | | | | |
| Styrene | — | 40 | 60 | 40 | 80 |
| Methylmethacrylate | 60 | 20 | — | 40 | — |
| Diethylaminoethylmethacrylate | — | — | 5 | 2 | 2 |
| 9b. Monomer Material Crosslinking | | | | | |
| Divinylbenzene 50% | — | 20 | 15 | — | 18 |
| Ethyleneglycoldimethacrylate | 10 | — | — | 8 | — |
| 10. Polymerization Initiator | | | | | |
| AZDN[7] | 2 | — | 3 | 3 | 3 |
| Cumene Hydroperoxide | — | 3 | — | — | — |
| 11. Polymerization Conditions | | | | | |
| Time, hours | 5 | 6 | 6 | 6 | 6 |
| Temperature, °C. | 80 | 80 | 80 | 80 | 80 |
| Conversion, approx. 100% (X) | X | X | X | X | X |
| 12. Intrachromospheruloid Pigment | | | | | |

TABLE 4-continued

Preparation of Intrachromospheruloid Pigment Compositions (parts by weight)

| Example No. 4 | 1 | 2 | 3 | 4 | 5 |
|---|---|---|---|---|---|
| Dispersion - Yield | 670 | 680 | 680 | 690 | 700 |

*capable of effecting emulsion polymerization
[1] sodium lauryl sulfate (100% active)
[2] homopolymer of 4-vinylpyridine
[3] copolymer of styrene, acrylonitrile, methacrylic acid and 4-vinylpyridine ratio 25/10/29/36
[4] copolymer of styrene, methacrylic acid and acrylonitrile, ratio 25/65/10
[5] salt of polymeric carboxylic acid (100% active)
[6] octylphenoxy polyethoxy ethanol (70% active)
[7] azobisisobutyronitrile

TABLE 5

Preparation of Intrachromospheruloid Pigment Compositions (parts by weight)

| Example No. 5- | 1 | 2 | 3 | 4 | 5 |
|---|---|---|---|---|---|
| A. Micronizing Step | | | | | |
| 1. Pigment Class | Phthalocyanine | Vat | Azo | Phthalocyanine | Vat |
| Trade Name | Polymon Blue G | Red FBB | Red Lake C | Heliogen Blue B | Perylene Red |
| Color Index Name | Blue 16 | Red 10 | Red 53 | Blue 15 | Red 123 |
| Color Index Number | 74100 | 67000 | 15585 | 74160 | 71145 |
| Pigment, dry basis | 25 | 20 | 25 | 20 | 30 |
| Presscake, dry solids | — | 20 | — | 35 | — |
| Presscake, wet | — | 100 | — | 57 | — |
| 2. Surface Active Agent* Material (Trade Name) | | | | | |
| Duponol ME[1] | 2 | 4 | — | 1 | 2 |
| Alipal CO 433[2] | 6 | — | 10 | 10 | — |
| Tamol SN[3] | — | — | 2 | — | 2 |
| Tamol 731[4] | — | 5 | — | — | 6 |
| Zonyl FSA[5] | 2 | 1 | — | 2 | — |
| 3. Water, Quantity | 265 | 190 | 263 | 230 | 260 |
| 4. Micronizing | | | | | |
| Method | Sand | Sand | Ball | Sand | Sand |
| Time, hours, approx. | 48 | 48 | 60 | 48 | 48 |
| Temperature | 28 | 28 | 28 | 28 | 28 |
| Average Particle Size Diameter (microns) | <0.2 | <0.1 | <0.2 | <0.02 | <0.02 |
| 5. Separation | | | | | |
| Screening (X) | X | X | X | X | X |
| 6. Water Dilution | 200 | 200 | 200 | 200 | 200 |
| 7. Yield - Aqueous Pigment Dispersion | 500 | 500 | 500 | 500 | 500 |
| B. Polymerization Step | | | | | |
| 8. Surface Active Agent* | | | | | |
| a. Quantity, type | 20[1] | 20[1] | 10[1] | 10[1] | 20[1] |
| b. Quantity, type | 10[4] | 10[4] | — | — | 10[4] |
| Water | 70 | 70 | 90 | 90 | 70 |
| 9. Monomer Material Non Crosslinking | | | | | |
| Styrene | 60 | 60 | 61 | 70 | 40 |
| 4-vinylpyridine | 10 | — | 10.4 | 10 | — |
| Methacrylic acid | — | 10 | 8.6 | — | 10 |
| Dimethylaminoethylmethacrylate | 2 | — | — | — | — |
| Methylmethacrylate | 8 | 10 | — | — | 30 |
| 9b. Monomer Material Crosslinking | | | | | |
| Ethyleneglycoldimethacrylate | 10 | — | — | 10 | 10 |
| Divinylbenzene 50% | — | 20 | 20 | — | — |
| 10. Polymerization Initiator | | | | | |
| AZDN[6] | — | 3 | 3 | 3 | 3 |
| Cumene Hydroperoxide | 3 | — | — | — | — |
| 11. Polymerizations | | | | | |
| Time, hours | 5 | 5 | 5 | 5 | 5 |
| Temperature, °C. | 80 | 80 | 80 | 80 | 80 |
| Conversion, approx. 100% (X) | X | X | X | X | X |
| 12. Intrachromospheruloid Pigment | | | | | |

TABLE 5-continued

| | Preparation of Intrachromospheruloid Pigment Compositions (parts by weight) | | | | |
|---|---|---|---|---|---|
| Example No. 5- | 1 | 2 | 3 | 4 | 5 |
| Dispersion - Yield | 690 | 700 | 700 | 690 | 690 |

*capable of effecting emulsion polymerization
[1]sodium lauryl sulfate (100% active)
[2]sodium salt of a sulfate ester of an alkylphenoxy poly(ethyleneoxy)ethanol (28% active)
[3]sodium salt of a condensed napthalene sulfonic acid
[4]sodium salt of a polymeric carboxylic acid (100% active)
[5]fluorochemical surface active agent (50% active)
[6]azobisisobutyronitrile

TABLE 6

| | Preparation of Intrachromospheruloid Pigment Compositions (parts by weight) | | | |
|---|---|---|---|---|
| Example No. 6- | 1 | | | 2 |
| A. Micronizing Step | | | | |
| 1. Pigment Class | Quinacridone | Vat | Dioxazine | Triphenylmethane |
| Trade Name | Monastral Red Y | Brilliant Orange GR | Carbazole Violet | Irgazite Violet TRC |
| Color Index Name | Violet 19 | Orange 7 | Violet 23 | Violet 3 |
| Color Index Number | 46500 | 71105 | 51319 | 42535 |
| Pigment, dry basis | 20 | 10 | 20 | 10 |
| Presscake, dry solids | — | 20 | 28 | — |
| Presscake, wet | — | 50 | 72 | — |
| 2. Surface Active Agent* Material (Trade Name) | | | | |
| Aerosol 22[1] | 50 | | | — |
| Triton X 405[2] | 10 | | | — |
| Duomeen T[3] | — | | | 20 |
| Monaquat TIBC[4] | — | | | 10 |
| Acetic Acid | — | | | 15 |
| Ammonium hydroxide 28% | 10 | | | — |
| 3. Water, Quantity | 160 | | | 173 |
| 4. Micronizing | | | | |
| Method | Sand | | | Ball |
| Time, hours, approx. | 48 | | | 60 |
| Temperature, °C. | 28 | | | 28 |
| Average Particle Size Diameter (microns) | <0.2 | | | <0.2 |
| 5. Separation | | | | |
| Screening (X) | X | | | X |
| 6. Water, dilution | 200 | | | 200 |
| 7. Yield, Aqueous Pigment Dispersion | 500 | | | 500 |
| B. Polymerization Step | | | | |
| 8. Surface Active Agent* | | | | |
| (a) Quantity, type | 30[2] | | | — |
| (b) Quantity, type | — | | | — |
| Water | 70 | | | 100 |
| 9. Monomer Material Non Crosslinking | | | | |
| Styrene | 60 | | | 30 |
| Methylmethacrylate | 8 | | | 38 |
| Dimethylaminoethylmethacrylate | 2 | | | 2 |
| 9b. Monomer Material Crosslinking | | | | |
| Divinylbenzene 50% | 10 | | | — |
| Ethyleneglycoldimethacrylate | — | | | 10 |
| 10. Polymerization Initiator | | | | |
| AZDN[5] | 3 | | | 3 |
| 11. Polymerization Conditions | | | | |
| Time, hours, approx. | 6 | | | 6 |
| Temperature, °C. | 80 | | | 80 |
| Conversion, Approx. 100% (X) | X | | | X |
| 12. Intrachromospheruloid Pigment Dispersion | | | | |
| Yield | 680 | | | 680 |

*capable of effecting emulsion polymerization
[1]tetrasodium N-(1,2-dicarboxyethyl)-N-octadecylsulfosuccinate (35% active)
[2]octylphenoxy polyethoxy ethanol (70% active)
[3]N-tallow trimethylene diamine (85% active)
[4]substituted imidazoline quaternized with benzyl chloride (100% active)
[5]azobisisobutyronitrile

TABLE 7

Preparation of Intrachromospheruloid Pigment Compositions
(parts by weight)

| Example No. 7- | 1 | | 2 | |
|---|---|---|---|---|
| A. Micronizing Step | | | | |
| 1. Pigment Class | Vat | Vat | Phthalocyanine | Triphenylmethane |
| Trade Name | Indanthrene Pink R | Brilliant Orange RK | Heliogen Green A | Consol Green |
| Color Index Name | Red 1 | Orange 3 | Green 7 | Green 2 |
| Color Index Number | 73340 | 59300 | 74260 | 42040 49010 |
| Pigment, dry basis | 30 | 20 | 20 | 10 |
| Presscake, dry solids | 30 | 25 | 36 | — |
| Presscake, wet | 100 | 80 | 55 | — |
| 2. Surface Active Agent* Material (Trade Name) | | | | |
| Duponol ME[1] | 5 | | — | |
| Duomeen T[2] | — | | 20 | |
| Tamol SN[3] | 2 | | — | |
| Acetic Acid | — | | 10 | |
| 3. Water, Quantity | 63 | | 155 | |
| 4. Micronizing | | | | |
| Method | Sand | | Ball | |
| Time, hours, approx. | 48 | | 60 | |
| Average Particle Size Diameter (microns) | <0.02 | | <0.2 | |
| Temperature | 28 | | 28 | |
| 5. Separation | | | | |
| Screening (X) | X | | X | |
| 6. Water, Dilution | 250 | | 250 | |
| 7. Yield, Aqueous Pigment Dispersion | 500 | | 500 | |
| B. Polymerization Step | | | | |
| 8. Surface Active Agent* | | | | |
| (a) Quantity, type | 25[1] | | 10[2] | |
| (b) Quantity, type | — | | — | |
| Water | 75 | | 85 | |
| Acetic Acid | — | | 5 | |
| 9a. Monomer Material Non Crosslinking | | | | |
| Styrene | — | | 40 | |
| Methylmethacrylate | 68 | | 28 | |
| Dimethylaminoethylmethacrylate | 2 | | 2 | |
| 9b. Monomer Material Crosslinking | | | | |
| Ethyleneglycoldimethacrylate | 10 | | 10 | |
| 10. Polymerization Initiator | | | | |
| AZDN[4] | 3 | | 3 | |
| 11. Polymerization Conditions | | | | |
| Time, hours, approx. | 7 | | 7 | |
| Temperature, °C. | 80 | | 80 | |
| Conversion, Approx. 100% (X) | X | | X | |
| 12. Intrachromospheruloid Pigment, Dispersion Yield | 680 | | 680 | |

*capable of effecting emulsion polymerization
[1] sodium lauryl sulfate (100% active)
[2] N-tallow trimethylene diamine (85% active)
[3] sodium salt of a condensed napthalene sulfonic acid
[4] azobisisobutyronitrile

TABLES 8-14

Preparation of Intraleucospheruloid Pigment Material using Cross-linked Polymer Material

TABLE 8

Preparation of Intraleucospheruloid Pigment Compositions
(Parts by weight)

| Example No. 8- | 1 | 2 | 3 | 4 | 5 |
|---|---|---|---|---|---|
| A. Micronizing Step | | | | | |
| 1. Pigment Class or Trade Name | HiSil 404 | HiSil 233 | Cab-O-Sil M5 | Celite 281 | Silene EF |
| Pigment, dry basis | 40 | 40 | 40 | 40 | 40 |
| 2. Surface Active Agent* Material | | | | | |

TABLE 8-continued

Preparation of Intraleucospheruloid Pigment Compositions (Parts by weight)

| Example No. 8- | 1 | 2 | 3 | 4 | 5 |
|---|---|---|---|---|---|
| Triton X405[1] | 20 | — | — | 20 | 20 |
| Triton X400[2] | — | 20 | — | — | — |
| Alipal CO 433[3] | — | — | 10 | — | 45 |
| Tamol SN[4] | 2 | — | 2 | 2 | — |
| Ammonium Hydroxide 28% | 5 | — | — | 5 | — |
| Acetic Acid | — | 10 | — | — | — |
| 3. Water, Quantity | 283 | 280 | 348 | 283 | 295 |
| 4. Micronizing | | | | | |
| Method | Sand | Ball | Sand | Sand | Ball |
| Time, hours, approx. | 24 | 36 | 24 | 24 | 36 |
| Temperature | 28 | 28 | 28 | 28 | 28 |
| Average Particle Size Diameter (microns) | <0.2 | <0.2 | <0.1 | <0.2 | <0.2 |
| 5. Separation | | | | | |
| Screening (X) | X | X | X | X | X |
| 6. Water Dilution | 200 | 200 | 200 | 200 | 200 |
| 7. Yield | | | | | |
| Aqueous Pigment Dispersion | 550 | 550 | 600 | 550 | 600 |
| B. Polymerization Step | | | | | |
| 8. Surface Active Agent* | | | | | |
| (a) Quantity, Type | 20[1] | 20[1] | 20[3] | 20[1] | — |
| (b) Quantity, type | 10[3] | — | — | 10[3] | — |
| Water | 70 | 80 | 80 | 70 | 100 |
| 9. Monomer Material Non Crosslinking | | | | | |
| Styrene | 60 | — | — | 20 | 30 |
| Methylmethacrylate | — | 60 | — | 40 | 30 |
| Vinyltoluene | — | — | 60 | — | — |
| 9b. Monomer Material Crosslinking | | | | | |
| Divinylbenzene 50% | 10 | — | 10 | — | 10 |
| Ethyleneglycoldimethacrylate | — | 10 | — | 10 | — |
| 10. Polymerization Initiator | | | | | |
| AZDN[5] | 2 | — | 2 | — | 2 |
| Potassium Persulfate | — | 2.5 | — | 2.5 | — |
| Sodium Bisulfite | — | 1.25 | — | 1.25 | — |
| 11. Polymerization Conditions | | | | | |
| Time, hours | 5 | 6 | 5 | 6 | 5 |
| Temperature, °C. | 80 | 70 | 80 | 70 | 80 |
| Conversion, approx. 100% (X) | X | X | X | X | X |
| 12. Intraleucospheruloid Pigment Dispersion | | | | | |
| Yield | 720 | 720 | 770 | 720 | 770 |

*capable of effecting emulsion polymerization
[1]octylphenoxy polyethoxy ethanol (70% active)
[2]stearyl dimethyl benzyl ammonium chloride (82% active)
[3]sodium salt of a sulfate ester of an alkylphenoxy poly(ethyleneoxy)ethanol 28% active
[4]sodium salt of a condensed napthalene sulfonic acid
[5]azobisisobutyronitrile
HiSil 404 tradename for PPG Industries precipitated silica, paper grade
HiSil 233 tradename for PPG Industries precipitated silica, reinforcing grade
Celite 281 tradename for Johns-Mansville Corporation natural silica
Silene EF tradename for PPG Industries precipitated silica, calcium modified Cab-O-Sil M5 tradename for Cabot Corporation pyrogenic silica

TABLE 9

Preparation of Intraleucospheruloid Pigment Compositions (parts by weight)

| Example No. 9- | 1 | 2 | 3 | 4 | 5 |
|---|---|---|---|---|---|
| A. Micronizing Step | | | | | |
| 1. Pigment Class or Trade Name | Zirconium Oxide | Zinc Oxide | Alumina | Aluminum Hydroxide | Barium Sulfate |
| Pigment, dry basis | 30 | 30 | 40 | 40 | 30 |
| 2. Surface Active Agent* Material | | | | | |
| Alipal CO 433[1] | — | 10 | 10 | — | 10 |
| Triton X400[2] | 10 | — | — | — | — |
| Triton X405[3] | 10 | 10 | 10 | 25 | 10 |
| Ammonium Hydroxide 28% | — | — | — | 2 | 2 |
| Acetic Acid | 5 | — | — | — | — |
| 3. Water, Quantity | 245 | 250 | 290 | 283 | 248 |
| 4. Micronizing, Method | Sand | Sand | Sand | Sand | Ball |

TABLE 9-continued
Preparation of Intraleucospheruloid Pigment Compositions
(parts by weight)

| Example No. 9- | 1 | 2 | 3 | 4 | 5 |
|---|---|---|---|---|---|
| Time, hours, approx. | 48 | 48 | 48 | 36 | 48 |
| Temperature, °C. | 28 | 28 | 28 | 28 | 28 |
| Average Particle Size Diameter (microns) | <0.2 | <0.2 | <0.2 | <0.2 | <0.2 |
| 5. Separation | | | | | |
| Screening (X) | X | X | X | X | X |
| 6. Water Dilution | 200 | 200 | 200 | 200 | 200 |
| 7. Yield | | | | | |
| Aqueous Pigment Dispersion | 500 | 500 | 550 | 550 | 500 |
| B. Polymerization Step | | | | | |
| 8. Surface Active Agent* | | | | | |
| (a) Quantity, type | 35[3] | 25[1] | 15[1] | 35[3] | 25[1] |
| (b) Quantity, type | — | 10[3] | 15[3] | — | — |
| Water | 65 | 65 | 70 | 65 | 75 |
| 9. Monomer Material Non Crosslinking | | | | | |
| Methylmethacrylate | — | 10 | 20 | — | 40 |
| Styrene | 50 | 30 | 60 | 60 | 30 |
| Acrylonitrile | 10 | 20 | — | — | 5 |
| Dimethylaminoethylmethacrylate | 10 | 5 | — | — | 5 |
| 9b. Monomer Material Crosslinking | | | | | |
| Ethyleneglycoldimethacrylate | 10 | 5 | 10 | — | 10 |
| Divinylbenzene 50% | — | — | — | 20 | — |
| 10. Polymerization Initiator | | | | | |
| AZDN[4] | — | 3 | 3 | 3 | 3 |
| Cumene hydroperoxide | 3 | — | — | — | — |
| 11. Polymerization Conditions | | | | | |
| Time, hours | 5 | 5 | 5 | 5 | 5 |
| Temperature, °C. | 80 | 80 | 80 | 80 | 80 |
| Conversion, Approx. 100% (X) | X | X | X | X | X |
| 12. Intraleucospheruloid Pigment Dispersion Yield | 680 | 670 | 740 | 730 | 690 |

*capable of effecting emulsion polymerization
[1]sodium salt of a sulfate ester of an alkylphenoxy poly(ethyleneoxy)ethanol (28% active)
[2]stearyl dimethyl benzylammonium chloride (82% active)
[3]octylphenoxy polyethoxy ethanol (70% active)
[4]azobisisobutyronitrile

TABLE 10
Preparation of Intraleucospheruloid Pigment Compositions
(parts) by weight)

| Example No. 10 | 1 | 2 | 3 | 4 | 5 |
|---|---|---|---|---|---|
| A. Micronizing Step | | | | | |
| 1. Pigment Class or Trade Name | HiSil 233 | TiPure LW | Oncor 23A | Silene D | Excelopac Zirconium Silicate |
| Pigment, dry basis | 40 | 40 | 40 | 40 | 40 |
| 2. Surface Active Agent* Material | | | | | |
| Alipal CO 433[1] | 10 | 10 | 10 | — | 10 |
| SMA Copolymer[2] | 10 | — | 20 | — | — |
| SAMV Amphoteric Copolymer[3] | — | 20 | — | — | 20 |
| N-Group Polymer[4] | — | — | — | 20 | — |
| Triton X405[5] | — | — | — | 20 | — |
| Acetic Acid | — | — | — | 5 | — |
| Ammonium Hydroxide | 2 | 10 | 5 | — | 2 |
| 3. Water, Quantity | 288 | 270 | 275 | 265 | 278 |
| 4. Micronizing Step | | | | | |
| Method | Ball | Sand | Sand | Ball | Sand |
| Time, hours, approx. | 24 | 48 | 48 | 36 | 48 |
| Temperature, °C. | 28 | 28 | 28 | 28 | 28 |
| Average Particle Size Diameter (microns) | <0.2 | <0.2 | <0.2 | <0.2 | <0.2 |
| 5. Separation | | | | | |
| Screening (X) | X | X | X | X | X |
| 6. Water Dilution | 250 | 250 | 250 | 250 | 250 |
| 7. Yield | | | | | |

TABLE 10-continued

Preparation of Intraleucospheruloid Pigment Compositions (parts) by weight

| Example No. 10 | 1 | 2 | 3 | 4 | 5 |
|---|---|---|---|---|---|
| Aqueous Pigment Dispersion | 600 | 600 | 600 | 600 | 600 |
| B. Polymerization Step | | | | | |
| 8. Surface Active Agent* | | | | | |
| (a) Quantity, type | 20[1] | 20[1] | 10[1] | 20[5] | 10[1] |
| (b) Quantity, type | 20[5] | 20[5] | — | — | 10[5] |
| Water | 60 | 60 | 90 | 80 | 80 |
| 9. Monomer Material Non Crosslinking | | | | | |
| Styrene | 50 | — | 25 | — | — |
| Methylmethacrylate | — | 50 | 25 | 25 | — |
| Vinyltoluene | — | — | — | 25 | 50 |
| 9b. Monomer Material Crosslinking | | | | | |
| Divinylbenzene 50% | 10 | 10 | 10 | 10 | 10 |
| 10. Polymerization Initiator | | | | | |
| AZDN[6] | — | — | 2.5 | 2.5 | 2.5 |
| Potassium Persulfate | — | 2.5 | — | — | — |
| Sodium Bisulfite | — | 1.25 | — | — | — |
| Cumene Hydroperoxide | 2.5 | — | — | — | — |
| 11. Polymerization Conditions | | | | | |
| Time, hours | 5 | 6 | 5 | 6 | 5 |
| Temperature, °C. | 80 | 75 | 80 | 75 | 80 |
| Conversion, approx. 100% (X) | X | X | X | X | X |
| 12. Intraleucospheruloid Pigment Dispersion | | | | | |
| Yield | 760 | 760 | 760 | 760 | 760 |

*capable of effecting emulsion polymerization
[1]sodium salt of a sulfate ester of an alkylphenoxy poly(ethyleneoxy)ethanol 28% active
[2]copolymer of styrene, methacrylic acid and acrylonitrile, ratio 25/65/10
[3]copolymer of styrene, acrylonitrile, methacrylic acid and 4-vinylpyridine, ratio 25/10/29/36
[4]homopolymer of 4-vinylpyridine
[5]octylphenoxy polyethoxy ethanol (70% active)
[6]azobisisobutyronitrile
HiSil 233 tradename for PPG Industries precipitated silica, reinforcing grade
TiPure LW tradename for DuPont titanium dioxide pigment
Oncor 23A tradename for NL Industries antimony oxide pigment
Silene D tradename for PPG Industries precipitated silica, calcium modified
Excelopax tradename for NL Industries zirconium silicate

TABLE 11

Preparation of Intraleucospheruloid Pigment Compositions

| Example No. 11- | 1 | 2 | 3 | 4 | 5 |
|---|---|---|---|---|---|
| A. Micronizing Step | | | | | |
| 1. Pigment Class or Trade Name | Al-Sil-Ate HO | Excelopax Zirconium Silicate | Reinforcing Grade Wet PP | Paper Grade Wet PP | Ludox Colloidal Silica HS 40 |
| Pigment, dry basis | 30 | 40 | 40 | 40 | 35 |
| 2. Surface Active Agent* Material | | | | | |
| Duponol ME[1] | 2 | — | — | 2 | — |
| Triton X400[2] | — | 10 | — | — | — |
| Triton X405[3] | 10 | 10 | 10 | — | — |
| Alipal CO433[4] | — | — | 5 | 10 | — |
| Duomac T[5] | 2 | — | 2 | 2 | — |
| Acetic Acid | — | 5 | — | — | — |
| Ammonium Hydroxide 28% | 5 | — | 5 | 5 | — |
| 3. Water, Quantity | 251 | 285 | 288 | 241 | 265 |
| 4. Micronizing | | | | | |
| Method | Sand | Sand | Sand | Sand | None |
| Time, hours, approx. | 24 | 48 | 24 | 24 | — |
| Temperature, °C. | 28 | 28 | 28 | 28 | — |
| Average Particle Size Diameter (microns) | <0.2 | <0.2 | <0.02 | <0.2 | <0.02 |
| 5. Separation Screening (X) | X | X | X | X | X |
| 6. Water Dilution | 200 | 250 | 200 | 250 | 200 |
| 7. Yield - Aqueous Pigment Dispersion | 500 | 600 | 550 | 550 | 500 |
| B. Polymerization Step | | | | | |
| 8. Surface Active Agent* | | | | | |
| (a) Quantity, type | 10[1] | 10[2] | 30[3] | 10[1] | 30[3] |
| (b) Quantity, type | 20[3] | 20[3] | — | — | — |
| Water | 70 | 70 | 70 | 90 | 70 |
| 9. Monomer Material | | | | | |

TABLE 11-continued

Preparation of Intraleucospheruloid Pigment Compositions

| Example No. 11- | 1 | 2 | 3 | 4 | 5 |
|---|---|---|---|---|---|
| Non Crosslinking | | | | | |
| Styrene | 50 | 30 | — | 50 | 61 |
| 4 Vinylpyridine | — | 5 | — | — | 10.5 |
| Methacrylic Acid | 10 | — | — | 5 | 8.5 |
| Methylmethacrylate | — | 20 | 50 | 15 | — |
| 9b. Monomer Material Crosslinking | | | | | |
| Divinylbenzene 50% | 10 | 10 | 10 | 10 | 10 |
| 10. Polymerization Initiator | | | | | |
| AZDN[6] | 2.5 | 2.5 | — | 2.5 | — |
| Cumene Hydroperoxide | — | — | 2.5 | — | 3.0 |
| 11. Polymerization Conditions | | | | | |
| Time, hours | 5 | 5 | 5 | 5 | 5 |
| Temperature, °C. | 80 | 80 | 80 | 80 | 80 |
| Conversion, approx. 100% (X) | X | X | X | X | X |
| 12. Intraleucospheruloid Pigment Dispersion Yield | 670 | 765 | 710 | 730 | 690 |

*capable of effecting emulsion polymerization
[1]sodium lauryl sulfate (100% active)
[2]stearyl dimethyl benzyl ammonium chloride (82% active)
[3]octylphenoxy polyethoxy ethanol (70% active)
[4]sodium salt of a sulfate ester of an alkylphenoxy poly(ethyleneoxy)ethanol (28% active)
[5]N-tallow trimethylene diamine diacetate (85% active)
[6]azobisisobutyronitrile
Al-Sil-Ate HO tradename for Freeport Kaolin Aluminum silicate
Excelopax tradename for NL Industries zirconium silicate
Ludo$^x$ tradename for DuPont colloidal silica

TABLE 12

Preparation of Intraleucospheruloid Pigment Compositions (parts by weight)

| Example No. 12- | 1 | 2 | 3 | 4 | 5 |
|---|---|---|---|---|---|
| A. Micronizing Step | | | | | |
| 1. Pigment Class or Trade Name | TiPure LW | Unitane OR 450 | Titanox RA | TiPure R941 Slurry | Oncor 23A |
| Pigment, dry basis | 40 | 40 | 40 | 40 | 40 |
| 2. Surface Active Agent* Material | | | | | |
| Alipal CO 433[1] | 40 | 20 | — | — | 20 |
| Triton X405[2] | — | — | — | 40 | 20 |
| Monaquat TIBO[3] | — | 2 | 40 | 2 | 2 |
| Ammonium Hydroxide 28% | 10 | 5 | — | 5 | 5 |
| Acetic Acid | — | — | 20 | — | — |
| 3. Water, quantity | 310 | 283 | 300 | 263 | 263 |
| 4. Micronizing | | | | | |
| Method | Ball | Sand | Ball | Sand | Sand |
| Time, hours, approx. | 36 | 24 | 36 | 24 | 36 |
| Temperature, °C. | 28 | 28 | 28 | 28 | 28 |
| Average Particle Size Diameter (microns) | <0.2 | <0.2 | <0.2 | <0.2 | <0.2 |
| 5. Separation Screening (X) | X | X | X | X | X |
| 6. Water Dilution | 200 | 200 | 200 | 200 | 200 |
| 7. Yield - Aqueous Pigment Dispersion | 600 | 550 | 600 | 550 | 550 |
| B. Polymerization Step | | | | | |
| 8. Surface Active Agent* | | | | | |
| (a) Quantity, type | 30[1] | 30[1] | 20[2] | 20[2] | 30[1] |
| (b) Quantity, type | — | — | — | — | 10[2] |
| Water | 60 | 60 | 80 | 70 | 50 |
| Ammomium Hydroxide 28% | 10 | 10 | — | 10 | 10 |
| 9. Monomer Material | | | | | |
| Styrene | 60 | — | 60 | 40 | — |
| Methylmethacrylate | — | 70 | — | 30 | 70 |
| Methacrylic Acid | — | — | 10 | — | — |
| Dimethylaminoethylmethacrylate | 5 | 5 | — | 5 | 5 |
| 9b. Monomer Material Crosslinking | | | | | |
| Divinylbenzene 50% | 20 | — | 20 | 20 | — |
| Ethyleneglycoldimethacrylate | — | 10 | — | — | 10 |
| 10. Polymerization Initiator | | | | | |
| AZDN[4] | 3 | 3 | — | 3 | — |
| Potassium Persulfate | — | — | 2.5 | — | 2.5 |
| Sodium bisulfite | — | — | 1.25 | — | 1.25 |
| 11. polymerization Conditions | | | | | |

TABLE 12-continued

Preparation of Intraleucospheruloid Pigment Compositions
(parts by weight)

| Example No. 12- | 1 | 2 | 3 | 4 | 5 |
|---|---|---|---|---|---|
| Time, hours | 5 | 5 | 6 | 5 | 7 |
| Temperature, °C. | 80 | 80 | 70 | 80 | 65 |
| Conversion, approx. 100% (X) | X | X | X | X | X |
| 12. Intraleucospheruloid Pigment Dispersion - Yield | 785 | 735 | 790 | 745 | 735 |

*capable of effecting emulsion polymerization
[1] sodium salt of a sulfate ester of an alkylphenoxy poly(ethyleneoxy)ethanol (28 active)
[2] octylphenoxy polyethoxy ethanol (70% active)
[3] substituted imidazoline quaternized with benzyl chloride (100% active)
[4] azobisisobutyronitrile
TiPure LW tradename for DuPont titanium dioxide pigment
Unitane OR 450 tradename for American Cyanamid titanium dioxide pigment
Titanox RA tradename for NL Industries titanium dioxide pigment
TiPure R 941 tradename for DuPont titanium dioxide pigment
Oncor 23A tradename for NL Industries antimony oxide pigment

TABLE 13

Preparation of Intraleucospheruloid Pigment Compositions
(parts by weight)

| Example No. 13- | 1 | | 2 | |
|---|---|---|---|---|
| A. Dispersion and/or Micronizing Step | | | | |
| 1. Pigment Class or Trade Name | Silene D | Aluminum | HiSil 233 | Zinc Oxide |
| Pigment, dry basis | 20 | 40 | 20 | 20 |
| 2. Surface Active Agent* Material | | | | |
| Alipal CO 433[1] | 20 | | 20 | |
| Monazoline T[2] | 2 | | — | |
| Triton X 405[3] | 10 | | 10 | |
| Ammonium Hydroxide 28% | 5 | | — | |
| 3. Water, Quantity | 303 | | 280 | |
| 4. Dispersing or Micronizing Step | | | | |
| Method | Sand | | Sand | |
| Time, hours, approx. | 48 | | 48 | |
| Temperature | 28 | | 28 | |
| Average particle size Diameter (microns) | <0.2 | | <0.2 | |
| 5. Separation Screening (X) | | | | |
| 6. Water Dilution | 250 | | 250 | |
| 7. Yield Aqueous Pigment Dispersion | 650 | | 600 | |
| B. Polymerization Step | | | | |
| 8. Surface Active Agent* | | | | |
| (a) Quantity, type | 35[3] | | 20[3] | |
| (b) Quantity, type | — | | — | |
| Water | 65 | | 80 | |
| 9. Monomer Material Non Crosslinking | | | | |
| Vinyltoluene | 40 | | 50 | |
| Acrylonitrile | 10 | | — | |
| dimethylaminoethylmethacrylate | 5 | | 10 | |
| 9b. Monomer Material Crosslinking | | | | |
| Ethyleneglycoldimethacrylate | 10 | | 10 | |
| 10. Polymerization Initiator | | | | |
| AZDN[4] | — | | 3 | |
| Cumene hydroperoxide | 3 | | — | |
| 11. Polymerization Conditions | | | | |
| Time, hours | 6 | | 6 | |
| Temperature, °C. | 80 | | 80 | |
| Conversion, Approx. 100% (X) | X | | X | |
| 12. Intraleucospheruloid Pigment Dispersion Yield | 815 | | 770 | |

*capable of effecting emulsion polymerization
[1] sodium salt of a sulfate ester of an alkylphenoxy poly(ethyleneoxy)ethanol (28% active)
[2] substituted imidazoline of tall oil (100% active)
[3] octylphenoxy polyethoxy ethanol (70% active)
[4] azobisisobutyronitrile
Silene D tradename for PPG Industries precipitated silica, calcium modified
HiSil 233 tradename for PPG Industries precipitated silica, reinforcing grade

TABLE 14

Preparation of Intraleucospheruloid Pigment Compositions (parts by weight)

| Example No. 14 | 1 | | 2 | |
|---|---|---|---|---|
| A. Dispersion and/or Micronizing Step | | | | |
| 1. Pigment Class or Trade Name | HiSil 233 | TiPure R941 Slurry | HiSil 404 | Zirconium Oxide |
| Pigment, dry basis | 20 | 40 | 20 | 40 |
| 2. Surface Active Agent* Material | | | | |
| Alipal CO 433[1] | — | | 20 | |
| Monazoline T[2] | 20 | | 2 | |
| Triton X400[3] | — | | — | |
| Triton X405[4] | 20 | | 10 | |
| Acetic Acid | 10 | | — | |
| Ammonium Hydroxide 28% | — | | 10 | |
| 3. Water, Quantity | 290 | | 298 | |
| 4. Dispersing or Micronizing | | | | |
| Method | Sand | | Ball | |
| Time, hours, approx. | 48 | | 60 | |
| Temperature, °C. | 28 | | 28 | |
| Average Particle Size Diameter (microns) | <0.2 | | <0.2 | |
| 5. Separation Screening (X) | X | | X | |
| 6. Water Dilution | 300 | | 300 | |
| 7. Yield Aqueous Pigment Dispersion | 700 | | 700 | |
| B. Polymerization Step | | | | |
| 8. Surface Active Agent* | | | | |
| (a) Quantity, type | 45[3] | | 20[3] | |
| (b) Quantity, type | — | | — | |
| Water | 55 | | 80 | |
| 9. Monomer Material Non Crosslinking | | | | |
| Styrene | 40 | | 70 | |
| Methylmethacrylate | 30 | | — | |
| 9b. Monomer Material Crosslinking | | | | |
| Divinylbenzene 50% | 10 | | 10 | |
| 10. Polymerization Initiator | | | | |
| AZDN[5] | 3 | | — | |
| Cumene Hydroperoxide | — | | 3 | |
| 11. Polymerization Conditions | | | | |
| Time, hours | 5 | | 5 | |
| Temperature, °C. | 80 | | 80 | |
| Conversion, Approx. 100% (X) | X | | X | |
| 12. Intraleucospheruloid Pigment Dispersion Yield | 880 | | 880 | |

*capable of effecting emulsion polymerization
[1] sodium salt of a sulfate ester of an alkylphenoxy poly(ethyleneoxy)ethanol (28% active)
[2] substituted imidazoline of tall oil (100% active)
[3] stearyl dimethyl benzyl ammonium chloride (82% active)
[4] octylphenoxy polyethoxy ethanol (70% active)
[5] azobisisobutyronitrile
HiSil 233 tradename for PPG Industries precipated silica, reinforcing grade
TiPure R941 tradename for DuPont titanium dioxide pigment
HiSil 404 tradename for PPG Industries precipitated silica, paper grade

TABLES 15-20

Preparation of Intrachromospheruloid/Intraleucospheruloid Pigment Material Compositions from Combinations of Material Produced in Tables 1-7 and 8-14.

TABLE 15

Preparation of Intrachromospheruloid/Intraleucospheruloid Pigment Compositions (parts by weight)

| Example No. 15 | 1 | 2 | 3 | 4 | 5 |
|---|---|---|---|---|---|
| 1. Intrachromospheruloid Pigment Material Dispersion | | | | | |
| Table No. | 1-1 | 1-2 | 1-3 | 1-4 | 1-5 |
| Quantity | 70 | 670 | 690 | 68 | 660 |
| Pigment Solids | 12 | 95 | 125 | 10 | 90 |
| pH | 8-9 | 8-9 | 7-8 | 7-8 | 8-9 |

TABLE 15-continued

Preparation of Intrachromospheruloid/Intraleucospheruloid Pigment Compositions
(parts by weight)

| Example No. 15 | 1 | 2 | 3 | 4 | 5 |
|---|---|---|---|---|---|
| 2. Water | 1210 | 1610 | 1540 | 1212 | 1570 |
| 3. Intraleucospheruloid Pigment Material Dispersion | | | | | |
| Table No. | 8-1 | 8-2 | 8-3 | 8-4 | 8-5 |
| Quantity | 720 | 720 | 770 | 720 | 770 |
| Pigment Solids | 110 | 110 | 110 | 110 | 110 |
| pH | 8-9 | 5-6 | 8-9 | 8-9 | 8-9 |
| 4. Temperature, °C. | 28 | 28 | 28 | 28 | 28 |
| pH | 8-9 | 6-7 | 8 | 8-9 | 8-9 |
| 5. Nitrogenous Material | | | | | |
| Tetraethylenepentamine | 2 | — | 2 | 2 | 2 |
| 6. Temperature, °C. | 28 | 28 | 28 | 28 | 28 |
| pH | 8-9 | 6-7 | 8 | 8-9 | 8-9 |
| 7. Bonding Agent Material | | | | | |
| "N" sodium silicate 28%[1] | 50 | — | — | — | 50 |
| SMA copolymer[2] | — | 20 | — | — | — |
| Z6020 Silane[3] | — | — | 2 | 2 | 2 |
| 8. Destabilizing Agent Material | | | | | |
| (a) Acid (X)[4] | X | X | — | X | X |
| (b) Base (X) | — | — | — | — | — |
| (c) Alcohol (X)[5] | — | X | X | — | — |
| 9. Temperature, °C. | 30 | 30 | 30 | 30 | 30 |
| pH | 5-6 | 5-6 | 8 | 5-6 | 5-6 |
| 10. Reaction Temperature, °C. | 75 | 75 | 70 | 75 | 75 |
| 11. Reaction Time, hours, approx. | 4 | 4 | 4 | 4 | 4 |
| 12. Particle Size Diameter (microns) | <4.0 | <4.0 | <4.0 | <4.0 | <4.0 |
| 13. Yield - Intrachromospheruloid Intraleucospheruloid Pigment Dispersion, approx. | 2000 | 3000 | 3000 | 2000 | 3000 |
| 14. Pigment Recovery Method | | | | | |
| Filtration (X) | X | X | — | X | X |
| Spray Drying (X) | — | — | X | — | — |
| 15. Product Available As | | | | | |
| Wet Coagulum (X) | X | X | — | X | X |
| Dry Coagulum (X)[6] | X | X | — | X | X |
| Spray Dried Powder (X) | — | — | X | — | — |
| 16. Intrachromospheruloid/ Intraleucospheruloid Pigment Composition Yield - dry basis | 138 | 225 | 304 | 124 | 218 |

[1]28% sodium silicate aqueous solution
[2]copolymer of styrene methacrylic acid and acrylonitrile, ratio 25/65/10
[3]N-(2-aminoethyl)-3-aminopropyltrimethoxysilane
[4]acetic
[5]isopropyl
[6]when dried

TABLE 16

Preparation of Intrachromospheruloid/Intraleucospheruloid Pigment Compositions
(parts by weight)

| Example No. 16- | 1 | 2 | 3 | 4 | 5 |
|---|---|---|---|---|---|
| 1. Intrachromospheruloid Pigment Material Dispersion | | | | | |
| Table No. | 2-1 | 2-2 | 2-3 | 2-4 | 2-5 |
| Quantity | 670 | 670 | 68 | 670 | 670 |
| Pigment Solids | 120 | 100 | 9 | 110 | 90 |
| pH | 8-9 | 8-9 | 7-8 | 8-9 | 5-6 |
| 2. Water | 1545 | 1660 | 1192 | 1600 | 1640 |
| 3. Intraleucospheruloid Pigment Material Dispersion | | | | | |
| Table No. | 12-1 | 9-2 | 9-3 | 9-4 | 9-5 |
| Quantity | 785 | 670 | 740 | 730 | 690 |
| Pigment Solids | 125 | 100 | 130 | 120 | 120 |
| pH | 8-9 | 8-9 | 8-9 | 8-9 | 8-9 |
| 4. Temperature, °C. | 28 | 28 | 28 | 28 | 28 |
| pH | 8-9 | 8-9 | 8 | 8-9 | 6-7 |
| 5. Nitrogenous Material | | | | | |
| Monazoline T[1] | 2 | — | 2 | — | — |
| Monaquat TIBC[2] | — | — | — | 2 | — |
| PEI 600[3] | — | 5 | 20 | 3 | — |
| 6. Temperature, °C. | 28 | 28 | 28 | 28 | 28 |
| pH | 8-9 | 8-9 | 8 | 8-9 | 6-7 |
| 7. Bonding Agent Material | | | | | |
| Aminoplast[4] | 20 | — | — | — | — |
| Phenoplast[5] | — | 20 | — | — | — |
| Titanium Tetrachloride | — | — | — | — | 20 |
| "N" Sodium Silicate 28%[6] | — | — | — | 50 | — |
| 8. Destabilizing Agent Material | | | | | |

TABLE 16-continued

Preparation of Intrachromospheruloid/Intraleucospheruloid Pigment Compositions
(parts by weight)

| Example No. 16- | 1 | 2 | 3 | 4 | 5 |
|---|---|---|---|---|---|
| (a) Acid (X)[7] | X | X | — | X | — |
| (b) Base (X)[8] | — | — | — | — | X |
| (c) Alcohol (X)[9] | — | — | X | — | — |
| 9. Temperature, °C. | 28 | 28 | 28 | 28 | 28 |
| pH | 5-6 | 5-6 | 8 | 5-6 | 9-10 |
| 10. Reaction Temperature, °C. | 75 | 75 | 70 | 75 | 75 |
| 11. Reaction Time, hours, approx. | 4 | 4 | 5 | 4 | 4 |
| 12. Particle Size Diameter, (microns) | <4.0 | <4.0 | <4.0 | <4.0 | <4.0 |
| 13. Yield - Intrachromospheruloid/ Intraleucospheruloid Pigment Dispersion Approx. | 2500 | 3000 | 3000 | 2500 | 2500 |
| 14. Pigment Recovery Method | | | | | |
| Filtration (X) | X | X | X | X | X |
| Spray Drying (X) | — | — | — | — | — |
| 15. Product Available As | | | | | |
| Wet Coagulum (X) | X | X | X | X | X |
| Dry Coagulum (X)[10] | X | X | X | X | X |
| Spray Dried Powder (X) | — | — | — | — | — |
| 16. Intrachromospheruloid/ Intraleucospheruloid Pigment Composition Yield - Dry Basis | 267 | 225 | 141 | 249 | 215 |

[1] substituted imidazoline of tall oil (100% active)
[2] substituted imidazoline quaternized with benzyl chloride (100% active)
[3] water soluble polyethylenimine manufactured by Dow
[4] condensation product 1 mole urea with 1.2 mole of formaldehyde water dispersible
[5] condensation product of 1 mole of m-aminophenol with 1.3 mole of formaldehyde water dispersible
[6] 28% sodium silicate aqueous solution
[7] aq. HCl
[8] NH₄OH
[9] isopropyl
[10] when dried

TABLE 17

Preparation of Intrachromospheruloid/Intraleucospheruloid Pigment Compositions
(parts by weight)

| Example No. 17 | 1 | 2 | 3 | 4 | 5 |
|---|---|---|---|---|---|
| 1. Intrachromospheruloid Pigment Material Dispersion | | | | | |
| Table No. | 3-1 | 3-2 | 3-3 | 3-4 | 3-5 |
| Quantity | 675 | 580 | 670 | 700 | 675 |
| Pigment Solids | 105 | 100 | 95 | 135 | 100 |
| pH | 7-8 | 5-6 | 5-6 | 5-6 | 5-6 |
| 2. Water | 1565 | 1660 | 1570 | 1510 | 1565 |
| 3. Intraleucospheruloid Pigment Material Dispersion | | | | | |
| Table No. | 10-1 | 10-2 | 10-3 | 12-3 | 10-4 |
| Quantity | 760 | 760 | 760 | 790 | 760 |
| Pigment Solids | 100 | 100 | 100 | 130 | 100 |
| pH | 8-9 | 8-9 | 7-8 | 5-6 | 5-6 |
| 4. Temperature, °C. | 28 | 28 | 28 | 28 | 28 |
| pH | 8 | 7 | 6 | 5-6 | 5-6 |
| 5. Nitrogenous Material | | | | | |
| Tetraethylenepentamine | 2 | — | — | — | — |
| Duomac T[1] | — | 2 | — | — | — |
| PEI 18[2] | — | — | — | 5 | — |
| 6. Temperature, °C. | 28 | 28 | 28 | 28 | 28 |
| pH | 8 | 7 | 6 | 5-6 | 5-6 |
| 7. Bonding Agent Material | | | | | |
| "N" sodium silicate 28%[3] | 50 | — | — | — | 25 |
| Urea | — | 10 | — | — | — |
| Formaldehyde | — | 35 | — | — | — |
| SMA Copolymer[4] | — | — | — | 25 | — |
| 8. Destabilizing Agent Material | | | | | |
| (a) Acid (X)[5] | X | X | — | — | — |
| (b) Base (X) | — | — | — | — | — |
| (c) Alcohol (X) | — | — | X | — | — |
| 9. Temperature, °C. | 30 | 30 | 30 | 30 | 30 |
| pH | 5-6 | 5-6 | 6 | 7 | 7 |
| 10. Reaction Temperature, °C. | 80 | 80 | 70 | 75 | 75 |
| 11. Reaction Time, hrs., Approx. | 4 | 4 | 5 | 4 | 4 |
| 12. Particle Size Diameter (Microns) | <4.0 | <4.0 | <4.0 | <4.0 | <4.0 |
| 13. Yield - Intrachromospheruloid/ Intraleucospheruloid Pigment Dispersion approx. | 3000 | 3000 | 3000 | 3000 | 3000 |
| 14. Pigment Recovery Method | | | | | |
| Filteration (X) | X | X | X | X | X |

TABLE 17-continued

Preparation of Intrachromospheruloid/Intraleucospheruloid Pigment Compositions
(parts by weight)

| Example No. 17 | 1 | 2 | 3 | 4 | 5 |
|---|---|---|---|---|---|
| Spray Drying (X) | — | — | — | — | — |
| 15. Product Available As | | | | | |
|     Wet Coagulum (X) | X | X | X | X | X |
|     Dry Coagulum (X)[6] | X | X | X | X | X |
|     Spray Dried Powder (X) | — | — | — | — | — |
| 16. Intrachromospheruloid Intraleucospheruloid Pigment Composition Yield - Dry Basis | 221 | 214 | 195 | 295 | 207 |

[1] N-tallow trimethylenediamine diacetate (85% active)
[2] water soluble polyethylenimine, manufactured by Dow
[3] 28% sodium silicate aqueous solution
[4] copolymer of styrene, methacrylic acid and acrylonitrile, ratio 25/65/10
[5] hydroxyacetic
[6] when dried

TABLE 18

Preparation of Intrachromospheruloid/Intraleucospheruloid Pigment Compositions
(parts by weight)

| Example No. 18 | 1 | 2 | 3 | 4 | 5 |
|---|---|---|---|---|---|
| 1. Intrachromospheruloid Pigment Material Dispersion | | | | | |
|   Table No. | 4-1 | 4-2 | 4-3 | 4-4 | 4-5 |
|   Quantity | 670 | 680 | 680 | 690 | 700 |
|   Pigment Solids | 90 | 110 | 110 | 110 | 130 |
|   pH | 7-8 | 8-9 | 8-9 | 8-9 | 7-8 |
| 2. Water | 1570 | 1555 | 1610 | 1620 | 1565 |
| 3. Intraleucospheruloid Pigment Material Dispersions | | | | | |
|   Table No. | 10-5 | 11-2 | 11-3 | 11-5 | 12-5 |
|   Quantity | 760 | 765 | 710 | 690 | 735 |
|   Pigment Solids | 100 | 105 | 100 | 125 | 125 |
|   pH | 8-9 | 5-6 | 7-8 | 8-9 | 8-9 |
| 4. Temperature, °C. | 28 | 28 | 28 | 28 | 28 |
|   pH | 8-9 | 6-7 | 8-9 | 8-9 | 8-9 |
| 5. Nitrogenous Material | | | | | |
|   Tetraethylenepentamine | 2 | — | — | 2 | — |
|   Monaquat TIBC[1] | — | 2 | — | 2 | — |
| 6. Temperature, °C. | 28 | 28 | 28 | 28 | 28 |
|   pH | 8-9 | 6-7 | 8-9 | 8-9 | 8-9 |
| 7. Bonding Agent Material | | | | | |
|   SMAV Amphoteric Copolymer[2] | 20 | — | — | — | — |
|   SMA Copolymer[3] | — | 20 | — | — | — |
|   N Group Polymer[4] | — | — | — | 20 | — |
|   Z6020 Silane[5] | 2 | 1 | 4 | — | 1 |
| 8. Destabilizing Agent Material | | | | | |
|   (a) Acid (X)[6] | X | X | X | X | X |
|   (b) Base (X) | — | — | — | — | — |
|   (c) Alcohol (X)[7] | — | — | — | X | — |
| 9. Temperature, °C. | 30 | 30 | 30 | 30 | 30 |
|   pH | 5-6 | 5-6 | 5-6 | 7 | 5-6 |
| 10. Reaction temperature, °C. | 80 | 80 | 80 | 70 | 80 |
| 11. Reaction Time, hours, approx. | 3 | 3 | 3 | 4 | 3 |
| 12. Particle Size Diameter (microns) | <4.0 | <4.0 | <4.0 | <4.0 | <4.0 |
| 13. Yield - Intrachromospheruloid/ Intraleucospheruloid Pigment Dispersion approx. | 3000 | 3000 | 3000 | 3000 | 3000 |
| 140 Pigment Recovery Method | | | | | |
|   Filtration (X) | X | X | X | — | X |
|   Spray Drying (X) | — | — | — | X | — |
| 15. Product Available As | | | | | |
|   Wet Coagulum (X) | X | X | X | — | X |
|   Dry Coagulum (X)[8] | X | X | X | — | X |
|   Spray Dried Powder (X) | — | — | — | X | — |
| 16. Intrachromospheruloid/ Intraleucospheruloid Pigment Composition Yield Dry Basis | 214 | 238 | 211 | 347 | 256 |

[1] substituted imidazoline quaternized with benzyl chloride (100% active)
[2] amphoteric copolymer of styrene, acrylonitrile, methacrylic acid and 4-vinylpyridine, ratio 25/10/29/36
[3] copolymer of styrene, methacrylic acid and acrylonitrile, ratio 25/65/10
[4] copolymer of 4-vinylpyridine
[5] N-(2-aminoethyl)-3-aminopropyltrimethoxysilane, manufactured by Dow
[6] acetic
[7] isopropyl
[8] when dried

TABLE 19

Preparation of Intrachromospheruloid/Intraleucospheruloid Pigment Compositions (parts by weight)

| Example No. 19- | 1 | 2 | 3 | 4 | 5 |
|---|---|---|---|---|---|
| 1. Intrachromospheruloid Pigment Material Dispersion | | | | | |
| Table No. | 5-1 | 5-2 | 5-3 | 5-4 | 5-5 |
| Quantity | 690 | 700 | 700 | 690 | 690 |
| Pigment Solids | 115 | 120 | 125 | 110 | 120 |
| pH | 8-9 | 8-9 | 8-9 | 8-9 | 8-9 |
| 2. Water | 1580 | 1620 | 1565 | 1640 | 1565 |
| 3. Intraleucospheruloid Pigment Material Dispersion | | | | | |
| Table No. | 11-4 | 9-1 | 12-2 | 11-1 | 12-4 |
| Quantity | 730 | 680 | 735 | 670 | 745 |
| Pigment Solids | 120 | 110 | 125 | 100 | 135 |
| pH | 8-9 | 5-6 | 8-9 | 8-9 | 8-9 |
| 4. Temperature, °C. | 28 | 28 | 28 | 28 | 28 |
| pH | 8-9 | 7 | 8-9 | 8-9 | 8-9 |
| 5. Nitrogenous Material | | | | | |
| Tetraethylenepentamine | — | 2 | — | 2 | — |
| 6. Temperature, °C. | 28 | 28 | 28 | 28 | 28 |
| pH | 8-9 | 7 | 8-9 | 8-9 | 8-9 |
| 7. Bonding Agent Material | | | | | |
| N Sodium Silicate 28%[1] | 50 | — | 50 | 50 | 50 |
| SMA Copolymer[2] | 10 | — | — | 10 | — |
| SMAV Copolymer[3] | — | — | 20 | — | — |
| 8. Destabilizing Agent Material | | | | | |
| (a) Acid (X)[4] | X | — | X | X | X |
| (b) Base (X)[5] | — | — | — | — | — |
| (c) Alcohol (X) | — | X | — | — | — |
| 9. Temperature, °C. | 30 | 30 | 30 | 30 | 30 |
| pH | 5-6 | 7 | 5-6 | 5-6 | 5-6 |
| 10. Reaction Temperature, °C. | 80 | 70 | 80 | 80 | 80 |
| 11. Reaction Time, Hours, Approx. | 3 | 4 | 3 | 3 | 3 |
| 12. Particle Size Diameter (microns) | <4.0 | <4.0 | <4.0 | <4.0 | <4.0 |
| 13. Yield - Intrachromospheruloid/ Intraleucospheruloid Pigment Dispersion approx. | 3000 | 3000 | 3000 | 3000 | 3000 |
| 14. Pigment Recovery Method | | | | | |
| Filtration (X) | X | X | X | X | X |
| Spray Drying (X) | — | — | — | — | — |
| 15. Product Available As | | | | | |
| Wet Coagulum (X) | X | X | X | X | X |
| Dry Coagulum (X)[6] | X | X | X | X | X |
| Spray Dried Powder (X) | — | — | — | — | — |
| 16. Intrachromospheruloid/ Intraleucospheruloid Pigment Composition - Dry Basis | 259 | 232 | 284 | 236 | 269 |

[1] 28% sodium silicate aqueous solution
[2] copolymer of styrene, methacrylic acid and acrylonitrile, ratio 25/65/10
[3] amphoteric copolymer of styrene, methacrylic acid, acrylonitrile and 4-vinylpyridine, ratio 25/10/29/36
[4] aq. HCl
[5] aq. NaOH
[6] when dried

TABLE 20

Preparation of Intrachromospheruloid/Intraleucospheruloid Pigment Compositions (parts by weight)

| Example No. 20 | 1 | 2 | 3 | 4 |
|---|---|---|---|---|
| 1. Intrachromospheruloid Pigment Material Dispersion | | | | |
| Table No. | 6-1 | 6-2 | 7-1 | 7-2 |
| Quantity | 680 | 680 | 680 | 680 |
| Pigment Solids | 110 | 110 | 120 | 110 |
| pH | 8-9 | 5-6 | 8-9 | 5-6 |
| 2. Water | 1505 | 1550 | 1440 | 1440 |
| 3. Intraleucospheruloid Pigment Material Dispersion | | | | |
| Table No. | 13-1 | 13-2 | 14-1 | 14-2 |
| Quantity | 815 | 770 | 880 | 880 |
| Pigment Solids | 125 | 110 | 140 | 140 |
| pH | 8-9 | 8-9 | 5-6 | 8-9 |
| 4. Temperature, °C. | 28 | 28 | 28 | 28 |
| pH | 8-9 | 7 | 7 | 7 |
| 5. Nitrogenous Material | | | | |
| Tetraethylenepentamine | 2 | — | — | — |
| 6. Temperature, °C. | 28 | 28 | 28 | 28 |
| pH | 8-9 | 7 | 7 | 7 |
| 7. Bonding Agent Material | | | | |
| "N" Sodium Silicate 28%[1] | 50 | — | — | — |

TABLE 20-continued

Preparation of Intrachromospheruloid/Intraleucospheruloid Pigment Compositions
(parts by weight)

| Example No. 20 | 1 | 2 | 3 | 4 |
|---|---|---|---|---|
| 8. Destabilizing Agent Material | | | | |
| (a) Acid (X) [2] | X | — | — | — |
| (b) Base (X) | — | — | — | — |
| (c) Alcohol (X) [3] | — | X | X | X |
| 9. Temperature, °C. | 30 | 30 | 30 | 30 |
| pH | 5–6 | 7 | 7 | 7 |
| 10. Reaction Temperature, °C. | 80 | 70 | 70 | 70 |
| 11. Reaction Time, hours, approx. | 3 | 4 | 4 | 4 |
| 12. Particle Size Diameter (microns) | <4.0 | <4.0 | <4.0 | <4.0 |
| 13. Yield - Intrachromospheruloid/ Intraleucospheruloid Pigment Dispersion | 3000 | 3000 | 3000 | 3000 |
| 14. Pigment Recovery Method | | | | |
| Filtration (X) | X | X | X | X |
| Spray Drying (X) | — | — | — | — |
| 15. Product Available As | | | | |
| Wet Coagulum (X) | X | X | X | X |
| Dry Coagulum (X) [4] | X | X | X | X |
| Spray Dried Powder (X) | — | — | — | — |
| 16. Intrachromospheruloid/ Intraleucospheruloid Pigment Composition Yield - Dry Basis | 251 | 220 | 260 | 250 |

[1] 28% sodium silicate aqueous solution
[2] aq. $H_2SO_4$
[3] isopropyl
[4] when dried

TABLES 21–27

Preparation of Intrachromospheruloid Pigment Material using Noncross-linked Polymer Material

TABLE 21

Preparation of Intrachromospheruloid Pigment Compositions
(parts by weight)

| Example No. 21- | 1 | 2 | 3 | 4 | 5 |
|---|---|---|---|---|---|
| A. Micronizing Step | | | | | |
| 1. Pigment Class | Phthalocyanine | Quinacridone | Azamethine | Dioxazine | Azo |
| Trade Name | Heliogen Blue BG | Monastral Red B | Irgazin Yellow 3RLT | Irgazin Violet 6RLT | Hansa Yellow G |
| Color Index Name | Blue 15 | Violet 19 | Yellow 110 | — | Yellow 1 |
| Color Index Number | 74160 | 46500 | — | — | 11680 |
| Pigment, dry basis | 20 | 30 | 40 | 20 | 40 |
| Presscake, dry solids | 35 | — | — | — | 35 |
| Presscake, wet | 57 | — | — | — | 115 |
| 2. Surface Active Agent* Material (Trade Name) | | | | | |
| Alipal Co 433[1] | 18 | 178 | — | 10 | 5 |
| Tamol SN[2] | 2 | 2 | 1 | — | — |
| Duponol ME[3] | — | — | 2 | 5 | 5 |
| Tamol 731[4] | — | — | 7 | 5 | 5 |
| Triton X405[5] | — | — | — | — | 10 |
| 3. Water, Quantity | 163 | 220 | 250 | 260 | 260 |
| 4. Micronizing | | | | | |
| Method | Sand | Sand | Sand | Ball | Sand |
| Time, hours, approx. | 48 | 24 | 48 | 60 | 48 |
| Temperature, °C. | 28 | 28 | 28 | 28 | 28 |
| Average Particle Size Diameter (microns) | <0.02 | <0.2 | <0.2 | <0.02 | <0.2 |
| 5. Separation, Screening (X) | X | X | X | X | X |
| 6. Water, dilution | 160 | 70 | 200 | 200 | 200 |
| 7. Yield - Aqueous Pigment Dispersion | 400 | 500 | 500 | 500 | 600 |
| B. Polymerization Step | | | | | |
| 8. Surface Active Agent* | | | | | |
| (a) Quantity, type | 60[1] | — | 25[3] | 25[3] | 20[3] |
| (b) Quantity, type | — | — | 10[4] | — | — |
| Water | 40 | — | 65 | 75 | 80 |
| 9. Monomer Material Non Crosslinking | | | | | |
| Styrene | 100 | — | — | 40 | — |
| Vinyltoluene | — | 95 | — | — | — |
| Acrylonitrile | — | 5 | — | 10 | 10 |
| Methylmethacrylate | — | — | 70 | 20 | 60 |

TABLE 21-continued

Preparation of Intrachromospheruloid Pigment Compositions
(parts by weight)

| Example No. 21- | 1 | 2 | 3 | 4 | 5 |
|---|---|---|---|---|---|
| 10. Polymerization Initiator | | | | | |
| AZDN[6] | — | 3 | 3 | — | 3 |
| Potassium Persulfate | 3 | — | — | 3 | — |
| Sodium Bisulfite | 1.5 | — | — | 1.5 | — |
| 11. Polymerization Conditions | | | | | |
| Time, hours | 6 | 5 | 5 | 6 | 5 |
| Temperature, °C. | 65 | 80 | 80 | 70 | 80 |
| Conversion, approx. 100% (X) | X | X | X | X | X |
| 12. Intrachromospheruloid Pigment Dispersion Yield | 600 | 600 | 670 | 670 | 770 |

*capable of effecting emulsion polymerization
[1]sodium salt of a sulfate ester of an alkylphenoxy poly(ethyleneoxy)ethanol (28% active)
[2]sodium salt of a condensed naphthalene sulfonic acid
[3]sodium lauryl sulfate (100% active)
[4]sodium salt of a polymeric carboxylic acid (100% active)
[5]octylphenoxy polyethoxy ethanol (70% active)
[6]azobisisobutyronitrile

TABLE 22

Preparation of Intrachromospheruloid Pigment Compositions
(parts by weight)

| Example No. 22 | 1 | 2 | 3 | 4 | 5 |
|---|---|---|---|---|---|
| A. Micronizing Step | | | | | |
| 1. Pigment Class | Triphenyl-methane | Vat | Misc. | Dioxazine | Cond. Azo |
| Trade Name | Rhodamine Y | Perylene Red | Green B. | Heliogen Violet R | Chromoptal Red BR |
| Color Index Name | Red 81 | Red 29 | Green 8 | Violet 23 | — |
| Color Index Number | 45160 | 71140 | 10006 | 51319 | — |
| Pigment, dry basis | 20 | 25 | 25 | 20 | 20 |
| Presscake, dry solids | 30 | 25 | 40 | — | — |
| Presscake, wet | 67 | 100 | 63 | — | — |
| 2. Surface Active Agent* Material (Trade Name) | | | | | |
| Duponol ME[1] | 2 | 5 | — | 10 | — |
| Blancol[2] | 1 | 2 | — | 2 | — |
| Triton X405[3] | — | — | 40 | — | 10 |
| Duomeen T[4] | — | — | — | — | 20 |
| Tamol 731[5] | 7 | — | — | — | — |
| 3. Water, Quantity | 223 | 193 | 197 | 268 | 250 |
| 4. Micronizing | | | | | |
| Method | Sand | Sand | Sand | Ball | Ball |
| Time, hours, approx. | 48 | 48 | 48 | 60 | 60 |
| Temperature, °C. | 28 | 28 | 28 | 28 | 28 |
| Average Particle Size Diameter (microns) | <0.02 | <0.02 | <0.2 | <0.02 | <0.2 |
| 5. Separation, Screening (X) | X | X | X | X | X |
| 6. Water, dilution | 200 | 200 | 200 | 200 | 200 |
| 7. Yield - Aqueous Pigment Dispersion | 500 | 500 | 500 | 500 | 500 |
| B. Polymerization Step | | | | | |
| 8. Surface Active Agent* | | | | | |
| (a) Quantity, type | 20[1] | 25[1] | 10[1] | 25[1] | 20[3] |
| (b) Quantity, type | 20[3] | — | 50[3] | — | 10[4] |
| Water | 80 | 75 | 40 | 75 | 70 |
| 9. Monomer Material | | | | | |
| Non Crosslinking | | | | | |
| Styrene | 40 | — | 50 | 48 | — |
| Cyclohexylmethacrylate | 20 | 20 | — | — | — |
| Methylmethacrylate | — | 20 | — | — | 38 |
| Dimethylaminoethylmethacrylate | — | — | — | 2 | 2 |
| Acrylonitrile | — | — | 10 | — | 10 |
| 10. Polymerization Initiator AXDN[6] | 2½ | 2½ | 2½ | 2½ | 2½ |
| 11. Polymerization Conditions | | | | | |
| Time, hours | 5 | 5 | 5 | 5 | 5 |
| Temperature, °C. | 80 | 80 | 80 | 80 | 80 |
| Conversion, approx. 100% (X) | X | X | X | X | X |
| 12. Intrachromosheruloid Pigment Dispersion | | | | | |

TABLE 22-continued

Preparation of Intrachromospheruloid Pigment Compositions
(parts by weight)

| Example No. 22 | 1 | 2 | 3 | 4 | 5 |
|---|---|---|---|---|---|
| Yield | 660 | 640 | 660 | 650 | 650 |

*capable of effecting emulsion polymerization
[1]sodium lauryl sulfate (100% active)
[2]sodium salt of a sulfonated napthalene-formaldehyde condensate (86% active)
[3]octylphenoxy polyethoxy ethanol (70% active)
[4]N-tallow trimethylene diamine (85% active)
[5]sodium salt of a polymeric carboxylic acid (100% active)
[6]azobisisobutyronitrile

TABLE 23

Preparation of Intrachromospheruloid Pigment Compositions
(parts by weight)

| Example No. 23 | 1 | 2 | 3 | 4 | 5 |
|---|---|---|---|---|---|
| A. Micronizing Step | | | | | |
| 1. Pigment Class | Phthalocyanine | Quinacridone | Azamethine | Dioxazine | Azo |
| Trade Name | Heliogen Green A | Magenta | Irgazin Yellow 2GLT | Carbazole Violet | Carmine FFY |
| Color Index Name | Green 7 | Red 122 | Yellow 109 | Violet 23 | Red 5 |
| Color Index Number | 74160 | — | — | 51319 | 12490 |
| Pigment, dry basis | 10 | 30 | 25 | 20 | 25 |
| Presscake, dry solids | — | — | — | 20 | 25 |
| Presscake, wet | — | — | — | 100 | 100 |
| 2. Surface Active Agent* Material (Trade Name) | | | | | |
| Triton X405[1] | 40 | — | — | 20 | 10 |
| Monazoline T[2] | — | 20 | — | 10 | 20 |
| Monaquat TIBC[3] | — | 20 | 10 | 20 | — |
| Zonyl FSC[4] | — | 1 | 1 | — | — |
| Armac C[5] | — | — | 10 | — | 20 |
| Zonyl FSN[6] | 1 | — | — | — | 1 |
| 3. Water, Quantity | 249 | 229 | 254 | 150 | 149 |
| 4. Micronizing | | | | | |
| Method | Sand | Ball | Sand | Sand | Ball |
| Time, hours, approx. | 24 | 36 | 48 | 48 | 24 |
| Temperature, °C. | 28 | 28 | 28 | 28 | 28 |
| Average Particle Size Diameter (microns) | <0.2 | <0.2 | <0.02 | <0.02 | <0.2 |
| 5. Separation, Screening (X) | X | X | X | X | X |
| 6. Water, dilution | 200 | 200 | 200 | 200 | 200 |
| 7. Yield - Aqueous Pigment Dispersion | 500 | 500 | 500 | 500 | 500 |
| B. Polymerization Step | | | | | |
| 8. Surface Active Agent* | | | | | |
| (a) Quantity, type | 50[1] | 20[1] | 40[3] | 40[1] | 45[1] |
| (b) Quantity, type | — | — | — | 20[2] | — |
| Water | 50 | 80 | 60 | 40 | 55 |
| 9. Monomer Material Non Crosslinking | | | | | |
| Styrene | 40 | — | 30 | 10 | 45 |
| Vinyltoluene | — | 40 | 30 | 20 | — |
| Methylmethacrylate | 15 | — | — | 30 | — |
| Dimethylaminoethylmethacrylate | 5 | 10 | 10 | 10 | 5 |
| 10. Polymerization Initiator | | | | | |
| AZDN[7] | — | 2½ | 3 | 3 | 2½ |
| Cumene Hydroperoxide | 3 | — | — | — | — |
| 11. Polymerization Conditions | | | | | |
| Time, hours | 5 | 5 | 6 | 6 | 5 |
| Temperature, °C. | 80 | 80 | 80 | 80 | 80 |
| Conversion, Approx. 100% (X) | X | X | X | X | X |
| 12. Intrachromospheruloid Pigment Dispersion Yield | 660 | 650 | 670 | 670 | 650 |

*capable of effecting emulsion polymerization
[1]octylphenoxy polyethoxy ethanol (70% active)
[2]substituted imidazoline of tall oil (100% active)
[3]substituted imidazoline quaternized with benzyl chloride (100% active)
[4]fluorochemical surface active agent (50% active)
[5]N-cocoa amine acetate (100% active)
[6]fluorochemical surface active agent (100% active)
[7]azobisisobutyronitrile

TABLE 24

Preparation of Intrachromospheruloid Pigment Compositions (parts by weight)

| Example No. 24- | 1 | 2 | 3 | 4 | 5 |
|---|---|---|---|---|---|
| A. Micronizing Step | | | | | |
| 1. Pigment Class | Phthalocyanine | Quinacridone | Azamethine | Azo | Triphenylmethane |
| Trade Name | Green EXY | Magenta | Irgazin Orange RLT | Permagan Yellow | Victoria Blue |
| Color Index Name | Green 41 | Red 122 | Orange 42 | Yellow 14 | Blue 1 |
| Color Index Number | — | — | — | 21095 | 42595 |
| Pigment, dry basis | 20 | 30 | 30 | 35 | 30 |
| Presscake, dry solids | 20 | 25 | — | — | — |
| Presscake, wet | 100 | 120 | — | — | — |
| 2. Surface Active Agent* | | | | | |
| Material (Trade Name) | | | | | |
| Duponol ME[1] | 2 | 2 | 2 | — | 2 |
| N-group Polymer[2] | 20 | — | — | — | — |
| SAMV Amphoteric Copolymer[3] | — | — | 20 | — | — |
| SMA Copolymer[4] | — | — | — | 20 | — |
| Tamol 731[5] | — | 20 | — | — | — |
| Triton X405[6] | 10 | — | — | 25 | 30 |
| 3. Water, Quantity | 268 | 258 | 248 | 220 | 238 |
| 4. Micronizing | | | | | |
| Method | Sand | Sand | Sand | Sand | Sand |
| Time, hours, approx. | 48 | 48 | 48 | 48 | 48 |
| Temperature, °C. | 28 | 28 | 28 | 28 | 28 |
| Average Particle Size Diameter (microns) | <0.02 | <0.02 | <0.2 | <0.2 | <0.2 |
| 5. Separation, Screening (X) | X | X | X | X | X |
| 6. Water, dilution | 200 | 200 | 200 | 200 | 200 |
| 7. Yield - Aqueous Pigment Dispersion | 500 | 500 | 500 | 500 | 500 |
| B. Polymerization Step | | | | | |
| 8. Surface Active Agent* | | | | | |
| (a) Quantity, type | 25[1] | 25[1] | 20[1] | 75[6] | 25[1] |
| (b) Quantity, type | — | — | 20[6] | — | 30[3] |
| Water | 75 | 75 | 60 | 25 | 45 |
| 9. Monomer Material | | | | | |
| Non Crosslinking | | | | | |
| Styrene | 70 | — | 40 | 80 | — |
| Methylmethacrylate | — | 70 | 40 | — | 80 |
| Cyclohexylmethacrylate | 10 | 10 | — | — | — |
| 10. Polymerization Initiator AZDN[7] | 3 | 3 | 3 | 3 | 3 |
| 11. Polymerization Conditions | | | | | |
| Time, hours | 6 | 6 | 6 | 6 | 6 |
| Temperature, °C. | 75 | 75 | 75 | 75 | 75 |
| Conversion, approx. 100% (X) | X | X | X | X | X |
| 12. Intrachromospheruloid Pigment Dispersion Yield | 680 | 680 | 680 | 680 | 680 |

*capable of effecting emulsion polymerization
[1]sodium lauryl sulfate (100% active)
[2]homopolymer of 4-vinylpyridine
[3]copolymer of styrene, acrylonitrile, methacrylic acid, and 4-vinylpyridine, ratio 25/10/29/36
[4]copolymer of styrene, methacrylic acid and acrylonitrile, ratio 25/65/10
[5]sodium salt of polymeric carboxylic acid (100% active)
[6]octylphenoxy polyethoxy ethanol (70% active)
[7]azobisisobutyronitrile

TABLE 25

Preparation of Intrachromospheruloid Pigment Compositions (parts by weight)

| Example No. 25- | 1 | 2 | 3 | 4 | 5 |
|---|---|---|---|---|---|
| A. Micronizing Step | | | | | |
| 1. Pigment Class | Vat | Phthalocyanine | Misc. | Azo | Vat |
| Trade Name | Indanthrene Pink R | Heliogen Blue BGS | Green Gold | Permanent Carmine | Ponsol Jade Green |
| Color Index Name | Red 1 | Blue 15 | Green 10 | Red 5 | Green 1 |
| Color Index Number | 73360 | 74160 | 12775 | 12490 | 59825 |
| Pigment, dry basis | 20 | 25 | 25 | 30 | 35 |
| Presscake, dry solids | 35 | — | — | — | 20 |
| Presscake, wet | 57 | — | — | — | 175 |
| 2. Surface Active Agent* | | | | | |
| Material (Trade Name) | | | | | |
| Duponol ME[1] | 2 | — | — | — | 2 |
| Alipal CO433[2] | 7 | 10 | 10 | 10 | 8 |
| Tamol SN[3] | 2 | — | 2 | — | 2 |
| Tamol 731[4] | — | 5 | — | — | — |

TABLE 25-continued

Preparation of Intrachromospheruloid Pigment Compositions
(parts by weight)

| Example No. 25- | 1 | 2 | 3 | 4 | 5 |
|---|---|---|---|---|---|
| Zonyl FSA[5] | — | 1 | — | 1 | — |
| 3. Water, quantity | 232 | 259 | 263 | 259 | 215 |
| 4. 49 Micronizing | | | | | |
| Method | Sand | Ball | Ball | Sand | Sand |
| Time, hours, approx. | 48 | 60 | 60 | 48 | 48 |
| Temperature, °C. | 28 | 28 | 28 | 28 | 28 |
| Average Particle Size | | | | | |
| Diameter (microns) | <0.2 | <0.02 | <0.2 | <0.2 | <0.02 |
| 5. Separation, Screening (X) | X | X | X | X | X |
| 6. Water, dilution | 200 | 200 | 200 | 200 | 200 |
| 7. Yield - Aqueous | | | | | |
| Pigment Dispersion | 500 | 500 | 500 | 500 | 500 |
| B. Polymerization Step | | | | | |
| 8. Surface Active Agent* | | | | | |
| (a) Quantity, type | 20[1] | 20[1] | 20[1] | 20[1] | 20[1] |
| (b) Quantity, type | — | — | — | — | — |
| Water | 80 | 80 | 80 | 80 | 80 |
| 9. Monomer Material | | | | | |
| Non Crosslinking | | | | | |
| Styrene | 70 | 30 | 51 | 70 | — |
| Dimethylaminoethylmethacrylate | 5 | — | — | 10 | 5 |
| 4-vinylpyridine | 10 | — | 10.4 | — | 10 |
| Methacrylic acid | — | 10 | 8.6 | — | — |
| Methylmethacrylate | 5 | 40 | 20 | — | 75 |
| 10. Polymerization Initiator | | | | | |
| AZDN[6] | 3 | — | 3 | 3 | 3 |
| Cumene Hydroperoxide | — | 3 | — | — | — |
| 11. Polymerization Conditions | | | | | |
| Time, hours | 5 | 5 | 6 | 5 | 6 |
| Temperature, °C. | 80 | 80 | 75 | 80 | 75 |
| Conversion, Approx. 100% (X) | X | X | X | X | X |
| 12. Intrachromospheruloid | | | | | |
| Pigment Dispersion | | | | | |
| Yield | 690 | 680 | 690 | 680 | 690 |

*capable of effecting emulsion polymerization
[1]sodium lauryl sulfate (100% active)
[2]sodium salt of a sulfate ester of an alkylphenoxy poly(ethyleneoxy)ethanol (28% active)
[3]sodium salt of a condensed napthalene sulfonic acid
[4]sodium salt of a polymeric carboxylic acid (100% active)
[5]fluorochemical surface active agent (50% active)
[6]azobisisobutyronitrile

TABLE 26

Preparation of Intrachromospheruloid Pigment Compositions
(parts by weight)

| Example No. 26- | 1 | | 2 | |
|---|---|---|---|---|
| A. Micronizing Step | | | | |
| 1. Pigment Class | Phthalocyanine | Vat | Dioxazine | Triphenylmethane |
| Trade Name | Heliogen Green A | Carbanthrene Yellow C | Irgazin Violet 6RLT | Rhodamine B |
| Color Index Name | Green 7 | Yellow 1 | — | Violet 1 |
| Color Index Number | 74160 | 70600 | — | 45170 |
| Pigment, dry basis | 20 | 20 | 30 | 10 |
| Presscake, dry solids | 35 | 20 | — | — |
| Presscake, wet | 57 | 100 | — | — |
| 2. Surface Active Agent* | | | | |
| Material (Trade Name) | | | | |
| Tamol 731[1] | 7 | | — | |
| Duponol ME[2] | 2 | | — | |
| Alipal CO 433[3] | 10 | | — | |
| Duomeen T[4] | — | | 15 | |
| Ammonium Hydroxide 28% | 5 | | — | |
| Acetic Acid | — | | 7 | |
| 3. Water, quantity | 69 | | 188 | |
| 4. Micronizing | | | | |
| Method | Sand | | Sand | |
| Time, hours, approx. | 48 | | 48 | |
| Temperature, °C. | 28 | | 28 | |
| Average Particle Size Diameter (microns) | <0.02 | | <0.2 | |
| 5. Separation, Screening (X) | X | | X | |
| 6. Water, dilution | 250 | | 250 | |
| 7. Yield, Aqueous Pigment Dispersion | 500 | | 500 | |
| B. Polymerization Step | | | | |
| 8. Surface Active Agent* | | | | |

TABLE 26-continued

Preparation of Intrachromospheruloid Pigment Compositions
(parts by weight)

| Example No. 26- | 1 | 2 |
|---|---|---|
| (a) Quantity, type | 20[1] | 15[4] |
| (b) Quantity, type | — | — |
| Water | 80 | 75 |
| Acetic Acid | — | 10 |
| 9. Monomer Material Non Crosslinking | | |
| Styrene | 45 | 80 |
| Methylmethacrylate | 35 | — |
| 10. Polymerization Initiator | | |
| AZDN[5] | 3 | 3 |
| 11. Polymerization Conditions | | |
| Time, hours | 5 | 6 |
| Temperature, °C. | 80 | 75 |
| Conversion, approx. 100% (X) | X | X |
| 12. Intrachromospheruloid Pigment Dispersion - Yield | 680 | 680 |

*capable of effecting emulsion polymerization
[1]sodium salt of a polymeric carboxylic acid (100% active)
[2]sodium lauryl sulfate (100% active)
[3]sodium salt of a sulfate ester of an alkylphenoxy poly(ethyleneoxy)ethanol 28% active
[4]N-tallow trimethylene diamine (85% active)
[5]azobisisobutyronitrile

TABLE 27

Preparation of Intrachromospheruloid Pigment Compositions
(parts by weight)

| Example No. 27- | 1 | | 2 | |
|---|---|---|---|---|
| A. Micronizing Step | | | | |
| 1. Pigment Class | Vat | Azo | Azamethine | Triphenylmethane |
| Trade Name | Perylene Red Presscake | Permanent Carmine FFY | Irgazin Red 2 BLT | Rhodamine Y |
| Color Index Name | Red 29 | Red 5 | Red 180 | Red 81 |
| Color Index Number | 71140 | 12490 | — | 45160 |
| Pigment, dry basis | 25 | 10 | 20 | 10 |
| Presscake, dry solids | 25 | 25 | — | — |
| Presscake, wet | 100 | 40 | — | — |
| 2. Surface Active Agent* Material (Trade Name) | | | | |
| Triton X 405[1] | 20 | | — | |
| Duponol ME[2] | 2 | | — | |
| Duomeen T[3] | — | | 24 | |
| Acetic Acid | — | | 12 | |
| 3. Water, quantity | 88 | | 234 | |
| 4. Micronizing | | | | |
| Method | Sand | | Ball | |
| Time, hours, approx | 48 | | 60 | |
| Temperature, °C. | 28 | | 28 | |
| Average Particle Size Diameter (microns) | <0.02 | | <0.2 | |
| 5. Separation, Screening (X) | X | | X | |
| 6. Water, dilution | 250 | | 200 | |
| 7. Yield, Aqueous, Pigment Dispersion | 500 | | 500 | |
| B. Polymerization Step | | | | |
| 8. Surface Active Agent* | | | | |
| (a) Quantity, type | 20[1] | | — | |
| (b) Quantity, type | 10[2] | | — | |
| Water | 70 | | 100 | |
| 9. Monomer Material Non Crosslinking | | | | |
| Methylmethacrylate | 40 | | 58 | |
| Cyclohexylmethacrylate | 20 | | — | |
| Dimethylaminoethylmethacrylate | 2 | | 2 | |
| 10. Polymerization Initiator | | | | |
| AZDN[4] | 2½ | | 2½ | |
| 11. Polymerization Conditions | | | | |
| Time, hours | 5 | | 5 | |
| Temperature, °C. | 80 | | 80 | |
| Conversion, approx. 100% (X) | X | | X | |
| 12. Intrachromospheruloid Pigment | | | | |

TABLE 27-continued

Preparation of Intrachromospheruloid Pigment Compositions
(parts by weight)

| Example No. 27- | 1 | 2 |
|---|---|---|
| Dispersion Yield | 662 | 660 |

*capable of effecting emulsion polymerization
[1] octylphenoxy polyethoxy ethanol (70% active)
[2] sodium lauryl sulfate (100% active)
[3] N-tallow trimethylene diamine (85% active)
[4] azobisisobutyronitrile

TABLES 28-34

Preparation of Intraleucospheruloid Pigment Material using Noncross-linked Polymer Material

TABLE 28

Preparation of Intraleucospheruloid Pigment Compositions
(parts by weight)

| Example No. 28- | 1 | 2 | 3 | 4 | 5 |
|---|---|---|---|---|---|
| A. Micronizing Step | | | | | |
| 1. Pigment Class or Trade Name | Celite 281 | HiSil 233 | HiSil 404 | Cab-O-Sil H-5 | Silene EF |
| Pigment, dry basis | 50 | 40 | 40 | 40 | 40 |
| 2. Surface Active Agent* Material | | | | | |
| Tamol SN[1] | 2 | — | — | — | 2 |
| Duponol ME[2] | 2 | — | — | — | 2 |
| Triton X405[3] | 10 | 10 | 60 | 10 | 10 |
| Monazoline T[4] | — | 10 | 10 | 10 | — |
| Ammonium Hydroxide 28% | 2 | — | — | — | 2 |
| Acetic Acid | — | 5 | 5 | 5 | — |
| 3. Water, Quantity | 284 | 285 | 285 | 285 | 294 |
| 4. Micronizing | | | | | |
| Method | Ball | Sand | Ball | Sand | Sand |
| Time, hours, approx. | 36 | 24 | 36 | 24 | 24 |
| Temperature, °C. | 28 | 28 | 28 | 28 | 28 |
| Average Particle Size Diameter (microns) | <0.2 | <0.2 | <0.2 | <0.02 | <0.2 |
| 5. Separation, Screening (X) | X | X | X | X | X |
| 6. Water, dilution | 200 | 200 | 200 | 200 | 200 |
| 7. Yield Aqueous Pigment Dispersion | 550 | 550 | 600 | 550 | 550 |
| B. Polymerization Step | | | | | |
| 8. Surface Active Agent* | | | | | |
| (a) Quantity, type | 12[2] | 30[3] | — | 40[3] | 10[2] |
| (b) Quantity, type | 20[3] | — | — | — | 20[3] |
| Water | 68 | 70 | 100 | 60 | 70 |
| 9. Monomer Material Non Crosslinking | | | | | |
| Vinyltoluene | 30 | 45 | — | 20 | 50 |
| Cyclohexylmethacrylate | 10 | — | 45 | 20 | — |
| Acrylonitrile | 5 | — | — | 5 | — |
| 10. Polymerization Initiator | | | | | |
| AZDN[5] | — | 2.5 | 2.5 | 2.5 | — |
| Potassium Persulfate | 2.5 | — | — | — | 2.5 |
| Sodium Bisulfite | 1.25 | — | — | — | 1.25 |
| 11. Polymerization Conditions | | | | | |
| Time, hours | 6 | 5 | 5 | 5 | 6 |
| Temperature, °C. | 70 | 80 | 80 | 80 | 70 |
| Conversion, approx. 100% (X) | X | X | X | X | X |
| 12. Intraleucospheruloid Pigment Dispersion Yield | 695 | 695 | 745 | 695 | 700 |

*capable of effecting emulsion polymerization
[1] sodium salt of condensed napthalene sulfonic acid
[2] sodium lauryl sulfate (100% active)
[3] octylphenoxy polyethoxy ethanol (70% active)
[4] substituted imidazoline of tall oil (100% active)
[5] azobisisobutyronitrile
Celite 281 tradename for Johns-Manville Corp. natural silica
HiSil 233 tradename for PPG Industries precipitated silica, reinforcing grade
HiSil 404 tradename for PPG Industries precipitated silica, paper grade
Silene EF tradename for PPG Industries precipitated silica, calcium modified
Cab-O-Sil H5 tradename for Cabot Corporation pyrogenic silica

TABLE 29

Preparation of Intraleucospheruloid Pigment Compositions (parts by weight)

| Example No. 29- | 1 | 2 | 3 | 4 | 5 |
|---|---|---|---|---|---|
| A. Micronizing Step | | | | | |
| 1. Pigment Class or Trade Name | Al-Sil-Ate HO | Excelopax Zirconium Silicate | Reinforcing Grade Wet PP Silica | Paper Grade Wet PP Silica | Ludox Colloidal Silica HS 40 |
| Pigment, dry basis | 30 | 40 | 35 | 35 | 40 |
| 2. Surface Active Agent* Material | | | | | |
| Alipal CO 433[1] | 10 | 10 | — | — | — |
| Duponol ME[2] | 1 | 1 | 2 | — | — |
| Armac T[3] | 2 | — | 2 | 2 | — |
| Triton 400[4] | — | 2 | — | — | — |
| Triton 405[5] | — | — | 10 | 10 | — |
| Acetic Acid | — | — | — | — | — |
| Ammonium Hydroxide 28% | 2 | 2 | 2 | 2 | — |
| 3. Water, Quantity | 255 | 245 | 249 | 251 | 260 |
| 4. Micronizing Method | Sand | Sand | Sand | Sand | — |
| Time, hours, approx | 24 | 48 | 24 | 24 | — |
| Temperature, °C. | 28 | 28 | 28 | 28 | 28 |
| Average Particle Size Diameter (microns) | <0.2 | <0.2 | <0.2 | <0.2 | <0.2 |
| 5. Separation, Screeining (X) | X | X | X | X | X |
| 6. Water, dilution | 200 | 300 | 200 | 200 | 200 |
| 7. Yield - Aqueous Pigment Dispersion | 500 | 600 | 500 | 500 | 500 |
| B. Polymerization Step | | | | | |
| 8. Surface Active Agent* | | | | | |
| (a) Quantity, type | 10[2] | 10[2] | 10[1] | 10[2] | 40[5] |
| (b) Quantity, type | 20[5] | 20[5] | 30[5] | 20[5] | — |
| Water | 70 | 70 | 60 | 70 | 60 |
| 9. Monomer Material Non Crosslinking | | | | | |
| Styrene | 40 | — | 20 | 20 | 21 |
| 4-vinylpyridine | — | — | — | — | 10.5 |
| Methacrylic Acid | — | 2 | — | — | 8.5 |
| Acrylonitrile | 10 | — | 5 | 5 | — |
| Methylmethacrylate | — | 48 | 20 | 20 | 30 |
| 10. Polymerization Initiator | | | | | |
| AZDN[6] | 2 | 2 | 2 | 2 | — |
| Potassium Persulfate | — | — | — | — | 3 |
| Sodium Bisulfite | — | — | — | — | 1.5 |
| 11. Polymerization Conditions | | | | | |
| Time, hours | 4 | 4 | 4 | 4 | 6 |
| Temperature, °C. | 80 | 80 | 80 | 80 | 70 |
| Conversion, approx. 100% (X) | X | X | X | X | X |
| 12. Intraleucospheruloid Pigment Dispersion Yield | 650 | 750 | 645 | 645 | 670 |

*capable of effecting emulsion polymerization
[1]sodium salt of a sulfate ester of an alkylphenoxy poly(ethyleneoxy)ethanol (28% active)
[2]sodium lauryl sulfate (100% active)
[3]N-tallow amine acetate (100% active)
[4]stearyl dimethyl benzyl ammonium chloride (82% active)
[5]octylphenoxy polyethoxy ethanol (70% active)
[6]azobisisobutyronitrile
Al-Sil-Ate HO tradename for Freeport Kaolin Aluminum Silicate
Excelopax tradename for NL Industries zirconium silicate
Ludox tradename for DuPont colloidal silica

TABLE 30

Preparation of Intraleucospheruloid Pigment Compositions (parts by weight)

| Example No. 30 | 1 | 2 | 3 | 4 | 5 |
|---|---|---|---|---|---|
| A. Micronizing Step | | | | | |
| 1. Pigment Class or Trade Name | Titanox RA 47 | TiPure LW | TiPure R 941 Slurry | Unitane OR 450 | Oncor 23A |
| Pigment, dry basis | 40 | 40 | 40 | 40 | 40 |
| 2. Surface Active Agent* Material | | | | | |
| Alipal CO 433[1] | 20 | 40 | — | — | 20 |
| Duomeen T[2] | — | 2 | 40 | 2 | 2 |
| Triton X405[3] | — | 50 | — | 40 | 20 |
| Ammonium Hydroxide 28% | 10 | 5 | — | — | 5 |
| Acetic Acid | — | — | 20 | — | — |

TABLE 30-continued

Preparation of Intraleucospheruloid Pigment Compositions
(parts by weight)

| Example No. 30 | 1 | 2 | 3 | 4 | 5 |
|---|---|---|---|---|---|
| 3. Water, Quantity | 280 | 263 | 250 | 268 | 263 |
| 4. Micronizing | | | | | |
| Method | Sand | Ball | Sand | Sand | Sand |
| Time, hours, approx. | 36 | 48 | 24 | 36 | 36 |
| Temperature, °C. | 28 | 28 | 28 | 28 | 28 |
| Average Particle Size | | | | | |
| Diameter (microns) | <0.2 | <0.2 | <0.2 | <0.2 | <0.2 |
| 5. Separation, Screening (X) | X | X | X | X | X |
| 6. Water, dilution | 250 | 250 | 250 | 250 | 250 |
| 7. Yield | | | | | |
| Aqueous Pigment Dispersion | 600 | 650 | 600 | 600 | 600 |
| B. Polymerization Step | | | | | |
| 8. Surface Active Agent* | | | | | |
| (a) Quantity, type | 30[1] | — | — | 20[1] | 30[3] |
| (b) Quantity, type | — | — | — | — | — |
| Water | 60 | 90 | 100 | 65 | 60 |
| Ammonium Hydroxide 28% | 10 | 10 | — | 15 | 10 |
| 9. Monomer Material | | | | | |
| Non Crosslinking | | | | | |
| Styrene | 50 | — | 25 | — | 30 |
| Methylmethacrylate | — | 50 | 20 | 25 | 10 |
| Cyclohexylmethacrylate | 5 | — | — | 20 | 10 |
| 4 Vinyl pyridine | — | 5 | — | 5 | — |
| 10. Polymerization Initiator | | | | | |
| AZDN[4] | 2 | 2 | — | 2 | 2 |
| Potassium Persulfate | — | — | 2.5 | — | — |
| Sodium bisulfite | — | — | 1.25 | — | — |
| 11. Polymerization Conditions | | | | | |
| Time, hours | 5 | 5 | 6 | 5 | 5 |
| Temperature, °C. | 80 | 80 | 70 | 80 | 80 |
| Conversion, approx. 100% (X) | X | X | X | X | X |
| 12. Intraleucospheruloid Pigment | | | | | |
| Dispersion Yield | 755 | 805 | 745 | 750 | 750 |

*capable of effecting emulsion polymerization
[1]sodium salt of a sulfate ester of an alkylphenoxy poly(ethyleneoxy)ethanol (28% active)
[2]N-tallow trimethylene diamine (85% active)
[3]octylphenoxy polyethoxy ethanol (70% active)
[4]azobisisobutyronitrile
Titanox RA tradename for NL Industries titanium dioxide pigment
TiPure LW tradename for DuPont titanium dioxide pigment
TiPure R941 tradename for DuPont titanium dioxide pigment
Unitane OR 450 tradename for American Cyanamid titanium dioxide pigment
Oncor 23A tradename for NL Industries antimony oxide pigment

TABLE 31

Preparation of Intraleucospheruloid Pigment Compositions
(parts by weight)

| Example No. 31- | 1 | 2 | 3 | 4 | 5 |
|---|---|---|---|---|---|
| A. Micronizing Step | | | | | |
| 1. Pigment Class or Trade Name | Zinc Oxide | Zirconium Oxide | Aluminum Oxide | Aluminum Hydroxide | Barium Sulfate |
| Pigment, dry basis | 30 | 40 | 30 | 40 | 30 |
| 2. Surface Active Agent* | | | | | |
| Material | | | | | |
| Alipal Co 433[1] | 10 | — | 10 | — | 10 |
| Monazoline T[2] | — | 15 | — | — | — |
| Triton X 405[3] | 10 | 10 | 10 | 30 | 10 |
| Ammonium Hydroxide 28% | — | — | — | 2 | 2 |
| Acetic Acid | — | 7 | — | — | — |
| 3. Water, quantity | 250 | 278 | 250 | 278 | 248 |
| 4. Micronizing | | | | | |
| Method | Sand | sand | Ball | Ball | Sand |
| Time, hours, approx. | 36 | 48 | 60 | 36 | 24 |
| Temperature, °C. | 28 | 28 | 28 | 28 | 28 |
| Average Particle Size | | | | | |
| Diameter (microns) | <0.2 | <0.2 | <0.2 | <0.2 | <0.2 |
| 5. Separation, Screening (X) | X | X | X | X | X |
| 6. Water, dilution | 200 | 200 | 200 | 200 | 200 |
| 7. Yield | | | | | |
| Aqueous Pigment Dispersion | 500 | 550 | 500 | 550 | 500 |
| B. Polymerization Step | | | | | |
| 8. Surface Active Agent* | | | | | |
| (a) Quantity, type | 45[3] | 15[2] | 20[1] | 40[3] | 20[1] |
| (b) Quantity, type | — | 30[3] | 20[3] | — | — |
| Water | 55 | 48 | 60 | 60 | 80 |

TABLE 31-continued

Preparation of Intraleucospheruloid Pigment Compositions

| Example No. 31- | (parts by weight) 1 | 2 | 3 | 4 | 5 |
|---|---|---|---|---|---|
| Acetic Acid | — | 7 | — | — | — |
| 9. Monomer Material | | | | | |
| Non Crosslinking | | | | | |
| Styrene | 40 | 10 | — | 40 | 20 |
| Methylmethacrylate | — | 40 | 40 | — | 25 |
| Diethylaminoethylmethacrylate | 5 | — | 5 | 5 | — |
| 10. Polymerization Initiator | | | | | |
| AZDN[4] | 2 | — | 2 | 2 | 2 |
| Cumene hydroperoxide | — | 3 | — | — | — |
| 11. Polymerization Conditions | | | | | |
| Time, hours | 4 | 4 | 4 | 4 | 4 |
| Temperature, °C. | 80 | 80 | 80 | 80 | 80 |
| Conversion, approx. 100% (X) | X | X | X | X | X |
| 12. Intraleucospheruloid | | | | | |
| Pigment Dispersion | | | | | |
| Yield | 645 | 700 | 645 | 695 | 645 |

*capable of effecting emulsion polymerization
[1]sodium salt of a sulfate ester of an alkylphenoxy poly(ethyleneoxy)ethanol (25% active)
[2]substituted imidazoline of tall oil (100% active)
[3]octylphenoxy polyethoxy ethanol (70% active)
[4]azobisisobutyronitrile

TABLE 32

Preparation of Intraleucospheruloid Pigment Compositions

| Example No. 32- | (parts by weight) 1 | 2 | 3 | 4 | 5 |
|---|---|---|---|---|---|
| A. MIcronizing Step | | | | | |
| 1. Pigment Class or Trade Name | TiPure R941 Slurry | Zinc Oxide | Alumina | Microcel T 38 | Cab-O-Sil H 5 |
| Pigment, dry basis | 40 | 30 | 40 | 40 | 40 |
| 2. Surface Active Agent* | | | | | |
| Material | | | | | |
| Triton X 405[1] | 10 | — | — | 10 | 10 |
| Duponol ME[2] | — | 2 | 2 | — | 2 |
| Tamol SN[3] | — | 2 | 2 | 2 | — |
| Tamol 731[4] | — | 20 | — | — | 20 |
| N-group polymer[5] | 20 | — | — | — | — |
| SAMV amphoteric copolymer[6] | — | — | 20 | 20 | — |
| 3. Water, quantity | 280 | 246 | 286 | 278 | 278 |
| 4. Micronizing Step | | | | | |
| Method | Sand | Ball | Sand | Sand | Sand |
| Time, hours, approx. | 48 | 36 | 36 | 24 | 36 |
| Temperature, °C. | 28 | 28 | 28 | 28 | 28 |
| Average Particle Size Diameter (microns) | <0.2 | <0.2 | <0.2 | <0.2 | <0.2 |
| 5. Separation, Screening (X) | X | X | X | X | X |
| 6. Water, dilution | 250 | 200 | 250 | 250 | 250 |
| 7. Yield | | | | | |
| Aqueous pigment dispersion | 600 | 500 | 600 | 600 | 600 |
| B. Polymerization Step | | | | | |
| 8. Surface Active Agent* | | | | | |
| (a) Quantity, type | 40[1] | 10[2] | 20[1] | 10[2] | 10[1] |
| (b) Quantity, type | — | — | 10[2] | — | 10[2] |
| Water | 50 | 85 | 65 | 85 | 75 |
| Ammonium Hydroxide 28% | 10 | 5 | 5 | 5 | 5 |
| 9. Monomer Material | | | | | |
| Non Crosslinking | | | | | |
| Methylmethacrylate | 40 | 20 | — | 20 | 45 |
| Cyclohexylmethacrylate | — | 20 | 40 | 25 | — |
| Acrylonitrile | 5 | 5 | 5 | — | 5 |
| 10. Polymerization Initiator | | | | | |
| AZDN[7] | — | 2 | 2 | 2 | 2 |
| Cumene hydroperoxide | 3 | — | — | — | — |
| 11. Polymerization Conditions | | | | | |
| Time, hours | 5 | 5 | 5 | 5 | 5 |
| Temperature, °C. | 80 | 80 | 80 | 80 | 80 |
| Conversion, approx. 100% (X) | X | X | X | X | X |
| 12. Intraleucospheruloid Pigment | | | | | |

TABLE 32-continued

Preparation of Intraleucospheruloid Pigment Compositions (parts by weight)

| Example No. 32- | 1 | 2 | 3 | 4 | 5 |
|---|---|---|---|---|---|
| Dispersion Yield | 745 | 645 | 745 | 745 | 750 |

*capable of effecting emulsion polymerization
[1]octylphenoxy polyethoxy ethanol (70% active)
[2]sodium lauryl sulfate (100% active)
[3]sodium salt of condensed napthalene sulfonic acid
[4]sodium salt of polymeric carboxylic acid (100% active)
[5]homopolymer of 4-vinylpyridine
[6]copolymer of styrene, acrylonitrile, methacrylic acid and 4-vinylpyridine, ratio 25/10/29/36
[7]azobisisobutyronitrile
TiPure R941 tradename for DuPont titanium dioxide pigment
Micro-Cel T38 tradename for Johns-Mansville Corporation calcium silicate
Cab-O-Sil H5 tradename for Cabot Corporation pyrogenic silica

TABLE 33

Preparation of Intraleucospheruloid Pigment Compositions (parts by weight)

| Example No. 33 | 1 | | 2 | |
|---|---|---|---|---|
| A. Micronizing Step | | | | |
| 1. Pigment Class or Trade Name | HiSil 233 | TiPure R941 Slurry | HiSil 404 | Zirconium Oxide |
| Pigment, dry basis | 20 | 40 | 20 | 40 |
| 2. Surface Active Agent* Material | | | | |
| Duomeen T[1] | 20 | | — | |
| Triton X405[2] | — | | 10 | |
| Alipal CO 433[3] | — | | 20 | |
| Acetic Acid | 10 | | — | |
| Ammonium Hydroxide 28% | — | | 10 | |
| 3. Water, quantity | 310 | | 300 | |
| 4. Micronizing, Method | Ball | | Sand | |
| Time, hours, approx. | 60 | | 48 | |
| Temperature | 28 | | 28 | |
| Average Particle Size Diameter (microns) | <0.2 | | <0.2 | |
| 5. Separation, Screening (X) | X | | X | |
| 6. Water, dilution | 300 | | 300 | |
| 7. Yield - Aqueous Pigment Dispersion | 700 | | 700 | |
| B. Polymerization Step | | | | |
| 8. Surface Active Agent* | | | | |
| (a) Quantity, type | 20[1] | | 20[2] | |
| (b) Quantity, type | — | | 25[3] | |
| Water | 70 | | 55 | |
| Acetic Acid | 10 | | — | |
| 9. Monomer Material Non Crosslinking | | | | |
| Methylmethacrylate | 10 | | 15 | |
| Styrene | 40 | | 35 | |
| Dimethylaminoethylmethalate | — | | 5 | |
| 10. Polymerization Initiator | | | | |
| AZDN[4] | 3 | | — | |
| Cumene Hydroperoxide | — | | 3 | |
| 11. Polymerization Conditions | | | | |
| Time, hours | 5 | | 5 | |
| Temperature, °C. | 80 | | 80 | |
| Conversion, approx. 100% (X) | X | | X | |
| 12. Intraleucospheruloid Pigment Dispersion | | | | |
| Yield | 850 | | 855 | |

*capable of effecting emulsion polymerization
[1]N-tallow trimethylene diamine (85% active)
[2]octylphenoxy polyethoxy ethanol (70% active)
[3]sodium salt of a sulfate ester of an alkylphenoxy poly(ethyleneoxy)ethanol (28% active)
[4]azobisisobutyronitrile
HiSil 233 tradename for PPG Industries precipitated silica, reinforcing grade
TiPure R 941 tradename for DuPont titanium dioxide pigment
HiSil 404 tradename for PPG Industries precipitated silica, paper grade

TABLE 34

Preparation of Intraleucospheruloid Pigment Compositions (parts by weight)

| Example No. 34- | 1 | | 2 | |
|---|---|---|---|---|
| A. Micronizing Step | | | | |
| 1. Pigment Class or Trade Name | Silene D | Alumina | HiSil 233 | Zinc Oxide |
| Pigment, dry basis | 20 | 30 | 20 | 30 |

TABLE 34-continued

Preparation of Intraleucospheruloid Pigment Compositions
(parts by weight)

| Example No. 34- | 1 | 2 |
|---|---|---|
| 2. Surface Active Agent* Material | | |
| Duponol ME[1] | 5 | 5 |
| Triton X 405[2] | 15 | 15 |
| Monaquat TIBC[3] | 2 | — |
| Ammonium Hydroxide 28% | 5 | — |
| 3. Water, quantity | 273 | 280 |
| 4. Micronizing Step | | |
| Method | Ball | Sand |
| Time, hours, approx. | 60 | 48 |
| Temperature | 28 | 28 |
| Average Particle Size Diameter (microns) | <0.2 | <0.2 |
| 5. Separation, screening (X) | X | X |
| 6. Water Dilution | 250 | 300 |
| 7. Yield - Aqueous Pigment Dispersion | 600 | 650 |
| B. Polymerization Step | | |
| 8. Surface Active Agent* | | |
| (a) Quantity, type | 10[1] | 10[1] |
| (b) Quantity, type | 10[2] | 10[2] |
| Water | 80 | 80 |
| 9. Monomer Material | | |
| Non crosslinking | | |
| Vinyltoluene | 10 | 50 |
| Diethylaminoethylmethacrylate | 5 | 5 |
| Styrene | 40 | — |
| 10. Polymerization Initiator | | |
| AZDN[4] | 2.5 | 2.5 |
| 11. Polymerization Conditions | | |
| Time, hours | 5 | 5 |
| Temperature, °C. | 80 | 80 |
| Conversion, approx. 100% (X) | X | X |
| 12. Intraleucospheruloid Pigment | | |
| Dispersion Yield | 755 | 805 |

*capable of effecting emulsion polymerization
[1]sodium lauryl sulfate (100% active)
[2]octylphenoxy polyethoxy ethanol (70% active)
[3]substituted imidazoline quaternerized with benzyl chloride (100% active)
[4]azobisisobutyronitrile
Silene D tradename for PPG Industries precipitated silica, calcium modified
HiSil 233 tradename for PPG Industries precipitated silica, reinforcing grade

TABLES 35-40

Preparation of Intrachromospheruloid/Intraleucospheruloid Pigment Material Compositions from Combinations of Material Produced in Tables 21-27 and 28-34

TABLE 35

Preparation of Intrachromospheruloid/Intraleucospheruloid Pigment Compositions
(parts by weight)

| Example No. 35- | 1 | 2 | 3 | 4 | 5 |
|---|---|---|---|---|---|
| 1. Intrachromospheruloid | | | | | |
| Pigment Material Dispersion | | | | | |
| Table No. | 21-1 | 21-2 | 21-3 | 21-4 | 21-5 |
| Quantity | 60 | 60 | 670 | 670 | 770 |
| Pigment Solids | 12 | 13 | 110 | 90 | 110 |
| pH | 8-9 | 8-9 | 8-9 | 8-9 | 8-9 |
| 2. Water | 1245 | 1245 | 1585 | 1635 | 1160 |
| 3. Intraleucospheruloid Pigment | | | | | |
| Material Dispersion | | | | | |
| Table No. | 28-1 | 28-2 | 28-3 | 28-4 | 28-5 |
| Quantity | 695 | 695 | 745 | 695 | 70 |
| Pigment Solids | 95 | 85 | 95 | 85 | 9 |
| pH | 8-9 | 5-6 | 5-6 | 5-6 | 7-8 |
| 4. Temperature, °C. | 28 | 28 | 28 | 28 | 28 |
| pH | 8-9 | 6-7 | 7 | 7 | 8-9 |
| 5. Nitrogenous Material | | | | | |
| Tetraethylenepentamine | 2 | — | — | — | 2 |
| 6. Temperature, °C. | 28 | 28 | 28 | 28 | 28 |
| pH | 8-9 | 6-7 | 7 | 7 | 8-9 |

TABLE 35-continued

Preparation of Intrachromospheruloid/Intraleucospheruloid Pigment Compositions

| | Example No. 35- | (parts by weight) 1 | 2 | 3 | 4 | 5 |
|---|---|---|---|---|---|---|
| 7. | Bonding Agent Material | | | | | |
| | "N" Sodium Silicate 28%[1] | 50 | — | — | — | 25 |
| | Z6020 Silane [2] | — | 1 | — | 1 | — |
| 8. | Destabilizing Agent Material | | | | | |
| | (a) Acid (X)[3] | X | — | — | — | X |
| | (b) Base (X) | — | — | — | — | — |
| | (c) Alcohol (X)[4] | — | X | X | X | — |
| 9. | Temperature, °C. | 28 | 28 | 28 | 28 | 28 |
| | pH | 5-6 | 6-7 | 7 | 7 | 5-6 |
| 10. | Reaction Temperature, °C. | 80 | 70 | 70 | 70 | 80 |
| 11. | Reaction time, hours, approx. | 5 | 3 | 4 | 4 | 3 |
| 12. | Particle Size Diameter (microns) | <4.0 | <4.0 | <4.0 | <4.0 | <4.0 |
| 13. | Yield - Intrachromospheruloid/ | | | | | |
| | Intraleucospheruloid Pigment | | | | | |
| | Dispersion - approx. | 2000 | 2000 | 3000 | 3000 | 2000 |
| 14. | Pigment Recovery Method | | | | | |
| | Filtration (X) | X | X | — | X | X |
| | Spray Drying (X) | — | — | X | — | — |
| 15. | Product Available As | | | | | |
| | Wet Coagulum (X) | X | X | — | X | X |
| | Dry Coagulum (X) [5] | X | X | — | X | X |
| | Spray Dried Powder (X) | — | — | X | — | — |
| 16. | Intrachromospheruloid/ | | | | | |
| | Intraleucospheruloid Pigment | | | | | |
| | Composition Yield - Dry Basis | 121 | 99 | 302 | 176 | 126 |

[1] 28% "N" sodium silicate aqueous solution
[2] N-(2-aminoethyl)-3-aminopropyltrimethoxysilane
[3] acetic
[4] isopropyl
[5] when dried

TABLE 36

Preparation of Intrachromospheruloid/Intraleucospheruloid Pigment Compositions

| | Example No. 36- | (parts by weight) 1 | 2 | 3 | 4 | 5 |
|---|---|---|---|---|---|---|
| 1. | Intrachromospheruloid Pigment | | | | | |
| | Material Dispersion | | | | | |
| | Table No. | 22-1 | 22-2 | 22-3 | 22-4 | 22-5 |
| | Quantity | 132 | 640 | 660 | 650 | 650 |
| | Pigment Solids | 16 | 65 | 85 | 70 | 70 |
| | pH | 7-8 | 7-8 | 7-8 | 7 | 5-6 |
| 2. | Water | 1218 | 1610 | 1670 | 1705 | 1705 |
| 3. | Intraleucospheruloid Pigment | | | | | |
| | Material Dispersion | | | | | |
| | Table No. | 29-1 | 29-2 | 29-5 | 29-3 | 29-4 |
| | Quantity | 650 | 750 | 670 | 645 | 645 |
| | Pigment Solids | 80 | 90 | 110 | 80 | 80 |
| | pH | 8-9 | 8-9 | 8-9 | 7 | 7-8 |
| 4. | Temperature, °C. | 28 | 28 | 28 | 28 | 28 |
| | pH | 8 | 8 | 8 | 7 | 6-7 |
| 5. | Nitrogenous Material | | | | | |
| | Monaquat TIBC [1] | — | — | 5 | — | 7 |
| | Tetraethylenepentamine | 2 | 2 | — | — | — |
| | PEI 18 [2] | 20 | — | 20 | 10 | — |
| 6. | Temperature, °C. | 28 | 28 | 28 | 28 | 28 |
| | pH | 8 | 8 | 8 | 7 | 6-7 |
| 7. | Bonding Agent Material | | | | | |
| | Titanium Tetrachloride | — | — | — | 20 | — |
| | SMA Copolymer [3] | — | — | — | — | 50 |
| | N-Group Polymer [4] | — | 50 | — | — | — |
| 8. | Destabilizing Agent Material | | | | | |
| | (a) Acid (X) [5] | — | — | X | — | X |
| | (b) Base (X) [6] | — | — | — | X | — |
| | (c) Alcohol (X) [7] | X | X | — | — | — |
| 9. | Temperature, °C. | 28 | 28 | 28 | 30 | 28 |
| | pH | 8 | 8 | 5-6 | 7-8 | 4-5 |
| 10. | Reaction Temperature, °C. | 70 | 70 | 80 | 75 | 75 |
| 11. | Reaction Time, hours, approx. | 5 | 5 | 4 | 5 | 5 |
| 12. | Particle Size Diameter (microns) | <4.0 | <4.0 | <4.0 | <4.0 | <4.0 |
| 13. | Yield - Intrachromospheruloid/ | | | | | |

TABLE 36-continued

Preparation of Intrachromospheruloid/Intraleucospheruloid Pigment Compositions

|  | Example No. 36- (parts by weight) | 1 | 2 | 3 | 4 | 5 |
|---|---|---|---|---|---|---|
|  | Intraleucospheruloid Pigment Dispersion approx. | 2000 | 3000 | 3000 | 3000 | 3000 |
| 14. | Pigment Recovery Method |  |  |  |  |  |
|  | Filtration (X) | X | X | — | X | X |
|  | Spray Drying (X) | — | — | X | — | — |
| 15. | Product Available As |  |  |  |  |  |
|  | Wet Coagulum (X) | X | X | — | X | X |
|  | Dry Coagulum (X) [8] | X | X | — | X | X |
|  | Spray Dried Powder (X) | — | — | X | — | — |
| 16. | Intrachromospheruloid/ Intraleucospheruloid Pigment Composition Yield - Dry Basis | 96 | 165 | 257 | 165 | 160 |

[1] substituted imidazoline quaternized with benzyl chloride (100% active)
[2] water soluble polyethylenimine, manufactured by Dow
[3] copolymer of styrene, methacrylic acid and acrylonitrile, ratio 25/65/10
[4] 4-vinylpyridine homopolymer
[5] acetic
[6] aq. NaOH
[7] isopropyl
[8] when dried

TABLE 37

Preparation of Intrachromospheruloid/Intraleucospheruloid Pigment Compositions

|  | Example No. 37- (parts by weight) | 1 | 2 | 3 | 4 | 5 |
|---|---|---|---|---|---|---|
| 1. | Intrachromospheruloid Pigment Material Dispersion |  |  |  |  |  |
|  | Table No. | 23-1 | 23-2 | 23-2 | 23-4 | 23-5 |
|  | Quantity | 660 | 650 | 670 | 670 | 650 |
|  | Pigment Solids | 70 | 80 | 95 | 90 | 75 |
|  | pH | 7-8 | 5-6 | 5-6 | 5-6 | 5-6 |
| 2. | Water | 1535 | 1595 | 1585 | 1580 | 1600 |
| 3. | Intraleucospheruloid Pigment Material Dispersion |  |  |  |  |  |
|  | Table No. | 30-2 | 30-1 | 30-3 | 30-5 | 30-4 |
|  | Quantity | 805 | 755 | 745 | 750 | 750 |
|  | Pigment Solids | 95 | 95 | 85 | 90 | 90 |
|  | pH | 8-9 | 8-9 | 5-6 | 8-9 | 7-8 |
| 4. | Temperature, °C. | 28 | 28 | 28 | 28 | 28 |
|  | pH | 8 | 7 | 5-6 | 7 | 7 |
| 5. | Nitrogenous Material |  |  |  |  |  |
|  | Armac C[1] | — | 2 | — | — | — |
| 6. | Temperature, °C. | 28 | 28 | 28 | 28 | 28 |
|  | pH | 8 | 7 | 5-6 | 7 | 7 |
| 7. | Bonding Agent Material |  |  |  |  |  |
|  | "N" Sodium Silicate 28%[2] | 50 | — | — | — | — |
|  | Z6020 Silane[3] | — | 1 | — | 1 | — |
|  | Preformed Aminoplast[4] | — | — | 5 | — | 5 |
| 8. | Destabilizing Agent Material |  |  |  |  |  |
|  | (a) Acid (X) [5] | X | — | — | — | — |
|  | (b) Base (X) [6] | — | — | X | — | — |
|  | (c) Alcohol (X) [7] | — | X | — | X | X |
| 9. | Temperature, °C. | 30 | 30 | 30 | 30 | 30 |
|  | pH | 5-6 | 7 | 9-10 | 7 | 7 |
| 10. | Reaction Temperature, °C. | 80 | 70 | 75 | 70 | 70 |
| 11. | Reaction Time, hours, approx. | 4 | 5 | 5 | 5 | 5 |
| 12. | Particle Size Diameter (microns) | <4.0 | <4.0 | <4.0 | <4.0 | <4.0 |
| 13. | Yield - Intrachromospheruloid/Intraleucospheruloid Pigment Dispersion Approx. | 3000 | 3000 | 3000 | 3000 | 3000 |
| 14. | Pigment Recovery Method |  |  |  |  |  |
|  | Filtration (X) | X | X | X | X | X |
|  | Spray Drying (X) | — | — | — | — | — |
| 15. | Product Available as |  |  |  |  |  |
|  | Wet Coagulum (X) | X | X | X | X | X |
|  | Dry Coagulum (X) [8] | X | X | X | X | X |
|  | Spray Dried Powder (X) | — | — | — | — | — |
| 16. | Intrachromospheruloid/ Intraleucospheruloid Pigment |  |  |  |  |  |

TABLE 37-continued

Preparation of Intrachromospheruloid/Intraleucospheruloid Pigment Compositions

| Example No. 37- (parts by weight) | 1 | 2 | 3 | 4 | 5 |
|---|---|---|---|---|---|
| Composition Yield Dry Basis | 179 | 176 | 185 | 181 | 170 |

[1] N-cocoa amine acetate (100% active)
[2] 28% "N" sodium silicate aqueous solution
[3] N-(2-aminoethyl)-3-aminopropyltrimethoxysilane
[4] water dispersible condensation resin resulting from the primary reaction of 1 mole of melamine with 1½ moles of formaldehyde water soluble
[5] aq. $H_2SO_4$
[6] aq. NaOH
[7] isopropyl
[8] when dried

TABLE 38

Preparation of Intrachromospheruloid/Intraleucospheruloid Pigment Compositions

| Example No. 38- (parts by weight) | 1 | 2 | 3 | 4 | 5 |
|---|---|---|---|---|---|
| 1. Intrachromospheruloid Pigment Material Dispersion | | | | | |
| Table No. | 24-1 | 24-2 | 24-3 | 24-4 | 24-5 |
| Quantity | 68 | 680 | 68 | 680 | 136 |
| Pigment Solids | 10 | 110 | 11 | 115 | 22 |
| pH | 7-8 | 8-9 | 7-8 | 8-9 | 8-9 |
| 2. Water | 1287 | 1620 | 1287 | 1625 | 1219 |
| 3. Intraleucospheruloid Pigment Material Dispersion | | | | | |
| Table No. | 31-1 | 31-2 | 31-3 | 31-4 | 31-5 |
| Quantity | 645 | 700 | 645 | 695 | 645 |
| Pigment Solids | 75 | 90 | 75 | 85 | 75 |
| pH | 7-8 | 5-6 | 7-8 | 7-8 | 7-8 |
| 4. Temperature, °C. | 28 | 28 | 28 | 28 | 28 |
| pH | 7-8 | 7 | 7-8 | 8 | 8 |
| 5. Nitrogenous Material | | | | | |
| Tetraethylenepentamine | 2 | 2 | 2 | 2 | 2 |
| 6. Temperature, °C. | 28 | 28 | 28 | 28 | 28 |
| pH | 7-8 | 7 | 7-8 | 8 | 8 |
| 7. Bonding Agent Material | | | | | |
| "N" Sodium Silicate 28%[1] | — | — | — | 50 | — |
| Phenoplast[2] | 10 | — | — | — | — |
| Urea | — | — | 10 | — | 10 |
| Formaldehyde 30% | — | — | 30 | — | 30 |
| 8. Destabilizing Agent Material | | | | | |
| (a) Acid (X)[3] | — | — | X | X | X |
| (b) Base (X)[4] | — | X | — | — | — |
| (c) Alcohol (X)[5] | X | — | — | — | X |
| 9. Temperature, °C. | 30 | 30 | 30 | 30 | 30 |
| pH | 7 | 10-11 | 5-6 | 5-6 | 5-6 |
| 10. Reaction Temperature, °C. | 70 | 75 | 80 | 80 | 80 |
| 11. Reaction Time, hours, approx. | 5 | 4 | 4 | 4 | 4 |
| 12. Particle Size Diameter (microns) | <4.0 | <4.0 | <4.0 | <4.0 | <4.0 |
| 13. Yield - Intrachromospheruloid/ Intraleucospheruloid Pigment Dispersion Approx. | 2000 | 3000 | 2000 | 3000 | 2000 |
| 14. Pigment Recovery Method | | | | | |
| Filtration (X) | — | X | X | X | X |
| Spray Drying (X) | X | — | — | — | — |
| 15. Product Available As | | | | | |
| Wet Coagulum (X) | — | X | X | X | X |
| Dry Coagulum (X)[6] | — | X | X | X | X |
| Spray Dried Powder (X) | X | — | — | — | — |
| 16. Intrachromospheruloid/ Intraleucospheruloid Pigment Composition Yield - dry basis | 137 | 180 | 96 | 214 | 97 |

[1] 28% "N" sodium silicate aqueous solution
[2] condensation product resulting from the primary reaction of 1 mole of m-aminophenol with 1.5 moles of formaldehyde, water dispersible
[3] aq. HCl
[4] $NH_4OH$
[5] isopropyl
[6] when dried

TABLE 39

Preparation of Intrachromospheruloid/Intraleucospheruloid Pigment Compositions
(parts by weight)

| Example No. 39- | 1 | 2 | 3 | 4 | 5 |
|---|---|---|---|---|---|
| 1. Intrachromospheruloid Pigment | | | | | |
| Material Dispersion | | | | | |
| Table No. | 25-1 | 25-2 | 25-3 | 25-4 | 25-5 |
| Quantity | 690 | 680 | 690 | 680 | 690 |
| Pigment Solids | 110 | 105 | 115 | 110 | 125 |
| pH | 8-9 | 8-9 | 8-9 | 8-9 | 8-9 |
| 2. Water | 1000 | 1200 | 1000 | 1400 | 1200 |
| 3. Intraleucospheruloid Pigment | | | | | |
| Material Dispersion | | | | | |
| Table No. | 32-1 | 32-2 | 32-3 | 32-4 | 32-5 |
| Quantity | 745 | 645 | 745 | 745 | 750 |
| Pigment Solids | 85 | 75 | 85 | 85 | 90 |
| pH | 7-8 | 8-9 | 8-9 | 8-9 | 8-9 |
| 4. Temperature, °C. | 28 | 28 | 28 | 28 | 28 |
| pH | 8 | 8-9 | 8-9 | 8-9 | 8-9 |
| 5. Nitrogenous Material | | | | | |
| Tetraethylenepentamine | 2 | 2 | — | 2 | 2 |
| Monazoline T[1] | — | — | 2 | — | — |
| 6. Temperature, °C. | 28 | 28 | 28 | 28 | 28 |
| pH | 8 | 8-9 | 8-9 | 8-9 | 8-9 |
| 7. Bonding Agent Material | | | | | |
| Z6020 Silane [2] | 2 | — | — | — | — |
| SMA Copolymer [3] | — | 50 | 10 | — | — |
| "N" Sodium Silicate 28% [4] | — | — | — | 50 | 50 |
| 8. Destabilizing Agent Material | | | | | |
| (a) Acid (X) [5] | — | X | X | X | X |
| (b) Base (X) | — | — | — | — | — |
| (c) Alcohol (X) [6] | X | — | — | — | — |
| 9. Temperature, °C. | 30 | 30 | 30 | 30 | 30 |
| pH | 8 | 5-6 | 5-6 | 5-6 | 5-6 |
| 10. Reaction Temperature, °C. | 70 | 75 | 75 | 80 | 80 |
| 11. Reaction Time, hours, approx. | 5 | 4 | 4 | 4 | 4 |
| 12. Particle Size Diameter (microns) | <4.0 | <4.0 | <4.0 | <4.0 | <4.0 |
| 13. Yield - Intrachromospheruloid/ | | | | | |
| Intraleucospheruloid Pigment | | | | | |
| Dispersion approx. | 3000 | 2500 | 2500 | 2500 | 2500 |
| 14. Pigment Recovery Method | | | | | |
| Filtration (X) | — | X | X | X | X |
| Spray Drying (X) | X | — | — | — | — |
| 15. Product Available As | | | | | |
| Wet Coagulum (X) | — | X | X | X | X |
| Dry Coagulum (X) [7] | — | X | X | X | X |
| Spray Dried Powder (X) | X | — | — | — | — |
| 16. Intrachromospheruloid/ | | | | | |
| Intraleucospheruloid Pigment | | | | | |
| Composition Yield - dry basis | 277 | 194 | 190 | 202 | 229 |

[1] substituted imidazoline of tall oil (100% active)
[2] N-(2-aminoethyl)-3-aminopropyltrimethoxysilane
[3] copolymer of styrene, methacrylic acid and acrylonitrile, ratio 25/65/10
[4] 28% "N" sodium silicate aqueous solution
[5] acetic
[6] isopropyl
[7] when dried

TABLE 40

Preparation of Intrachromospheruloid/Intraleucospheruloid Pigment Compositions
(parts by weight)

| Example No. 40- | 1 | 2 | 3 | 4 |
|---|---|---|---|---|
| 1. Intrachromospheruloid Pigment | | | | |
| Material Dispersion | | | | |
| Table No. | 26-1 | 26-2 | 27-1 | 27-2 |
| Quantity | 680 | 680 | 662 | 660 |
| Pigment Solids | 120 | 120 | 97 | 90 |
| pH | 8-9 | 5-6 | 8-9 | 5-6 |
| 2. Water | 1470 | 1465 | 1583 | 1535 |
| 3. Intraleucospheruloid Pigment | | | | |
| Material Dispersion | | | | |
| Table No. | 33-1 | 33-2 | 34-1 | 34-2 |
| Quantity | 850 | 855 | 755 | 805 |
| Pigment Solids | 110 | 115 | 105 | 105 |

TABLE 40-continued
Preparation of Intrachromospheruloid/Intraleucospheruloid Pigment Compositions

| Example No. 40- (parts by weight) | 1 | 2 | 3 | 4 |
|---|---|---|---|---|
| pH | 5–6 | 8–9 | 8–9 | 8–9 |
| 4. Temperature, °C. | 28 | 28 | 28 | 28 |
| pH | 6–7 | 6–7 | 8–9 | 6–7 |
| 5. Nitrogenous Material | | | | |
| Tetraethylenepentamine | — | — | 2 | — |
| 6. Temperature, °C. | 28 | 28 | 28 | 28 |
| pH | 6–7 | 6–7 | 8–9 | 6–7 |
| 7. Bonding Agent Material | | | | |
| "N" Sodium Silicate 28%[1] | — | — | 50 | — |
| 8. Destabilizing Agent Material | | | | |
| (a) Acid (X)[2] | — | — | X | — |
| (b) Base (X) | — | — | — | — |
| (c) Alcohol (X)[3] | X | X | — | X |
| 9. Temperature, °C. | 28 | 28 | 28 | 28 |
| pH | 6–7 | 6–7 | 5–6 | 6–7 |
| 10. Reaction Temperature, °C. | 75 | 75 | 80 | 75 |
| 11. Reaction Time, hours, approx. | 5 | 5 | 5 | 5 |
| 12. Particle Size Diameter (microns) | <4.0 | <4.0 | <4.0 | <4.0 |
| 13. Yield - Intrachromospheruloid/ Intraleucospheruloid Pigment Dispersion approx. | 3000 | 3000 | 3000 | 3000 |
| 14. Pigment Recovery Method | | | | |
| Filtration (X) | X | X | X | X |
| Spray Drying (X) | — | — | — | — |
| 15. Product Available as | | | | |
| Wet Coagulum (X) | X | X | X | X |
| Dry Coagulum (X)[4] | X | X | X | X |
| Spray Dried Powder (X) | — | — | — | — |
| 16. Intrachromospheruloid/Intraleucospheruloid Pigment Composition Yield - Dry Basis | 230 | 235 | 216 | 195 |

[1] 28% "N" sodium silicate aqueous solution
[2] aq. $H_2SO_4$
[3] isopropyl
[4] when dried Additional detailed step-wise procedures for producing Intrachromospheruloid/Intraleucospheruloid pigment material in a portion of which the spheruloids are cross-linked using combinations of intrachromospheruloid and intraleucospheruloid pigment material produced in the preceding Tables.

EXAMPLE A
(Noncross-linked intrachromospheruloid/intraleucospheruloid compositions bonded by ionic bonds containing PEI groups and capable of graft polymerization reactions)

To a reaction vessel equipped with temperature controls and stirrer is charged 1000 ml. of water and 600 grams of the intraleucospheruloid pigment dispersion produced in Table 28, Example 2. 600 grams of the intrachromospheruloid pigment dispersion produced in Table 1, Example 1, is added while stirring. A strong reddish violet intrachromospheruloid/intraleucospheruloid pigment composition in slurry form is obtained, the opposing acidic and basic groups on the component spheruloids reacting to form said combination and cause precipitation of the composition. The slurry is heated to 40° C. and 20 grams of a water soluble polyethylenimine (PEI 18 manufactured by Dow) are added. Heating is continued to 80° C. and the coagulated slurry held at this temperature for 1 hour, then filtered, washed and dried to yield a bright violet intrachromospheruloid/intraleucospheruloid pigment containing polyethylenimine absorbed therein and capable of undergoing graft polymerization reaction by virtue of the noncross-linked nature of the intraleucospheruloid portion of the composition. Such intrachromospheruloid/intraleucospheruloid pigment compositions are useful for the coloration and strengthening of paper formulations and in printing and surface treatment of the same.

EXAMPLE B
(Intrachromospheruloid/intraleucospheruloid compositions wherein one component is cross-linked and the other noncross-linked—Ionically bonded together)

To a reaction vessel equipped with temperature controls and stirrer is charged 600 grams of the intraleucospheruloid pigment dispersion produced in Table 30, Example 1, with stirring, 600 grams of the intrachromospheruloid pigment dispersion produced in Table 4, Example 4, is slowly added.

The bluish red intrachromospheruloid/intraleucospheruloid pigment composition produced by the reaction of the opposing acidic acid and cationic material present, may be used as is in stable dispersed form, for all purposes where such a dispersed pigment would be useful, i.e. in latex formulation for paint, coloration of paper pulp and aqueous based printing systems, and in rubber masterbatch formulas.

EXAMPLE C
(Intrachromospheruloid/intraleucospheruloid compositions wherein one component is cross-linked and the other noncross-linked—Ionically bonded together)

To a reaction vessel equipped with temperature controls and stirrer is charged 700 grams of the intraleucospheruloid pigment dispersion produced in Table 10, Example 4, and 700 ml. of water. 600 grams of the intrachromospheruloid pigment dispersion produced in Table 24, Example 4 are slowly added. The bright yellow intrachromospheruloid/intraleucospheruloid pigment composition produced by the reaction of the opposing acidic and basic material present, is heated to 70° C. and then spray dried to produce the yellow intrachromospheruloid/intraleucospheruloid product in spray dried powder form. In such form it is suitable for incorporation into thermoplastic and oil based systems which are not solvents for the intrachromospheruloid portion of the composition.

EXAMPLE D
(Ionic bonding of noncross-linked intrachromospheruloid and cross-linked intraleucospheruloid pigment material)

The procedure of the preceding Example is followed with the exception that the intrachromospheruloid pigment material is taken from Table 26, Example 1, and the intraleucospheruloid pigment material is taken from Table 12, Example 3. The bright green intrachromospheruloid/intraleucospheruloid pigment composition is heated to 70°-75° C. to complete the ionic reaction, then filtered and washed to remove the coagulum from the serum. This product may be used as in any of the preceding Examples.

EXAMPLE E
(Ionic bonding between cross-linked intrachromospheruloid and noncross-linked intraleucospheruloid pigment material)

30 grams of the intrachromospheruloid pigment material produced in Table 3, Example 1, is added to 600 grams of the intraleucospheruloid pigment material produced in Table 29, Example 5, which has been diluted with 600 grams of water. The slurry is stirred for 15 minutes and then the pH adjusted to 8.5-9.0 with dilute aqueous NH₄OH. Ionic bonding takes place between the cationic polymer material of the intrachromospheruloid pigment spheruloids and the anionic groups present on the amphoteric polymer of the intraleucospheruloid pigment spheruloids. The reaction temperature is then raised to 70° C. and held there for 1 hour to complete the bonding. The intrachromospheruloid/intraleucospheruloid pigment is isolated by filtration to yield the bright red semi-opaque product in presscake form suitable for coloration of paper, especially in coloration of coatings thereof.

EXAMPLE F
(Bonding of cationic intrachromospheruloid/intraleucospheruloid spheruloids by means of polymeric carboxylic material)

400 grams of the bright orange intrachromospheruloid pigment material produced in Table 4, Example 1, is combined in a mixing vessel with 250 grams of the white intraleucospheruloid pigment material produced in Table 30, Example 3, together with 500 ml. of water. The mixed dispersion, containing cationic polymer material in both the intrachromospheruloid and intraleucospheruloid spheruloids is caused to both bond together and coagulate by the addition of 100 grams of a 20% aqueous solution of a polymeric carboxylic acid (Tamol 731) which is slowly run in with vigorous agitation. On completion of this addition the intrachromospheruloid/intraleucospheruloid pigment composition, having its spheruloids bonded together by said polymeric carboxylic bonding agent is heated to 70° C. to complete the reaction and then spray dried to yield the bright orange intrachromospheruloid/intraleucospheruloid pigment material in particulate spray dried form, suitable for the coloration and opacification of oil based and thermoplastic systems in which the polymer portion thereof is essentially insoluble.

EXAMPLE G
(Ionic bonding of intrachromospheruloid/intraleucospheruloid spheruloids which are noncross-linked, following by emulsion polymerization of said bonded components with absorbed monomer material to give cross-linked intrachromospheruloid/intraleucospheruloid pigment material) Ser. No. 712,253

200 grams of intrachromospherulois latex produced in Table 25, Example 2, are charged to a vessel equipped for emulsion polymerization and with vigorous agitation 200 grams of the intraleucospheruloid pigment produced in Table 29, Example 5 are run in so that the opposing basic and acidic groups on the spheruloids thereof react without breaking the emulsion. The reactants are stirred for 1 hour and the system exhausted with nitrogen. 25 grams of a monomer material consisting of 12½ grams of allylacrylate and 12½ grams of methylmethacrylate are added and the temperature raised to 45° C. during 1 hour. 2 grams of cumene hydroperoxide are added and the reaction temperature raised to 70° C. and held there for 5 hours. On cooling a bright blue intrachromospheruloid/intraleucospheruloid pigment dispersion is obtained, the component intrachromospheruloid/intraleucospheruloid spheruloids thereof being cross-linked together to essential insolubility in all physical solvents by virtue of the cross-linking monomer absorbed and polymerized therein. This cross-linked intrachromospheruloid/intraleucospheruloid pigment composition may be utilized for any purpose either as a slurry, presscake or dry product where such a cross-linked pigment is desired as shown in the heretofore mentioned Examples 1–12 and Tables 1–20.

EXAMPLE H
(Bonding of intrachromospheruloid/intraleucospheruloid spheruloids containing basic surface active agent material by means of silica)

To a reaction vessel equipped with temperature controls and stirrer is charged 1000 grams of an aqueous slurry containing 10% by weight of freshly precipitated silica pigment, reinforcing grade, having primary particles thereof below 0.01 and 0.02 micron in diameter. Concurrently, with vigorous agitation, 200 grams of the green intrachromospheruloid pigment dispersion produced in Table 2, Example 5, and 200 grams of the opaque white intraleucospheruloid pigment dispersion of Table 12, Example 3, are added. Coagulation and bonding of the two spheruloid components is effected by the reaction between the anionic groups present therein from the surface active agents used in the formation and the particulate silica present in hydrous form. The coagulated pigmentary material is centrifuged to remove the serum and then dried to remove water and collapse the siliceous structure thus firmly bonding the component spheruloids together with a semitransparent siliceous coating.

EXAMPLE I (Bonding intrachromospheruloid/intraleucospheruloid spheruloids containing basic groups both on their polymers and in the surface active agent material present therewith, by means of silica)

The procedure of Example H is followed with the exception that in place of the 200 grams of intrachromospheruloid pigment from Table 2, Example 5, was used 200 grams of the blue green intrachromospheruloid pigment dispersion produced in Table 25, Example 5, and in place of the 200 grams of intraleucospheruloid pigment from Table 12, Example 3, was used 200 grams of the opaque white intraleucospheruloid pigment dispersion produced in Table 30, Example 1. In this example coagulation and bonding takes place not only due to the interaction of the surface active agent material present with the silica but also directly between the reactive amine groups on the intrachromospheruloid and intraleucospheruloid spheruloids with the silica.

EXAMPLE J (Bonding of intrachromospheruloid/intraleucospheruloid spheruloids by means of polyethylenimine material)

Step 1

To a reaction vessel equipped with temperature controls and stirrer is charged 800 ml. of water and 600 grams of the intraleucospheruloid pigment dispersion produced in Table 11, Example 1, are added and the pH is adjusted to 6.8 to 7.0 with dilute acetic acid. 10 grams of a water soluble polyethylenimine (PEI 600 manufactured by Dow) dissolved in 50 ml. of water are run in and the reaction mixture is stirred for 30 minutes.

Step 2

600 grams of the intrachromospheruloid pigment dispersion produced in Table 5, Example 2, is diluted to 1000 ml. volume with water and the dispersion neutralized to a pH of 6.8 to 7.0 with dilute acetic acid.

Step 3

The neutralized intrachromospheruloid pigment dispersion provided in step 2 is run into the intraleucospheruloid/polyethylenimine combination produced in step 1 and the intrachromospheruloid/polyethylenimine/intraleucospheruloid combination so formed is heated to 70° C. and held there for 4 hours, to complete the reaction between the acidic groups present on the intrachromospheruloid and intraluecospheruloid spheruloids and the polyethylenimine bonding material. A portion of the red intrachromospheruloid/polyethylenimine/intraleucospheruloid slurry so produced is spray dried to yield the product in spray dried form. A portion of the product is filtered and washed to give the product in presscake form free of water soluble contaminents. A final portion is filtered and washed as in the preceding portion, then is reslurried in water and soft powder treated as shown in Example 9 to yield the intrachromospheruloid/polyethylenimine/intraleucospheruloid pigment in soft powder treated form, essentially free of water soluble salts and surfactants. This soft powder treated material is divided into two portions, the first one being filtered, washed and dried to yield the intrachromospheruloid/polyethylenimine/intraleucospheruloid in dry soft powder form requiring little or no further grinding to render it suitable for use as a pigment and the second portion is spray dried directly to yield the intrachromospheruloid/polyethylenimine/intraleucospheruloid product in spray dried soft powder form. The salmon red intrachromospheruloid/polyethylenimine/intraleucospheruloid pigment product is found to possess increased affinity for cellulosic material and may be used in any of its forms for coloration of aqueous based systems, while the dry variations are suitable for oil based and thermoplastic coloration.

EXAMPLE K (Bonding of intrachromospheruloid/intraleucospheruloid spheruloids by means of a polyvalent lake forming metallic salt)

The procedure of the preceding Example was followed except that in place of the water soluble polyethylenimine solution, is used 100 grams of a 20% solution of aluminum sulfate, thus producing the intrachromospheruloid/intraleucospheruloid pigment composition as an aluminum lake of the same with the intrachromospheruloid/intraleucospheruloid spheruloids being bonded together through the acidic groups on said spheruloids by the polyvalent aluminum. The product of this reaction may be used as in the preceding Example.

OTHER EXAMPLES

It was shown in Example 4, step B, that the spheruloids of the composition may be produced initially as noncross-linked particles, and be thereafter cross-linked by absorbing cross-linking monomer thereinto and subjecting the same to further polymerization. It has thus been shown that any of the noncross-linked products exemplified may be prepared in cross-linked form by the concurrent or sequential polymerization therewith of cross-linking monomers.

Since the criteria common to the noncross-linked and cross-linked embodiments of the invention are that the products be insoluble in the vehicle of intended use and have a different refractive index than the latter, it will be apparent from the foregoing that the cross-linking monomers, in the Examples producing cross-linked products, may also be replaced by noncross-linking monomers, where the criteria will be satisfied by the environment of use.

While there have been described herein what are at present considered preferred embodiments of the invention, it will be obvious to those skilled in the art that modifications and changes may be made therein without departing from the essence of the invention. For example, the micronized materials in liquid media may be stored after preparation, especially if they contain adequate emulsifier, such previously prepared micronized dispersions may be blended, preferably under further micronization, to provide in liquid media micronized mixed pigments for the process; the modes of combining, heating and polymerizing the ingredients may be varied dependent upon the volumes of materials being handled in manners known to those skilled in the emulsion polymerization art; etc. It is therefore understood that the exemplary embodiments are illustrative and not restrictive of the invention, the scope of which is defined in the appended claims, and that all modifications that come within the meaning and range of equivalents of the claims are intended to be included therein.

This application is one of the following series of applications:

| No. | Case No. | Serial No. | Title |
|---|---|---|---|
| First | 90-A | 712,257 | Intrachromospheruloid Pigments and Processes for Producing Same |
| Second | 90-B | 712,254 | Intraleucospheruloid Pigments and Processes for Producing Same |
| Third | 90-C | 712,255 | Intrachromospheruloid/Inorganic Pigment Compositions and Processes for Producing Same |
| Fourth | 90-D | 712,256 | Intraleucospheruloid/Organic Color Pigment Compositions and Processes for Producing Same |
| Fifth | 90-E | 712,252 | Intrachromospheruloid/Intraleucospheruloid Pigment Compositions and Processes for Producing Same |
| Sixth | 90-F | 712,253 | Intrachromoleucospheruloid Pigment Compositions and Processes for Producing Same |

All of the cases of this series are herein incorporated by reference. The titles of the respective cases indicate the lines of division between the subjects matter thereof. Thus the product of the first case consists essentially of transparent emulsion polymer particles, preferably cross-linked to insolubility in physical solvents and having primary particles of colloidal size (spheruloids), enhancing the optical properties of still smaller particles of organic color pigment (chormo pigment) embedded within them (intra). The second case, in lieu of the organic color pigment has embedded within its spheruloids inorganic white pigment (leuco pigment) enhanced thereby. The product of the third case is a special combination of intrachromospheruloid pigment affixed to leuco pigment and coloring the light reaching and reflected from the latter. The product of the fourth case is a special combination of intraleucospheruloid pigment having chromo pigment material affixed thereto and illuminating the same. The product of the fifth case is a special combination of intrachromospheruloid and intraleucospheruloid pigments bonded together giving mutually enhanced tinctorial properties. The product of the sixth case differs from the foregoing in that its spheruloids have embedded therein and enhance the tinctorial effects of composite particles of essentially transparent organic color (chromo) and inorganic white (leuco) components wedded to each other.

Also incorporated by reference herein are our copending applications Ser. Nos. 712,213 and 712,160 (Cases 88 and 89) filed concurrently herewith and respectively entitled "Improved Vinylic Filler Products and Processes for Producing Same" and "Improved Vinylic Filler Pigments and Processes for Producing Same", which copending applications apply to materials different from those concerned in the above listed series of applications, i.e. non-intrachromo and non-intraleuco- pigment materials, the applicant's soft powdering techniques constituting parts of certain combinations disclosed and claimed in the present application.

It is claimed:

1. A process for producing intrachromospheruloid-/intraleucospheruloid pigment composition, which process comprises, in combination:

(I) preparing an intrachromospheruloid pigment composition by (a) providing in liquid medium a particulate organic pigment composition consisting essentially of organic color pigment composition dispersed in said medium with the aid of 0-100% by weight of the total of surface active agent material set forth in (c), said organic color pigment composition being essentially insoluble in the liquid and having primary particles of an average size less than 0.2 micron in diameter, (b) forming an aqueous emulsion polymerization system consisting essentially of (1) the composition of (a), (2) the balance, if any, of 100% of the total of surface active agent material set forth in (c) and (3) monomer material selected in the ratio of said monomer material to said pigment composition lying in the range of 100:1 to 1:20 by weight, said monomer material consisting essentially of monomer material selected as set forth in step (III) and (4) emulsion polymerization initiator in an effective amount in the range of 0.2 to 10% by weight of the said monomer material, (c) the ratio of the total of the surface active agent material present after (b) to said particulate pigment composition and monomer material lying in the range of 2:1 to 1:40 by weight, and said total of surface active agent material being selected from the class of polymeric and nonpolymeric surface active agent and combinations thereof capable of effecting emulsion polymerization of the selected ethylenically unsaturated monomer material to yield polymer particles with the pigment provided in step (a) imbedded therein, (d) effecting emulsion polymerization of the combination formed in (b) under agitation and at sufficient temperatures in the range of 0° to 200° C. for sufficient time in the range of a few minutes to 24 hours to permit the polymerization to proceed far enough to effect from 50 to 100% conversion by weight of said monomer material to produce in aqueous dispersion an intrachromospheruloid pigment consisting essentially of spheruloids of organic polymer material cross-linked to insolubility in any physical solvent, having primary particles of an average size not exceeding 4 microns in diameter, and having imbedded therein the still smaller size particles of said particulate organic color pigment composition.

(II) preparing an intraleucospheruloid pigment composition by (a') providing in liquid medium a particulate pigment composition consisting essentially of inorganic pigment composition dispersed in said liquid medium with 0-100% by weight of the total of surface active agent material set forth in (c'), said inorganic pigment composition being made up of one or more members selected from the class consisting of the opaque white pigments and the transparent white pigments having refractive indicies different from that of the cross-linked organic polymer formed in step (d') and said inorganic pigment composition having primary particles of an average size less than 0.2 micron in diameter;

(b') forming an aqueous emulsion polymerization system consisting essentially of (1) the composition of (a'), (2) the balance, if any, of 100% of the total of surface active agent material set forth in (c') and (3) monomer material selected in the ratio of said monomer material to said pigment composition in (a') lying in the range of 100:1 to 1:20 by weight, said monomer material consisting essentially of ethylenically unsaturated monomer material selected as set forth in step (III), and (4) emulsion polymerization initiator in an effective amount in the range of 0.2 to 10% by weight of the monomer material present, (c') the ratio of the total of the surface active agent material present after (b') to the particulate pigment composition and monomer material present lying in the range of 2:1 to 1:40 by weight, and said total of surface active agent material being selected from the class of polymeric and nonpolymeric surface active agents and combinations thereof capable of effecting emulsion polymerization of the selected ethylenically unsaturated monomer material present to yield polymer particles with the pigment provided in step (a') imbedded therein, (d') effecting emulsion polymerization of the combination formed in (b') under agitation and at sufficient temperatures in the range of 0° to 200° C. for sufficient time in the range of a few minutes to 24 hours to permit the polymerization to proceed far enough in the range from 50 to 100% conversion by weight of said monomer material to produce in aqueous dispersion an intraleucospheruloid pigment composition consisting essentially of spheruloids of organic polymer material cross-linked to insolubility in any physical solvent, having primary particles of an average size not exceeding 4 microns in diameter, and having imbedded therein the still smaller size particles of said inorganic pigment composition, (III) the monomer material referred to in steps (I) (b) and (II) (b') and (IV) (a''), being selected from the class consisting of group (i) monomer material containing and polymerizable through a single ethylenically unsaturated group in the amount of 0% to 99.8% by weight and group (ii) monomer material containing and polymerizable through a plurality of ethylenically unsaturated groups in an amount in the range of 0.2% to 100% by weight for forming polymer spheruloids of different refractive index from the pigment particles, (IV) forming an intrachromospheruloid/intraleucospheruloid pigment composition by:

(a'') forming a combination, in a weight ratio in the range of 1:100 to 100:1, dry basis, of aqueous dispersions formed in steps (d) and (d'), and bonding in said combination the spheruloids formed in step (d) to spheruloids formed in step (d'); and (b'') recovering said intrachromospheruloid/intraleucospheruloid pigment composition from the combination formed in step (a'').

2. A process according to claim 1, wherein (c'') as a part of step (b'') the intrachromospheruloid/intraleucospheruloid pigment composition produced in aqueous dispersion in step (a'') is modified to contain 0.5 to 35 parts of modifying agent per 100 parts of said pigment composition, dry basis by weight, said modifying agent being selected from the class consisting of (1) the $C_5$ to $C_{12}$ alcohols, (2) hydrocarbons consisting essentially of hydrocarbons forming aqueous azeotropic boiling mixture in the range of 100°–200° C., (3) organic plasticizers, and (4) combinations of any two or more members from the foregoing.

3. A process according to claim 2, which further comprises (d'') as a part of step (b''), after step (c''), drying the modified composition, whereby the intrachromospheruloid/intraleucospheruloid pigment composition is recovered in soft powder form.

4. A process according to claim 2, which further comprises (d'') as a part of step (b''), after step (c''), spray drying the modifed composition, whereby the intrachromospheruloid/intraleucospheruloid pigment composition is recovered in particulate soft powder form.

5. A process according to claim 1, in which the ethylenically unsaturated monomer material in at least one of steps (b) and (b') comprises several portions sequentially added and sequentially polymerized in the ensuing polymerization step, at least one of said several portions comprising monomer material containing and polymerizable through at least two ethylenically unsaturated groups in a sufficient proportion to cross-link the polymer formed therewith to essential insolubility in any physical solvent.

6. A process according to claim 1, in which in at least one of steps (b) and (b') the monomer material having a plurality of polymerizable ethylenically unsaturated groups consists essentially of material copolymerizable with vinyl monomers and selected from the unsaturated conjugated drying oils and their acids and derivatives of the foregoing, the ratio of said drying oil material to the other monomer material polymerized therewith lying in the range of 0.2:99.8 to 20:80 by weight.

7. A process according to claim 1, in which the pigment material provided in at least one of the steps (a) and (a') has primary particles of an average size less than 0.1 micron in diameter.

8. A process according to claim 1, wherein the pigment composition supplied for at least one of steps (a) and (a') is a relatively coarse particulate pigment composition and in said step is micronized in the liquid medium with the aid of any surface active agent present therein until said pigment composition has its primary particles reduced to said average size of less than 0.2 micron in diameter.

9. A process according to claim 8, wherein in at least one of steps (a) and (a') the liquid medium in which the pigment material is micronized consists essentially of an aqueous solution of from 1% to 10% by weight of the total of surface active agent set forth in the associated steps (c) and (c').

10. A process according to claim 8, wherein (b) in at least one of steps (a) and (a') the liquid medium in which the pigment material is micronized consists essentially of monomer material employed in the associated steps (b) and (b').

11. A process according to claim 1, wherein said inorganic pigment composition supplied for step (a') is a relatively coarse particulate inorganic pigment composition and in step (a') is micronized in the liquid medium with the aid of any surface active agent present therein until said inorganic pigment composition has primary particles of an average size in the range of 0.2 to 0.1 micron in diameter.

12. A process according to claim 1, in which the surface active agent material employed in at least one of steos (c) and (c') comprises polymeric surface active agent.

13. A process according to claim 12, in which said polymeric active agent has basic groups at least in part of the form of water soluble salts.

14. A process according to claim 12, in which said polymeric surface active agent has acidic groups at least in part in the form of water soluble salts.

15. A process according to claim 1, in which step (a') the inorganic pigment composition and in step (a'') the combination contains from 0 to an equal weight based on the inorganic pigment composition dispersed in step (a'), of pigment bonding agent material selected from the class consisting of (i) water soluble alkali metal silicates precipitated in the presence of said inorganic pigment composition, (ii) water soluble titanium and zirconium compounds precipitated in the presence of said inorganic pigment composition, (iii) water soluble and dispersible aminoplasts performed and formed in situ and adhered to said inorganic pigment composition, (iv) water soluble and dispersible phenoplasts preformed and formed in situ and adhered to said inorganic pigment composition, (v) water soluble and dispersible organic polymers having carboxyl, amine, sulfate and sulfonic acid groups and salts thereof precipitated in the presence of said inorganic pigment composition, and (vi) water soluble and dispersible organic silanes; and said inorganic pigment composition has, based on the inorganic pigment composition dispersed in step (a'), from 0 to an equal weight of nitrogenous material therewith, said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble imines and polyimines, and (vii) combinations of two or more members of the foregoing.

16. A process according to claim 15, wherein the said pigment material provided for step (a') is micronized with at least 2% by weight of pigment bonding agent material set based on the said pigment composition.

17. A process according to claim 15, wherein the said pigment material provided for step (a') is micronized with at least 2% by weight of the nitrogenous material set forth in step (a') based on the said pigment composition.

18. A process according to claim 1, wherein the said pigment material provided for step (a) or (a') is micronized with at least 2% by weight of the monomer material supplied in step (b) (2) or (b') (2), based on the said pigment composition.

19. A process according to claim 18, wherein the said 2% by weight of monomer material consists essentially of amine monomer material.

20. A process according to claim 1, in which the recovery in step (b'') comprises the steps of coagulating the intrachromospheruloid/intraleucospheruloid pigment composition produced by step (a''), and separating serum from the coagulum to provide the intrachromospheruloid/intraleucospheruloid pigment composition as wet coagulum.

21. A process according to claim 1, in which the recovery in step (b'') comprises the step of drying the intrachromospheruloid/intraleucospheruloid pigment composition.

22. A process according to claim 1, in which step (a') the inorganic pigment composition is made up of one or more members selected from the class consisting of the following groups (1) siliceous pigment compositions selected from (i) the natural silica pigments, (ii) the precipitated silica pigments, (iii) the pyrogenic silica pigments, (iv) the alkaline earth silicate pigments, (v) the aluminum silicate pigments, (vi) the zinc silicate pigments, (vii) the zirconium silicate pigments and (viii) combinations of any two or more of the foregoing; (2) titanium dioxide pigment compositions; (3) metal oxide and hydroxide pigment compositions selected from (i) alkaline earth oxide pigments, (ii) alumina pigments, (iii) aluminum hydroxide pigments, (iv) antimony oxide pigments, (v) zinc oxide pigments, and (vi) zirconium oxide pigments and (4) combinations of any two or more of the foregoing, selected respectively from groups (1), (2), and (3).

23. A process according to claim 1, in which the recovery in step (b'') comprises the step of co-coagulating the combined aqueous dispersions of intrachromospheruloid and intraleucospheruloid pigments formed in step (a'') with the aid of coagulant selected from the class consisting of
    (i) water soluble alcohols
    (ii) pH adjustment materials of the group consisting of water soluble acids and inorganic bases,
    (iii) sodium chloride, and
    (iv) combinations of any two or more of the foregoing.

24. A process according to claim 15, in which the combination formed in step (a'') has therein at least 2% by weight based on the polymer content of (d) and (d') of spheruloid bonding agent material selected from the subclass consisting of groups (iii) or (iv) and step (b'') comprises insolubilizing said bonding agent of groups (iii) or (iv) to form a resin bonded intrachromospheruloid/intraleucospheruloid pigment composition.

25. A process according to claim 1, which further comprises
    (i) selecting in steps (b) and (b''), respectively, monomer material containing sufficient acidic monomer to provide each of the intrachromospheruloid and intraleucospheruloid pigments with groups selected from the class consisting of acid groups and their alkali metal and ammonium salts, and
    (ii) in step (b'') causing the said spheruloid pigments to combine by reacting the said groups thereof with water soluble and dispersible organic materials having a plurality of groups selected from the class consisting of amine and imine groups and salts thereof.

26. A process according to claim 1, which further comprises
    (i) selecting in steps (b) and (b'), respectively, monomer material containing sufficient monomer having groups from the class consisting of amine and imine groups and salts thereof, to provide each of the intrachromospheruloid and intraleucospheruloid pigments with said groups, and
    (ii) in step (b'') causing the said spheruloid pigments to combine by reacting said groups with water soluble organic material having a plurality of groups selected from the class consisting of carboxyl, sulfate and sulfonic acid groups and salts thereof.

27. A process according to claim 1, which further comprises
    (i) selecting anionic surface active agent in steps (c) and (c'), respectively, to provide both of the aqueous dispersions in steps (d) and (d') with anionic surface active agent and
    (ii) in step (b'') causing the said spheruloid pigments to be coagulated by reacting the combination formed in step (a'') with water soluble organic material having a plurality of groups selected from the class consisting of amine and imine groups and salts thereof.

28. A process according to claim 1, which further comprises
(i) selecting cationic surface active agent in steps (c) and (c'), respectively, to provide both of the aqueous dispersions formed in steps (d) and (d') with cationic surface active agent and
(ii) in step (b") causing the said spheruloid pigments to be coagulated by reacting the combination formed in step (a") with water soluble organic material having a plurality of groups selected from the class consisting of carboxyl, sulfate and sulfonic acid groups and salts thereof.

29. A process according to claim 1, which further comprises
(i) selecting in steps (b) and (b'), respectively, monomer material containing sufficient monomer containing basic groups thereon to provide each of the intrachromospheruloid and intraleucospheruloid pigments with said groups, and
(ii) in step (b") coagulating the combined aqueous dispersions of intrachromospheruloid and intraleucospheruloid pigments formed in step (a") with inorganic coagulant consisting essentially of material selected from the class made up of (i) the precipitated hydrated silicas, (ii) the precipitated hydrated silicas formed in situ from alkali metal silicates, (iii) the pyrogenic silicas, (iv) the alkaline-earth silicates, (v) the aluminum silicates, (vi) hydrated aluminas, (vii) zinc silicates, (viii) the zirconium silicates, (ix) the phosphotungstic acids and the phosphomolybdic acids, and (x) combinations of any two or more of the foregoing.

30. A process according to claim 1, which further comprises
(i) selecting surface active agent in steps (c) and (c') respectively, having groups selected from the class consisting of amine and imine groups, salts thereof, a quaternary ammonium groups, to provide both of the aqueous dispersions formed in steps (b) and (b') with surface active agent having such groups, and
(ii) in step (b") coagulating the combined aqueous dispersions of intrachromospheruloid and intraleucospheruloid pigments formed in step (a") with inorganic coagulant selected from the class consisting of (i) the precipitated hydrated silicas (ii) the precipitated hydrated silicas formed in situ from alkali metal silicates, (iii) the pyrogenic silicas, (iv) the alkaline-earth silicates, (v) the aluminum silicates, (vi) hydrated aluminas, (vii) the zinc silicates, (viii) the zirconium silicates, (ix) the phosphotungstic acids and the phosphomolybdic acids, and (x) combinations of any two or more of the foregoing.

31. A process according to claim 1, which further comprises
(i) selecting in steps (b) and (b'), respectively, monomer material containing sufficient acidic monomer to form spheruloids which contain acidic groups and which after neutralization with water soluble base are coagulable, and
(ii) in step (b") neutralizing with a water soluble base the acidic groups of the combined aqueous dispersion of intrachromospheruloid and intraleucospheruloid pigments formed in step (a'), and
(iii) then coagulating the spheruloids with water soluble coagulant selected from the class consisting of water soluble (i) alkali-earth metal compounds, (ii) aluminum salts, (iii) zinc salts, (iv) oleophilic amine acid salts, and (v) combination of the foregoing.

32. A process according to claim 1, which further comprises
(i) selecting anionic surface active agents in steps (c) and (c'), respectively, and
(ii) in step (b∝) coagulating the combined aqueous dispersion of instrachromospheruloid and intraleucospheruloid pigments formed in step (a") with water soluble coagulant selected from the class consisting of water soluble (i) alkli-earth metal compounds, (ii) aluminum salts, (iii) zinc salts, (iv) oleophilic amine acid salts, and (v) combinations of the foregoing.

33. A process according to claim 1, wherein (c") the recovery in step (b") is assisted by selecting the monomer materials in steps (b) and (b'), respectively, to provide one of the intrachromospheruloid and intraleucospheruloid pigments with acidic groups and the other with basic groups, for causing the bonding together of said spheruloid pigments in the combination formed in step (a").

34. A process according to claim 1, wherein (c") the recovery in step (b") is assisted by selecting the surface active agents in steps (c) and (c'), respectively, to provide one of the aqueous dispersions formed in step (d) and (d') with anionic surface active agent and the other with cationic surface active agent for causing the bonding together of said spheruloid pigments in the combination formed in step (a").

35. A process according to claim 1, in which the inorganic pigment composition in step (a') consists essentially of silica pigment composition having primary particles of an average size less than 0.2 micron in diameter and titanium dioxide pigment composition having primary particles of an average size less than 0.2 micron in diameter, in a weight ratio in the range of 1:10 to 10:1.

36. A process according to claim 1, in which the inorganic pigment composition in step (a') consists essentially of silica pigment composition having primary prticles of an average size less than 0.2 micron in diameter and titanium dioxide pigment composition having primary particles of an average size in the range of about 0.2 to 0.1 micron in diameter, in a weight ratio in the range of 1:10 to 10:1.

37. A process according to claim 1, in which the selected inorganic pigment composition in step (a') consists essentially of siliceous pigment selected from the subclass consisting essentially of (a) wet, and dried, paper grade precipiated hydrated silica pigments, (b) wet, and dried, reinforcing grade precipitated hydrated silica pigments and (c) pyrogenic silica pigment.

38. A process according to claim 1, in which the inorganic pigment composition in step (a') consists essentially of titanium dioxide pigment composition having primary particles of an average size less than 0.2 micron in diameter.

39. A process according to claim 1, in which the inorganic pigment composition in step (a') consists essentially of titanium dioxide pigment composition having primary particles of an average size in the range of about 0.2 to 0.1 micron in diameter.

40. An intrachromospheruloid/intraleucospheruloid pigment composition consisting essentially of composition particles made up of component (A) intrachromospheruloid pigment composition, consisting essentially of organic color pigment material having an average particle size not exceeding 0.2 micron in diameter imbedded in spheruloids of organic polymer material cross-linked to insolubility in any physical solvent, bonded to component (B) intraleucospheruloid pigment composition, consisting essentially of inorganic leuco pigment material having an average particle size not exceeding 0.2 micron in diameter and imbedded in spheruloids of organic polymer material cross-linked to insolubility in any physical solvent, said polymer material consisting essentially of polymerized monomer material selected from the class consisting of monoethylenically unsaturated and polyethylenically unsaturated polymerizable compounds, the spheruloids of organic polymer materials bonded to each other each having primary particles of an average size not exceeding 4 microns in diameter, the weight ratio of said intrachromospheruloid pigment composition to said intraleucospheruloid pigment composition lying in the range of 100:1 to 1:100, the polymer material of the spheruloids being of different refractive index from the pigment materials embedded therein and from the environment of intended use of the intrachromospheruloid-/intraleucospheruloid pigment composition, and said intrachromospheruloid/intraleucospheruloid pigment composition being essentially insoluble in the environment of intended use thereof.

41. A pigment composition according to claim 40 wherein the spheruloids of one of said components (A) and (B) of the component particles consist essentially of polymer material having basis groups, and the spheruloids of the other of said components consist essentially of polymer material having acidic groups, and said components (A) and (B) are bonded together by mutual interaction of said groups.

42. A pigment composition according to claim 41, wherein the spheruloids of component (A) contain the acidic groups.

43. A pigment composition according to claim 40, in which in the composite particles the components (A) and (B) are bonded together by resin selected from the class consisting of the aminoplasts and phenoplasts.

44. A pigment composition according to claim 40, in which, in the composite particles, the components (A) and (B) are bonded together by reaction products of anionic surface active agent material associated with their spheruloids, with organic material having a plurality of groups selected from the class consisting of amine and imine groups and salts thereof.

45. A pigment composition according to claim 40 in which, in the composite particles, the components (A) and (B) are bonded together by reaction products of cationic surface active agent material associated with their spheruloids and selected from the class consisting of amines, imines, and salts thereof, with organic material having a plurality of groups selected from the class consisting of carboxyl, sulfate and sulfonic acid groups and salts thereof.

46. A pigment composition according to claim 40 in which, in the composite particles, the components (A) and (B) are bonded together by the reaction products of basic groups of their spheruloids with acidic material selected from the class consisting of (i) the precipitated hydrated silicas, (ii) the precipitated hydrated silicas formed in situ from alkali metal silicates (iii) the pyrogenic silicas, (iv) the alkaline-earth silicates, (v) the aluminum silicates, (vi) hydrated aluminas, (vii) zinc silicates, (viii) the zirconium silicates, (ix) the phosphotungstic acids and the phosphomolybdic acids, and (x) combinations of any two or more of the foregoing.

47. A pigment composition according to claim 40 in which, in the composite particles, the components (A) and (B) are bonded together by the reaction products of cationic surface active agent material associated with their spheruloids with acidic material selected from the class consisting of (i) the precipitated hydrated silicas, (ii) the precipitated hydrated silicas formed in situ from alkali metal silicates, (iii) the pyrogenic silicas, (iv) the alkaline-earth silicates, (v) the aluminum silicates, (vi) hydrated aluminas, (vii) the zinc silicates, (viii) the zirconium silicates, (ix) the phosphotungstic acids and the phosphomolybdic acids, and (x) combinations of any two or more of the foregoing.

48. A pigment composition according to claim 40 in which, in the composite particles, the components (A) and (B) are bonded together by the reaction products of acidic groups of their spheruloids selected from the class consisting of acid groups and their alkali metal and ammonium salts, with basic water soluble polyvalent material selected from the class consisting of (i) the alkali metal salts, (ii) aluminum salts, (iii) zinc salts, (iv) oleophilic amine salts, and (v) combination of the foregoing.

49. A pigment composition according to claim 40 in which, in the composite particles, the components (A) and (B) are bonded together by the reaction products of anionic surface active agent material associated with their spheruloids with water soluble polyvalent material selected from the class consisting of (i) alkali metal salts, (ii) aluminum salts, (iii) zinc salts, (iv) oleophilic amine salts, and (v) combinations of the foregoing.

50. A pigment composition according to claim 40 in which, in the composite particles, the components (A) and (B) are bonded together by the reaction products of anionic surface active agent material associated with one of said components, with cationic surface active agent material associated with the other of said components.

51. A pigment composition according to claim 40 in which the organic color pigment material of component (A) consists of a mixture of two or more chemically different organic color pigments and said component (A) exhibits a coloration different from that of either of said color pigments.

52. An intrachromospheruloid/intraleucospheruloid pigment composition according to claim 40 in which in component (B), the inorganic pigment material consists essentially of (i) silica composition having primary particles of an average size les than 0.2 micron in diameter and (ii) titanium dioxide pigment composition having primary particles of an average size less than 0.2 micron in diameter in a weight ratio of (i) to (ii) in the range of 1:10 to 10:1.

53. An intrachromospheruloid/intraleucospheruloid pigment composition according to claim 40 in which, in component (B) the inorganic pigment material consists essentially of (i) silica pigment composition having primary particles of an average size less than 0.2 micron in diameter and (ii) titanium dioxide pigment composition having primary particles of an average size in the range of about 0.2 to 0.1 micron in diameter in a weight ratio of (i) to (ii) in the range of 1:10 to 10:1.

54. An intrachromospheruloid/intraleucospheruloid pigment composition according to claim 40 in which, in component (B), the inorganic pigment composition is selected from the class consisting of the following groups (1) siliceous pigment compositions selected from (i) the natural silica pigments, (ii) the precipitated silica pigments, (iii) the pyrogenic silica pigments, (iv) the alkaline earth silicate pigments, (v) the aluminum silicate pigments, (vi) the zinc silicate pigments, (vii) the zirconium silicate pigments, and (viii) combinations of any two or more of the foregoing; (2) titanium dioxide pigment compositions; (3) metal oxide and hydroxide pigment compositions selected from the class consisting of the following groups (i) alkaline-earth oxide pigments, (ii) alumina pigments, (iii) aluminum hydroxide pigments, (iv) antimony oxide pigments, (v) zinc oxide pigments, (vi) zirconium oxide pigments, and (vii) combinations of any two or more of the foregoing, and (4) combinations of any two or more members selected respectively from classes (1), (2) and (3); in which component (B) contains (I) from 0 to an equal weight of pigment bonding agent material on its pigment composition and selected from the class consisting of water insoluble deposits from (i) water soluble alkali metal silicates, (ii) water soluble titanium compounds, (iii) water soluble and dispersible aminoplasts preformed and formed in situ, (iv) water soluble and dispersible phenoplasts preformed and formed in situ, (v) water soluble and dispersible organic polymers having carboxyl, amine, sulfate and sulfonic acid groups and salts thereof, and (vi) water soluble and dispersible organic silanes; and (II) from 0 to an equal weight of nitrogenous materal on its pigment composition, said nitrogenous material on its pigment composition, said nitrogenous material being selected from the class consisting of (i) oleophilic amines, (ii) oleophilic imines, (iii) oleophilic amine carboxylates, (iv) the oleophilic quaternary ammonium compounds, (v) water soluble polyamines, (vi) water soluble polyimines, and (vii) combinations of two or more members of the foregoing.

55. An intrachromospheruloid/intraleucospheruloid pigment composition according to claim 54, in which the inorganic pigment material of component (B) consists essentially of silica pigment composition of the group having primary particles of an average size in the range of 0.2 to 0.01 micron in diameter.

56. An intrachromospheruloid/intraleucospheruloid pigment composition according to claim 40 in which the inorganic pigment material of component (B) consists essentially of titanium dioxide pigment composition having primary particles of an average size in the range of about 0.2 to 0.1 micron in diameter.

57. An intrachromospheruloid/intraleucospheruloid pigment composition according to claim 40 in the form of a wet coagulum.

58. An intrachromospheruloid/intraleucospheruloid pigment composition according to claim 40 in powder form.

59. A physically insoluble intrachromospheruloid/intraleucospheruloid pigment composition according to claim 40, in soft powder form.

60. A process as claimed in claim 1, in which monomer material selected from group (ii) is incorporated in at least one of steps (b) and (b') prior to step (a").

61. A process as claimed in claim 1, in which monomer material selected from group (ii) is incorporated in at least one of steps (b) and (b') concurrently with step (a").

* * * * *